(12) United States Patent
Brooks et al.

(10) Patent No.: US 8,458,103 B2
(45) Date of Patent: Jun. 4, 2013

(54) SYSTEM AND METHOD FOR CONCURRENTLY CONDUCTING CAUSE-AND-EFFECT EXPERIMENTS ON CONTENT EFFECTIVENESS AND ADJUSTING CONTENT DISTRIBUTION TO OPTIMIZE BUSINESS OBJECTIVES

(75) Inventors: Brian E. Brooks, St. Paul, MN (US); Brian J. Stankiewicz, Mahtomedi, MN (US); Jonathan B. Arthur, Hudson, WI (US); Craig G. Markell, White Bear Township, MN (US); Brian L. Linzie, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 669 days.

(21) Appl. No.: 12/651,650

(22) Filed: Jan. 4, 2010

(65) Prior Publication Data
US 2010/0174671 A1   Jul. 8, 2010

Related U.S. Application Data

(60) Provisional application No. 61/143,060, filed on Jan. 7, 2009.

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

| | | | |
|---|---|---|---|
| 5,253,331 A | 10/1993 | Lorenzen | |
| 5,287,266 A | 2/1994 | Malec | |
| 5,309,174 A | 5/1994 | Minkus | |
| 5,474,385 A | 12/1995 | Reading | |
| 5,513,342 A | 4/1996 | Leong et al. | |
| 5,812,134 A | 9/1998 | Pooser | |
| 6,023,714 A | 2/2000 | Hill et al. | |
| 6,137,483 A | 10/2000 | Kiyono | |
| 6,169,981 B1 | 1/2001 | Werbos | |
| 6,317,700 B1 | 11/2001 | Bagne | |
| 6,529,940 B1 | 3/2003 | Humble | |
| 6,604,092 B1 | 8/2003 | Stewart | |

(Continued)

FOREIGN PATENT DOCUMENTS

| | | |
|---|---|---|
| GB | 2309805 | 6/1997 |
| JP | 2001-265904 | 9/2001 |

(Continued)

OTHER PUBLICATIONS

Johnson, Dr. R. Bruke, "Chapter 9 Experimental Research", published Jun. 14, 2008, Rettrieved Aug. 30, 2011. <http://www.southalabama.edu/coe/bset/Johnson/lecture/lec9.htm>.

(Continued)

*Primary Examiner* — Kakali Chaki
*Assistant Examiner* — Luis Sitiriche
(74) *Attorney, Agent, or Firm* — X. Christina Huang

(57) ABSTRACT

The present invention is directed to systems, articles, and computer-implemented methods for assessing effectiveness of communication content and optimizing content distribution to enhance business objectives. Embodiments of the present invention are directed to computer-implemented methods for a computer-implemented method, comprising conducting an experiment using experimental content to determine effectiveness of communication content and executing, while conducting the experiment, a machine learning routine (MLR) using MLR content to enhance an effectiveness metric.

31 Claims, 49 Drawing Sheets

U.S. PATENT DOCUMENTS

| | | | |
|---|---|---|---|
| 6,604,094 | B1 | 8/2003 | Harris |
| 6,840,905 | B2 | 1/2005 | Gotschim |
| 6,934,415 | B2 | 8/2005 | Stentiford |
| 6,934,748 | B1 | 8/2005 | Louviere |
| 7,089,322 | B1 | 8/2006 | Stallmann |
| 7,130,461 | B2 | 10/2006 | Rosenholtz |
| 7,130,808 | B1 | 10/2006 | Ranka |
| 7,136,871 | B2 | 11/2006 | Ozer |
| 7,216,092 | B1 | 5/2007 | Weber et al. |
| 7,260,261 | B2 | 8/2007 | Xie |
| 7,308,497 | B2 | 12/2007 | Louviere |
| 7,406,434 | B1 | 7/2008 | Chang et al. |
| 7,460,708 | B2 | 12/2008 | Kayahara |
| 2001/0018668 | A1 | 8/2001 | Yanase |
| 2002/0026478 | A1 | 2/2002 | Rodgers |
| 2002/0112035 | A1 | 8/2002 | Carey |
| 2002/0129367 | A1 | 9/2002 | Devara |
| 2002/0161779 | A1 | 10/2002 | Brierley |
| 2003/0046376 | A1 | 3/2003 | Yen |
| 2003/0083822 | A2 | 5/2003 | Brunner |
| 2003/0220830 | A1 | 11/2003 | Myr |
| 2004/0015399 | A1 | 1/2004 | Maggio |
| 2004/0015401 | A1 | 1/2004 | Lee et al. |
| 2004/0075685 | A1 | 4/2004 | Ohyama |
| 2004/0088726 | A1 | 5/2004 | Ma |
| 2004/0210471 | A1 | 10/2004 | Luby |
| 2004/0260767 | A1 | 12/2004 | Kedem et al. |
| 2005/0021765 | A1 | 1/2005 | Flores et al. |
| 2005/0039206 | A1 | 2/2005 | Opdycke |
| 2005/0047647 | A1 | 3/2005 | Rutishauser |
| 2005/0055193 | A1 | 3/2005 | Bondarenko |
| 2005/0071223 | A1* | 3/2005 | Jain et al. ............ 705/14 |
| 2005/0159921 | A1 | 7/2005 | Louviere |
| 2005/0171843 | A1 | 8/2005 | Brazell |
| 2005/0195221 | A1 | 9/2005 | Berger |
| 2006/0049657 | A1 | 3/2006 | Searfoss |
| 2006/0064339 | A1 | 3/2006 | Allred |
| 2006/0070026 | A1 | 3/2006 | Balinsky |
| 2006/0179418 | A1 | 8/2006 | Boyd |
| 2006/0193536 | A1 | 8/2006 | Pilu |
| 2006/0200759 | A1 | 9/2006 | Agrawala |
| 2006/0215922 | A1 | 9/2006 | Koch |
| 2006/0271441 | A1* | 11/2006 | Mueller et al. ............ 705/14 |
| 2006/0287913 | A1 | 12/2006 | Baluja |
| 2007/0038516 | A1 | 2/2007 | Apple et al. |
| 2007/0073562 | A1 | 3/2007 | Brice |
| 2007/0100698 | A1 | 5/2007 | Neiman |
| 2007/0136133 | A1 | 6/2007 | Li |
| 2007/0156382 | A1 | 7/2007 | Graham, II |
| 2008/0060003 | A1* | 3/2008 | Nocifera et al. ............ 725/35 |
| 2008/0109727 | A1 | 5/2008 | Colle et al. |
| 2008/0230604 | A1 | 9/2008 | Fong |
| 2008/0306804 | A1 | 12/2008 | Opdycke |
| 2009/0012847 | A1 | 1/2009 | Brooks |
| 2009/0012848 | A1 | 1/2009 | Brooks |
| 2009/0012927 | A1 | 1/2009 | Brooks |
| 2009/0030780 | A1 | 1/2009 | York |
| 2009/0158179 | A1 | 6/2009 | Brooks |
| 2009/0281896 | A1 | 11/2009 | Brooks |
| 2010/0017288 | A1 | 1/2010 | Graham, II |

FOREIGN PATENT DOCUMENTS

| | | |
|---|---|---|
| JP | 2002-197403 | 7/2002 |
| JP | 2002-330415 | 11/2002 |
| JP | 2003-529116 | 9/2003 |
| JP | 2004-178276 | 6/2004 |
| JP | 2005-037563 | 2/2005 |
| KR | 10-2003-0027565 | 4/2003 |
| KR | 10-2003-0040263 | 5/2003 |
| RU | 2134457 | 8/1999 |
| WO | WO 01-93083 | 12/2001 |
| WO | WO 2006-024108 | 3/2006 |
| WO | WO 2007-078897 | 7/2007 |
| WO | WO 2007-079254 | 7/2007 |
| WO | WO 2007-079256 | 7/2007 |
| WO | WO 2009-006542 | 1/2009 |
| WO | WO 2009-006545 | 1/2009 |
| WO | WO 2009-006546 | 1/2009 |

OTHER PUBLICATIONS

Iurgel, Automatic Media Monitoring Using Stochastic Pattern Recognition Techniques, Doctoral Thesis, Munich University of Technology, 2005, pp. 1-163.

White, Implicit Feedback for Interactive Information Retrieval, Doctoral Thesis, University of Glasgow, Department of Computing Science, Oct. 2004, pp. 1-302.

Niederhoffer, et al. Linguistic Style Matching in Social Interaction, Journal of Language and Social Psychology, vol. 21, No. 4, Dec. 2002, pp. 337-360.

Tolli, Motivational and Self-Regulatory Responses to Interruptions, Doctoral Thesis, The University of Akron, May 2009, pp. 1-235.

Allison, "Power and Money: Designing Statistically Powerful Studies While Minimizing Financial Costs", Physiological Methods, 1997, vol. 2, No. 1, pp. 20-33.

Campbell, "Experimental and Quasi-Experimental Designs for Research", Handbook of Research on Teaching, 6 pages (1963).

"Designer Module", Royer, [online],[retrieved from the Internet on Oct. 7, 2005], <http://www.cognitive-aptitude-assessment-software.com/DesignerModule.html>, 1 page.

"Design Your Own Experiments", Royer, [online],[retrieved from the Internet on Oct. 7, 2005], <http://www.cognitive-aptitude-assessment-software.com/DesignExperiments.html>, 1 page.

Goldstein, "Cognitive Psychology, Connecting Mind, Research, and Everyday Experience, 2d Ed", SCITECH Book News, Wadsworth Publishing, 1 page, (Sep. 2007).

"Graphical Interface", Royer, [online],[retrieved from the Internet on Oct. 7, 2005], <http://www.cognitive-aptitude-assessment-software.com/Reporting/GraphicalInterface.html>, 2 pages.

Itti, Short Papers, A Model of Saliency-Based Visual Attention for Rapid Scene Analysis, IEEE Transactions on Pattern Analysis and Machine Intelligence, vol. 20, No. 11, pp. 1254-1259, (1998). (XP001203933).

Itti, A Saliency-Based Search Mechanism for Overt and Covert Shifts of Visual Attention, Vision Research vol. 40, pp. 1489-1506, (2000).

Iurgel, Automatic Media Monitoring Using Stochastic Pattern Recognition Techniques, Doctoral Thesis, Munich University of Technology, pp. 1-163, (2005).

Koch, Shifts in Selective Visual Attention: Towards the Underlying Neural Circuitry, Human Neurobiology, vol. 4, pp. 219-227, (1985).

Krebs, A Simple Tool for Predicting the Readability of a Monitor, Proceedings of the Human Factors and Ergonomics Society, pp. 1659-1663, (2002).

Niederhoffer, Linguistic Style Matching in Social Interaction, Journal of Language and Social Psychology, vol. 21, No. 4, pp. 337-360, (Dec. 2002).

Schultz, "Market Research Deserves Blame for Marketing's Decline", Marketing News, Feb. 15, 2005, 3 pages.

"Statement in Accordance with the Notice From the European Patent Office Dated Oct. 1, 2007 Concerning Business Methods", 1 page. (XP002456252).

Tolli, Motivational and Self-Regulatory Responses to Interruptions, Doctoral Thesis, The University of Akron, pp. 1-235, (May 2009).

White, Implicit Feedback for Interactive Information Retrieval, Doctoral Thesis, University of Glasgow, Department of Computing Science, pp. 1-302, (Oct. 2004).

Wolfe, How Might the Rules That Govern Visual Search Constrain the Design of Visual Displays?, SID 00 Digest, pp. 1-3. [Date unknown but believed to be prior to the date of the present application].

Woodside, Measuring Advertising Effectiveness in Destination Marketing Strategies. Journal of Travel Research, vol. 29, No. 2, pp. 3-8, (Aug. 1990).

Search Report for PCTUS2006-048110, 1 page.
Written Opinion for PCTUS2006-048110, 4 pages.
Search Report for PCTUS2006-049657, 2 pages.
Written Opinion for PCTUS2006-049657, 4 pages.
Search Report for PCTUS2006-049662, 2 pages.

Written Opinion for PCTUS2006-049662, 4 pages.
Search Report for PCTUS2008-069068, 3 pages.
Written Opinion for PCTUS2008-069068, 4 pages.
Search Report for PCTUS2008-069076, 3 pages.
Written Opinion for PCTUS2008-069076, 4 pages.
Search Report for PCTUS2008-069077, 3 pages.
Written Opinion for PCTUS2008-069077, 3 pages.
Search Report for PCTUS2010-020006, 3 pages.
Written Opinion for PCTUS2010-020006, 5 pages.

Etsukou Iizuka: Dictionary of Manufacturing Management, Asakura Publishing Co., Ltd, Nov. 1, 1999, first impression of the first edition, pp. 525-534.

Taichiro Ueda: New Data Mining Initiation Course, Data Analysis and Prediction Science, Management Consulting, Japan Small and Medium Enterprise Management Consultants Association, Jun. 1, 2001, vol. 49, No. 6, pp. 78-83.

* cited by examiner

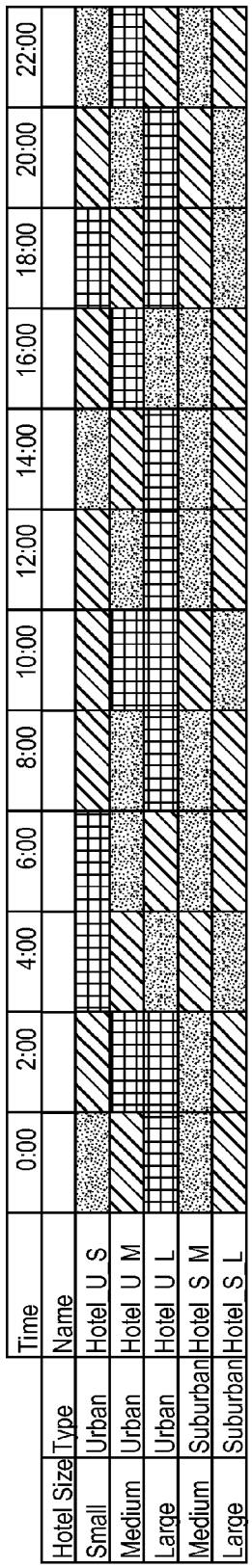
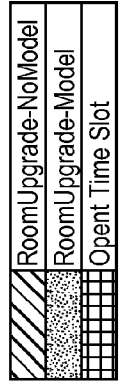
*Figure 10*
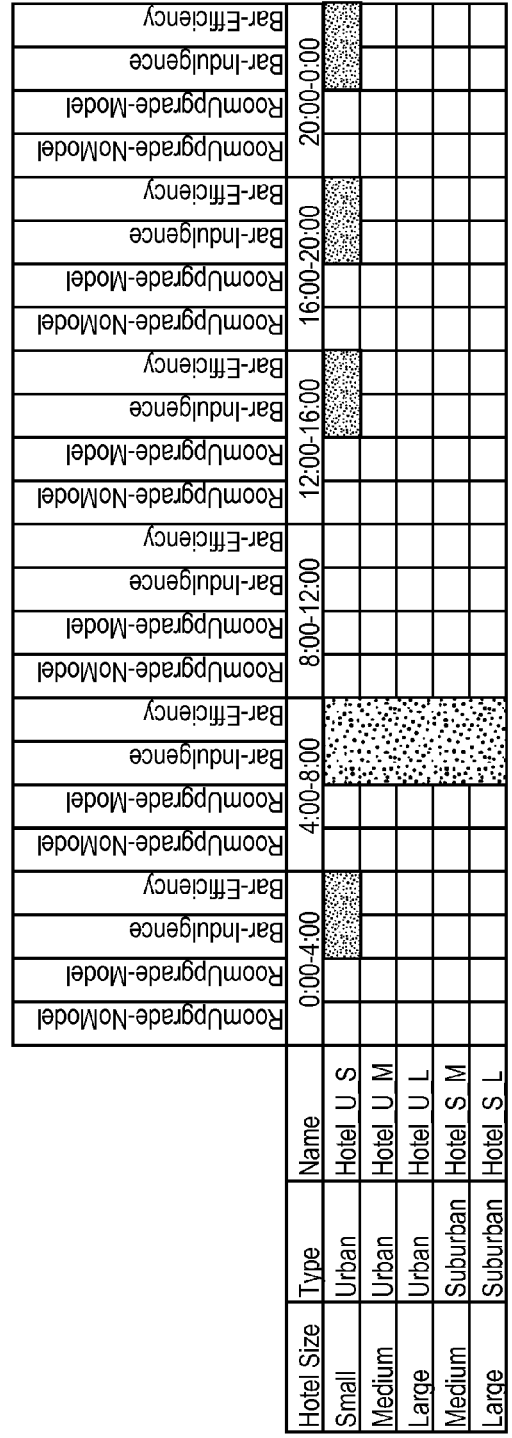
*Figure 11*

| Time | | 0:00 | | 2:00 | | 4:00 | | 6:00 | | 8:00 | | 10:00 | |
|---|---|---|---|---|---|---|---|---|---|---|---|---|---|
| | | Bar-Ind. | Bar-Eff | Bar-Ind. | Bar-Eff | Bar-Ind. | Bar-Eff | Bar-Ind. | Bar-Eff | Bar-Ind. | Bar-Eff | Bar-Ind. | Bar-Eff |
| Hotel_U_S | RoomUpgrade-NoModel | 600 | 600 | 300 | 300 | 1800 | 1800 | 1200 | 1200 | 500 | 500 | 500 | 500 |
| | RoomUpgrade-Model | 900 | 900 | 900 | 900 | 800 | 800 | 1000 | 1000 | 1100 | 1100 | 1000 | 1000 |
| Hoel_U_M | RoomUpgrade-NoModel | 1031.2 | 1047.6 | 1231.2 | 1247.6 | 2231.2 | 2247.6 | 2831.2 | 2847.6 | 1031.2 | 1047.6 | 1131.2 | 1147.6 |
| | RoomUpgrade-Model | 1831.2 | 1847.6 | 1431.2 | 1447.6 | 1831.2 | 1847.6 | 1731.2 | 1747.6 | 1431.2 | 1447.6 | 1631.2 | 1647.6 |
| Hoel_U_L | RoomUpgrade-NoModel | 808.4 | 930.4 | 1008.4 | 1130.4 | 3708.4 | 3830.4 | 1908.4 | 2030.4 | 1008.4 | 1130.4 | 1108.4 | 1230.4 |
| | RoomUpgrade-Model | 2008.4 | 2130.4 | 1808.4 | 1930.4 | 2208.4 | 2330.4 | 2008.4 | 2130.4 | 1808.4 | 1930.4 | 2108.4 | 2230.4 |
| Hotel_S_M | RoomUpgrade-NoModel | 938.4 | 1121.2 | 738.4 | 921.2 | 2138.4 | 2321.2 | 2738.4 | 2921.2 | 938.4 | 1121.2 | 838.4 | 1021.2 |
| | RoomUpgrade-Model | 1638.4 | 1821.2 | 1438.4 | 1621.2 | 1338.4 | 1521.2 | 1438.4 | 1621.2 | 1738.4 | 1921.2 | 1838.4 | 2021.2 |
| Hotel_S_L | RoomUpgrade-NoModel | 1341.2 | 1349.2 | 1341.2 | 1349.2 | 1641.2 | 1649.2 | 3441.2 | 3449.2 | 1441.2 | 1449.2 | 1341.2 | 1349.2 |
| | RoomUpgrade-Model | 1841.2 | 1849.2 | 1741.2 | 1749.2 | 1941.2 | 1949.2 | 1541.2 | 1549.2 | 1941.2 | 1949.2 | 1641.2 | 1649.2 |

| Time | | 12:00 | | 14:00 | | 16:00 | | 18:00 | | 20:00 | | 22:00 | | | |
|---|---|---|---|---|---|---|---|---|---|---|---|---|---|---|---|
| | | Bar-Ind. | Bar-Eff | Bar-Ind. | Bar-Eff | Bar-Ind. | Bar-Eff | Bar-Ind. | Bar-Eff | Bar-Ind. | Bar-Eff | Bar-Ind. | Bar-Eff | Bar-Ind | | |
| Hotel_U_S | RoomUpgrade-NoModel | 400 | 400 | 500 | 500 | 1400 | 1400 | 1000 | 1000 | 700 | 700 | 700 | 700 | Bar-Ind | 0 | |
| | RoomUpgrade-Model | 900 | 900 | 1000 | 1000 | 900 | 900 | 800 | 800 | 1000 | 1000 | 1000 | 1000 | Bar-Eff | 0 | |
| Hoel_U_M | RoomUpgrade-NoModel | 1031.2 | 1047.6 | 931.2 | 947.6 | 2031.2 | 2047.6 | 2231.2 | 2247.6 | 931.2 | 947.6 | 831.2 | 847.6 | Bar-Ind | 1078 | |
| | RoomUpgrade-Model | 1531.2 | 1547.6 | 1531.2 | 1547.6 | 1631.2 | 1647.6 | 1831.2 | 1847.6 | 1831.2 | 1847.6 | 1831.2 | 1847.6 | Bar-Eff | 1119 | |
| Hoel_U_L | RoomUpgrade-NoModel | 1008.4 | 1130.4 | 1308.4 | 1430.4 | 2608.4 | 2730.4 | 2408.4 | 2530.4 | 808.4 | 930.4 | 808.4 | 930.4 | Bar-Ind | 1021 | |
| | RoomUpgrade-Model | 1508.4 | 1630.4 | 1808.4 | 1930.4 | 1808.4 | 1930.4 | 1908.4 | 2030.4 | 1708.4 | 1830.4 | 1808.4 | 1930.4 | Bar-Eff | 1326 | |
| Hotel_S_M | RoomUpgrade-NoModel | 738.4 | 921.2 | 738.4 | 921.2 | 1938.4 | 2121.2 | 1738.4 | 1921.2 | 1138.4 | 1321.2 | 1238.4 | 1421.2 | Bar-Ind | 846 | |
| | RoomUpgrade-Model | 1338.4 | 1521.2 | 1638.4 | 1821.2 | 1738.4 | 1921.2 | 1238.4 | 1421.2 | 1338.4 | 1521.2 | 1838.4 | 2021.2 | Bar-Eff | 1303 | |
| Hotel_S_L | RoomUpgrade-NoModel | 1141.2 | 1149.2 | 841.2 | 849.2 | 2441.2 | 2449.2 | 2441.2 | 2449.2 | 1341.2 | 1349.2 | 1341.2 | 1349.2 | Bar-Ind | 1103 | |
| | RoomUpgrade-Model | 1841.2 | 1849.2 | 2041.2 | 2049.2 | 1941.2 | 1949.2 | 1741.2 | 1749.2 | 2141.2 | 2149.2 | 2241.2 | 2249.2 | Bar-Eff | 1123 | |

*Figure 13*

| Time | | 0:00 | | 2:00 | | 4:00 | | 6:00 | | 8:00 | | 10:00 | |
|---|---|---|---|---|---|---|---|---|---|---|---|---|---|
| | | Bar-Ind. | Bar-Eff | Bar-Ind. | Bar-Eff | Bar-Ind. | Bar-Eff | Bar-Ind. | Bar-Eff | Bar-Ind. | Bar-Eff | Bar-Ind. | Bar-Eff |
| Hotel_U_S | RoomUpgrade-NoModel | 600 | 600 | 300 | 300 | 1800 | 1800 | 1200 | 1200 | 500 | 500 | 500 | 500 |
| | RoomUpgrade-Model | 900 | 900 | 900 | 900 | 800 | 800 | 1000 | 1000 | 1100 | 1100 | 1000 | 1000 |
| Hotel_U_M | RoomUpgrade-NoModel | 1031.2 | 1047.6 | 1231.2 | 1247.6 | 2231.2 | 2247.6 | 2831.2 | 2847.6 | 1031.2 | 1047.6 | 1131.2 | 1147.6 |
| | RoomUpgrade-Model | 1831.2 | 1847.6 | 1431.2 | 1447.6 | 1831.2 | 1847.6 | 1731.2 | 1747.6 | 1431.2 | 1447.6 | 1631.2 | 1647.6 |
| Hoel_U_L | RoomUpgrade-NoModel | 808.4 | 930.4 | 1008.4 | 1130.4 | 3708.4 | 3830.4 | 1908.4 | 2030.4 | 1008.4 | 1130.4 | 1108.4 | 1230.4 |
| | RoomUpgrade-Model | 2008.4 | 2130.4 | 1808.4 | 1930.4 | 2208.4 | 2330.4 | 2008.4 | 2130.4 | 1808.4 | 1930.4 | 2108.4 | 2230.4 |
| Hotel_S_M | RoomUpgrade-NoModel | 938.4 | 1121.2 | 738.4 | 921.2 | 2138.4 | 2321.2 | 2738.4 | 2921.2 | 938.4 | 1121.2 | 838.4 | 1021.2 |
| | RoomUpgrade-Model | 1638.4 | 1821.2 | 1438.4 | 1621.2 | 1338.4 | 1521.2 | 1438.4 | 1621.2 | 1738.4 | 1921.2 | 1838.4 | 2021.2 |
| Hotel_S_L | RoomUpgrade-NoModel | 1341.2 | 1349.2 | 1341.2 | 1349.2 | 1641.2 | 1649.2 | 3441.2 | 3449.2 | 1441.2 | 1449.2 | 1341.2 | 1349.2 |
| | RoomUpgrade-Model | 1841.2 | 1849.2 | 1741.2 | 1749.2 | 1941.2 | 1949.2 | 1541.2 | 1549.2 | 1941.2 | 1949.2 | 1641.2 | 1649.2 |

| Time | | 12:00 | | 14:00 | | 16:00 | | 18:00 | | 20:00 | | 22:00 | |
|---|---|---|---|---|---|---|---|---|---|---|---|---|---|
| | | Bar-Ind. | Bar-Eff | Bar-Ind. | Bar-Eff | Bar-Ind. | Bar-Eff | Bar-Ind. | Bar-Eff | Bar-Ind. | Bar-Eff | Bar-Ind. | Bar-Eff |
| Hotel_U_S | RoomUpgrade-NoModel | 400 | 400 | 500 | 500 | 1400 | 1400 | 1000 | 1000 | 700 | 700 | 700 | 700 |
| | RoomUpgrade-Model | 900 | 900 | 1000 | 1000 | 900 | 900 | 800 | 800 | 1000 | 1000 | 1000 | 1000 |
| Hoel_U_M | RoomUpgrade-NoModel | 1031.2 | 1047.6 | 931.2 | 947.6 | 2031.2 | 2047.6 | 2231.2 | 2247.6 | 931.2 | 947.6 | 831.2 | 847.6 |
| | RoomUpgrade-Model | 1531.2 | 1547.6 | 1531.2 | 1547.6 | 1631.2 | 1647.6 | 1831.2 | 1847.6 | 1831.2 | 1847.6 | 1831.2 | 1847.6 |
| Hoel_U_L | RoomUpgrade-NoModel | 1008.4 | 1130.4 | 1308.4 | 1430.4 | 2608.4 | 2730.4 | 2408.4 | 2530.4 | 808.4 | 930.4 | 808.4 | 930.4 |
| | RoomUpgrade-Model | 1508.4 | 1630.4 | 1808.4 | 1930.4 | 1808.4 | 1930.4 | 1908.4 | 2030.4 | 1708.4 | 1830.4 | 1808.4 | 1930.4 |
| Hotel_S_M | RoomUpgrade-NoModel | 738.4 | 921.2 | 738.4 | 921.2 | 1938.4 | 2121.2 | 1738.4 | 1921.2 | 1138.4 | 1321.2 | 1238.4 | 1421.2 |
| | RoomUpgrade-Model | 1338.4 | 1521.2 | 1638.4 | 1821.2 | 1738.4 | 1921.2 | 1238.4 | 1421.2 | 1338.4 | 1521.2 | 1838.4 | 2021.2 |
| Hotel_S_L | RoomUpgrade-NoModel | 1141.2 | 1149.2 | 841.2 | 849.2 | 2441.2 | 2449.2 | 2441.2 | 2449.2 | 1341.2 | 1349.2 | 1341.2 | 1349.2 |
| | RoomUpgrade-Model | 1841.2 | 1849.2 | 2041.2 | 2049.2 | 1941.2 | 1949.2 | 1741.2 | 1749.2 | 2141.2 | 2149.2 | 2241.2 | 2249.2 |

*Figure 14*

|  |  | Morning | Afternoon | Evening |
|---|---|---|---|---|
| Urban | Content A | $125.00 | $96.00 | $120.00 |
|  | Content B | $90.00 | $125.00 | $90.00 |
|  | Content C | $110.00 | $105.00 | $125.00 |
| Suburban | Content A | $110.00 | $110.00 | $125.00 |
|  | Content B | $100.00 | $125.00 | $121.00 |
|  | Content C | $125.00 | $90.00 | $120.00 |
| Exurban | Content A | $100.00 | $125.00 | $110.00 |
|  | Content B | $111.00 | $91.00 | $125.00 |
|  | Content C | $125.00 | $110.00 | $120.00 |
| Rural | Content A | $125.00 | $90.00 | $120.00 |
|  | Content B | $90.00 | $110.00 | $125.00 |
|  | Content C | $120.00 | $125.00 | $100.00 |

*Figure 18*

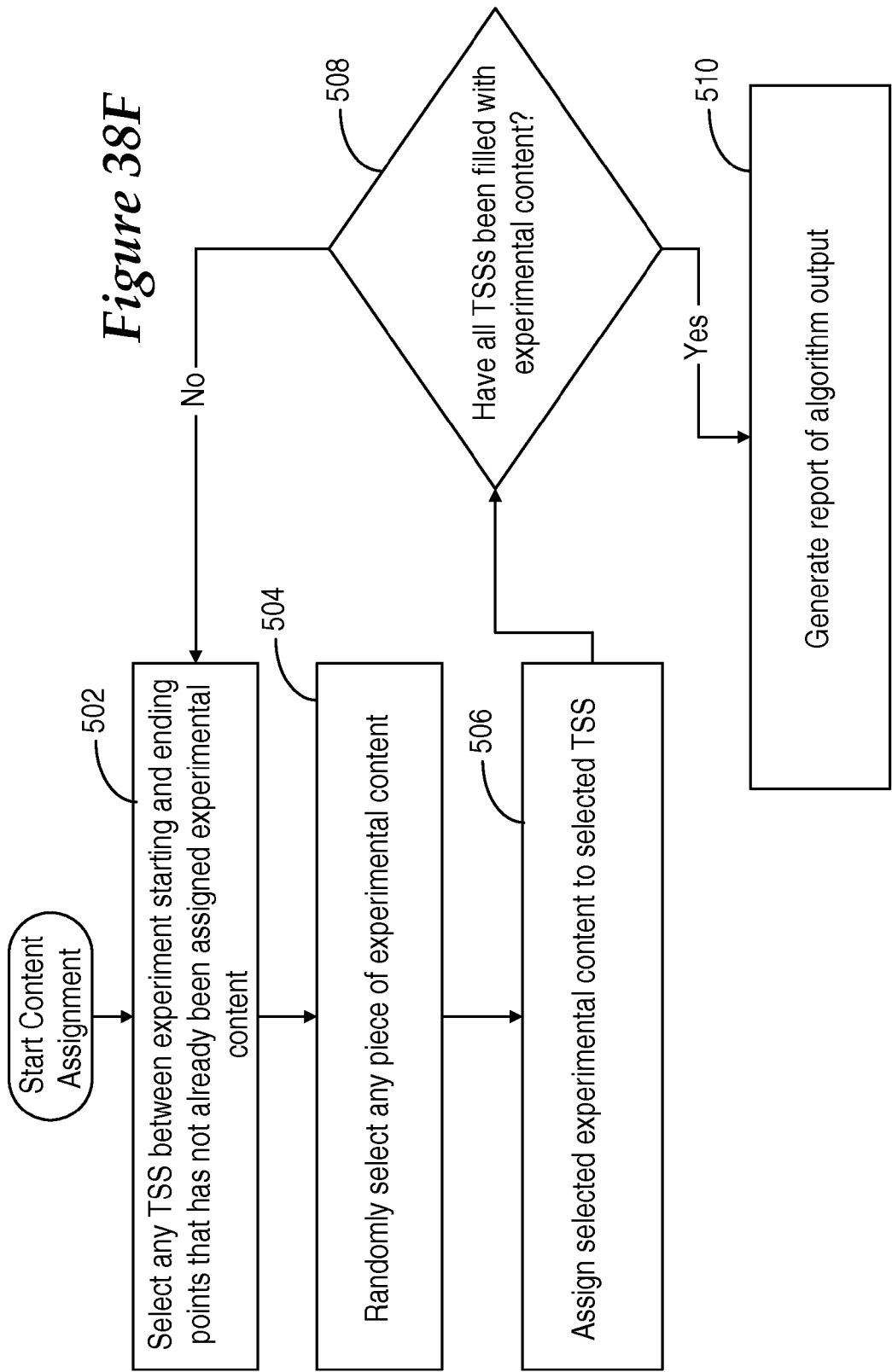

SYSTEM AND METHOD FOR CONCURRENTLY CONDUCTING CAUSE-AND-EFFECT EXPERIMENTS ON CONTENT EFFECTIVENESS AND ADJUSTING CONTENT DISTRIBUTION TO OPTIMIZE BUSINESS OBJECTIVES

CROSS REFERENCE TO RELATED APPLICATION

This application claims the benefit of U.S. Provisional Patent Application No. 61/143,060, filed Jan. 7, 2009, the disclosure of which is incorporated by reference herein in its entirety.

RELATED APPLICATIONS

This application is related to commonly owned U.S. patent application Ser. Nos. 12/166,969; 12/167,002 and 12/166,984, filed on Jul. 2, 2008, which are hereby incorporated herein by reference. This application is also related to U.S. patent application Ser. Nos. 12/159,107 and 12/159,106, filed Dec. 29, 2006, which are hereby incorporated herein by reference.

FIELD OF THE INVENTION

The present invention relates to determining effectiveness of communication content and to optimizing content distribution to enhance business objectives, and, more particularly, to concurrently performing these operations.

BACKGROUND

Visual information in a retail environment often takes the form of advertising content. Such content is inherently persuasive, and is typically designed to influence a viewer's attitudes, perceptions, and behaviors in order to create a positive business impact, such as increasing sales, strengthening brand awareness, or engendering consumer loyalty.

In 2002, for example, total spending on advertising content used in retail environments, commonly referred to as Point of Purchase (POP), was estimated at $17 billion in the United States and exceeded $43 billion per year globally. This level of spending has garnered increasing scrutiny among brand owner executives who are demanding greater accountability for their marketing investments.

The need for measurable performance is increasingly urgent as well, because the average tenure of a Chief Marketing Officer has decreased to an estimated 22.9 months according to industry sources. Marketing leaders thus have precious little time to measurably demonstrate results from their marketing efforts. Marketing research, a sub-set of the research industry, has historically used correlational or matched control studies to evaluate advertising content performance against objectives. However, these "best practice" marketing research methodologies do not reliably reveal causation between the marketing message and the business result, as has been widely commented on by marketing analysis experts (e.g., Don E. Schultz, *Market Research Deserves Blame for Marketing's Decline*, Marketing News, Feb. 15, 2005). Even so, marketing research spending is currently estimated at $8 billion annually in the United States alone, which includes these types of studies.

SUMMARY OF THE INVENTION

The present invention is directed to systems, articles, and computer-implemented methods for assessing effectiveness of communication content and optimizing content distribution to enhance business objectives. Embodiments of the present invention are directed to computer-implemented methods for a computer-implemented method, comprising conducting an experiment using experimental content to determine effectiveness of communication content and executing, while conducting the experiment, a machine learning routine (MLR) using MLR content to enhance an effectiveness metric.

Another embodiment is directed to a computer-implemented method, comprising generating a plurality of schedules each unrelated to one another and each comprising a plurality of time periods for presenting content and collecting data indicative of content effectiveness. The method also includes using a digital signage network comprising a plurality of geographically disparate displays and the plurality of schedules for concurrently conducting at least two cause-and-effect experiments on effectiveness of communication content that ensures that experimental content of the communication content are not confounded using at least two of the plurality of schedules, concurrently executing at least two machine learning routines (MLR) using MLR content to enhance a predetermined business goal using at least two of the plurality of schedules, or conducting at least one of the cause-and-effect experiments while executing at least one of the machine learning routines using at least two of the plurality of schedules.

Another embodiment is directed to a computer-implemented method, comprising receiving a viewer visit duration (VVD) for viewers at a location where content is to be presented, generating a schedule comprising a plurality of time periods for implementing a machine learning routine (MLR) based, in part on the VVD and an effectiveness metric. Then, the MLR is executed, using a digital signage network comprising a plurality of geographically disparate displays, in accordance with the schedule to determine effectiveness of the MLR content.

Another embodiment is directed to a computer-implemented method, comprising performing an evaluation to determine, for any given time period, if using experimental content has more value than using MLR content for the time period. Content is then assigned to the time period based on the result of the evaluation.

Another embodiment is directed to a computer-implemented method, comprising receiving data gathered in accordance with a schedule comprising a plurality of time-slot samples and executing a machine learning routine (MLR) using content collected from within time-slot samples to enhance an effectiveness metric.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 10 illustrates a playlist schedule for testing the effectiveness of different content at different display locations to enhance a predetermined business goal for an illustrative deployment scenario in accordance with embodiments of the present invention;

FIG. 11 is an illustration that shows content restrictions for the different display sites and time periods of the scenario depicted in FIG. 10;

FIG. 13 shows historical data collected by the content distribution optimization routine for the scenario depicted in FIGS. 10-12;

FIG. 14 shows the expected return-on-investment for each of the time periods shown in the schedule of FIGS. 10-12;

FIG. 18 shows data of another illustrative deployment scenario that demonstrates that optimization routines of the present invention can generate a significant improvement in return-on-investment by optimizing over content, daypart, and location;

FIG. 38F illustrates processes of an algorithm that assigns content to time-slot samples for testing the relative effectiveness of the content in accordance with embodiments of the present invention;

Figure 1:
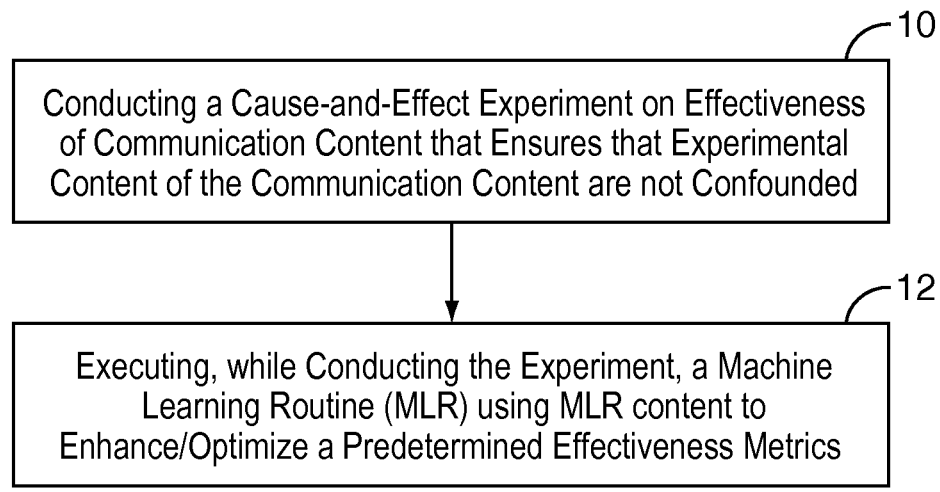
FIG. 1 is a flow chart that illustrates processes for concurrently conducting cause-and-effect experiments on content effectiveness and automatically adjusting content distribution patterns to enhance effectiveness metrics in accordance with embodiments of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

Embodiments of the present invention are generally directed to computer-implemented systems and methods for assessing effectiveness of communication content and optimizing content distribution to enhance business objectives. Particular embodiments are directed to concurrently executing communication content effectiveness assessments, preferably using cause-and-effect experiments, and optimizing content distribution patterns that maximize one or more effectiveness metrics (point-of-purchase sales, upgrades, customer loyalty, etc.) that maintains the validity of the cause-and-effect experiments. In general terms, cause-and-effect experiments are controlled experiments in which appropriate balancing, counterbalancing, blocking, randomization, and meeting necessary sample size requirements are used to ensure confound-free results. Effectiveness metrics refer to measured results of consumer behavior. Representative effectiveness metrics include sales, customer loyalty, upgrades, brand perception, and other measurable elements of a particular business goal.

Business goals refer to a general category of a viewer behavior that specifies a relationship between experiencing a piece of content and responding to the content. Representative examples of business goals include "Bar Sales," "Room Upgrades," and "Package Food Sales." Other business goals include influencing attitudes and beliefs about brands and products and/or influencing foot traffic patterns within an establishment. A business goal is associated with at least one effectiveness metric (e.g., number of room upgrades), but there may be a collection of effectiveness metrics for a particular business goal (e.g., preferred customer upgrades, new customer upgrades, complimentary upgrades). A business objective often relates to multiple business goals and may change over time. For example, this week a user may have the objective of maximizing both room upgrades and bar sales. Next week, the objective may change to maximizing room upgrades while controlling bar sales.

Various embodiments of the invention are directed to scheduling content distribution and determining, for each time period of the schedule, whether to utilize each time period for conducting a cause-and-effect experiment or optimizing content distribution patterns that maximize one or more effectiveness metrics in a manner that maintains the validity of the cause-and-effect experiment. For purposes of the present disclosure, a schedule may be a static plan or a continuously and dynamically updated plan. Scheduling methodologies consistent with embodiments of the invention typically involve making such determinations on a display-by-display basis for each time period of the schedule. In certain embodiments of the invention, time periods of a schedule correspond to time-slot samples as described herein and in commonly owned U.S. patent application Ser. No. 12/166,984. Scheduling methodologies consistent with these embodiments may further involve dynamically adjusting the schedule on a per-time period basis to achieve user-specified requirements (e.g., desired balance of experimentation vs. content distribution optimization). According to some embodiments, systems and methods may be implemented that constantly analyze whether, for a given time period, a display should be "under the control" of a cause-and-effect experiment system or under the control of a machine learning system given the cost of using a particular time period on each display for experiments relative to a lost opportunity of using the same time period on each display for enhancing a predetermined business goal by execution of the machine learning routine.

Systems and methods of the present invention can be implemented to execute various types of machine learning routines to enhance or optimize one or more effectiveness metrics. In general terms, a machine learning routine refers to a computer-implemented methodology for learning the relationships between actions (e.g., content), states (e.g., sign location, time-of-day, etc.) and rewards (e.g., sales, upgrades, etc.). Representative examples of useful machine learning routines include a reinforcement learning routine, logistic regression routine, unsupervised learning routine, semi-supervised routine, or use of one or more neural networks. Other machine learning routines that may be used include transduction, genetic algorithms, support vector routines and learning-to-learn routines, among others.

One particular machine learning methodology, reinforcement learning, has been found to be particularly useful in the context of various embodiments of the present invention. Reinforcement learning allows systems, machines, and software agents to automatically maximize performance for a particular problem space. Many different algorithms can be developed to implement a reinforcement learning routine. Reinforcement learning can be applied to problems in which there are states, actions, and rewards. The states refer to identifiable properties that are not under the control of the algorithm in which the problem can exist (e.g., time-of-day, display location, weather, etc.). Actions refer to the elements that are under the control of the algorithm (e.g., content to display). Rewards are the measurable responses (e.g., point-of-purchase sales) to the actions generated by the algorithm given the state when those actions were executed.

Reinforcement algorithms are designed to learn the relationship between actions, states, and rewards. More generally, the reinforcement learning algorithms (and machine learning in general) learns an expected outcome (reward) that will be generated when the system is in a particular state and a particular action is generated. Under many real world conditions, the relationship between rewards, states, and actions is probabilistic and thus the resulting reward, given a particular action and state, will vary from trial-to-trial.

For a given problem, the reinforcement algorithm is programmed to learn the relationship between the states, actions, and rewards by testing different actions in the different states and recording and analyzing the resulting rewards. The result is a prediction of the expected reward for executing each action for each state. Because the system is constantly evaluating the expected reward for an action for a given state, the model can learn to maximize the expected reward for a static state problem (i.e., a system in which the reward for an actions/state pair remains constant) and it can also adapt to a dynamic state problem (i.e., one in which the reward for a particular action/state pair changes over time). Under some conditions, a reinforcement learning algorithm will converge to a global optimum.

In accordance with embodiments of the invention that employ reinforcement routines, the state may be defined by the time-of-day, the type of store, and the geographical location of the business or any other state dependent variables. For example, a particular state may be defined by the time-of-day of the display period (e.g., 9:00-9:30 AM), the type of store (e.g., urban) and the geographical location (e.g., Midwest). The actions relate to distributing specific pieces of content available to the algorithm. The rewards are the effectiveness metrics (individual or combinations of specific effectiveness metrics) and may include point-of-purchase sales, loyalty data, upgrades, etc.

A reinforcement learning routine of the present invention typically involves an explore routine and an exploit routine. It is noted that some implementations may use only one of these two routines or may select between these two routines. Exploit generally relates to showing the content that the machine learning algorithm predicts will produce the largest reward given the current state. Explore generally relates to showing content that is not predicted to produce the largest reward with the goal of learning, updating, and/or verifying the expected reward of that content for the current state. The goal of the reinforcement routines is to provide an understanding of the relationship between the states, actions, and rewards.

Embodiments of the present invention are directed to systems and methods that facilitate user input of data associated with one or more hypotheses for a cause-and-effect experiment and data associated with one or more business goals. After entry of these and any other necessary data, processes of the present invention are executed to ensure that, for each time period of a playlist schedule and for each display of a network of displays, that the system will work to maximize the utility of the network to achieve the user's requirements indicated by the user's input data. The user need not be further involved in these processes unless involvement is desired. The user may, for example, query the system to determine the status of the network display with high resolution (e.g., the state of the network displays can be resolved to a single time period of the schedule) and, if desired, implement changes to these processes, such as by terminating an experiment or increasing the amount to time periods allocated to explore and/or exploit routines.

Some embodiments of the invention are directed to systems and methods for implementing optimization of content distribution to maximize business objectives exclusive of conducting communication content effectiveness assessments. Other embodiments involve optimization of content distribution to maximize business objectives and optionally invoking cause-and-effect experimentation if factors indicate the desirability of such experimentation.

Various embodiments of the present invention are directed to systems and methods for executing machine learning routines via a digital signage network. Some embodiments involve generating a playlist schedule comprising machine learning routine (MLR) content assigned to time-slot samples, and executing machine learning routines using the time-slot samples. Particular embodiments involve use of reinforcement learning routines and generating a playlist schedule comprising reinforcement learning content assigned to time portions (e.g., time-slot samples) of the playlist schedule. Playlist schedules according to these embodiments are preferably executed via a digital signage network to optimize content distribution patterns that maximize one or more effectiveness metrics, such as point-of-purchase sales, upgrades, and customer loyalty, and the like.

These and other embodiments of the invention may be implemented via a computer controllable, multiple-location content presentation infrastructure, such as a digital signage network. It is understood that embodiments of the invention are not limited to visual media, but may involve aural, tactile, or other sensory media alone or in combination with visual media.

Turning now to FIG. 1, there is shown a flow chart that illustrates processes for concurrently conducting cause-and-effect experiments on content effectiveness and automatically adjusting content distribution patterns to enhance effectiveness metrics in accordance with embodiments of the present invention. Embodiments according to FIG. 1 involve conducting 10 a cause-and-effect experiment on effectiveness of communication content that ensures that experimental content of the communication content are not confounded. Embodiments according to FIG. 1 further involve executing 12, while conducting the experiment, a machine learning routine that distributes content to maximize a predetermined set of rewards (i.e., effectiveness metrics).

Figure 2:
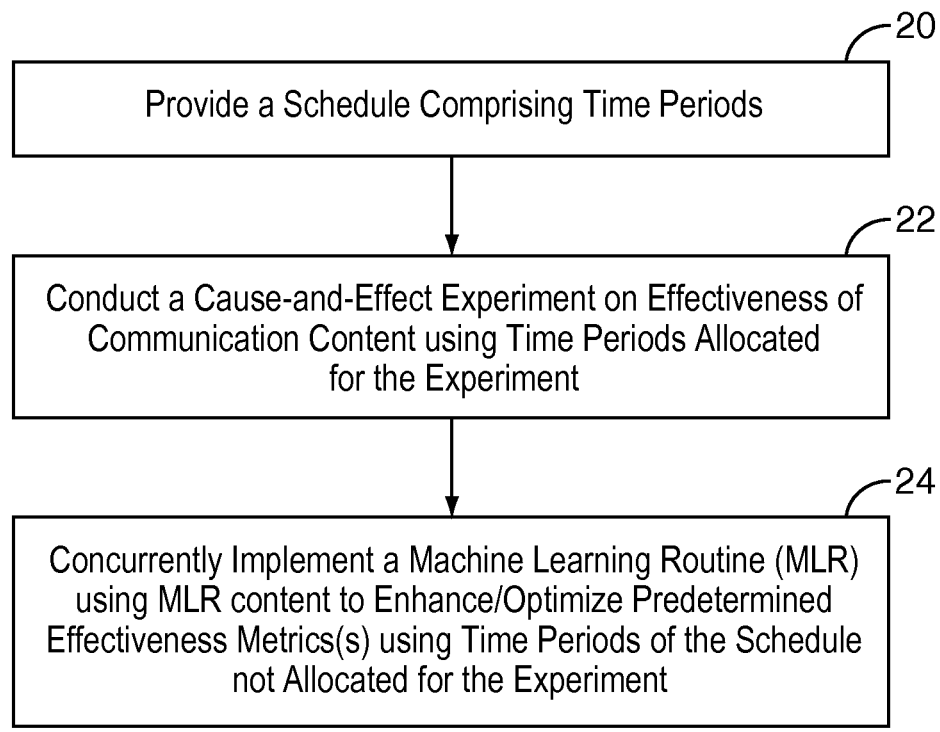
FIG. 2 is a flow chart that illustrates processes for concurrently conducting cause-and-effect experiments on content effectiveness and automatically adjusting content distribution patterns to enhance effectiveness metrics in accordance with other embodiments of the present invention.

FIG. 2 shows a flow chart that illustrates processes for concurrently conducting cause-and-effect experiments on content effectiveness and automatically adjusting content distribution patterns to enhance business objectives in accordance with other embodiments of the present invention. Embodiments according to FIG. 2 involve providing 20 a schedule comprising time periods, and conducting a cause-and-effect experiment on effectiveness of communication content using time periods allocated for the experiment. Processes according to FIG. 2 further involve concurrently implementing a machine learning routine using MLR content to enhance or optimize predetermined effectiveness metrics using time periods of the schedule not allocated for the experiment. MLR content refers to the collection of content that is available for consideration by the MLR algorithm. It may include content that is specifically designed for the MLR, experimental content, or any other content.

Figure 3:
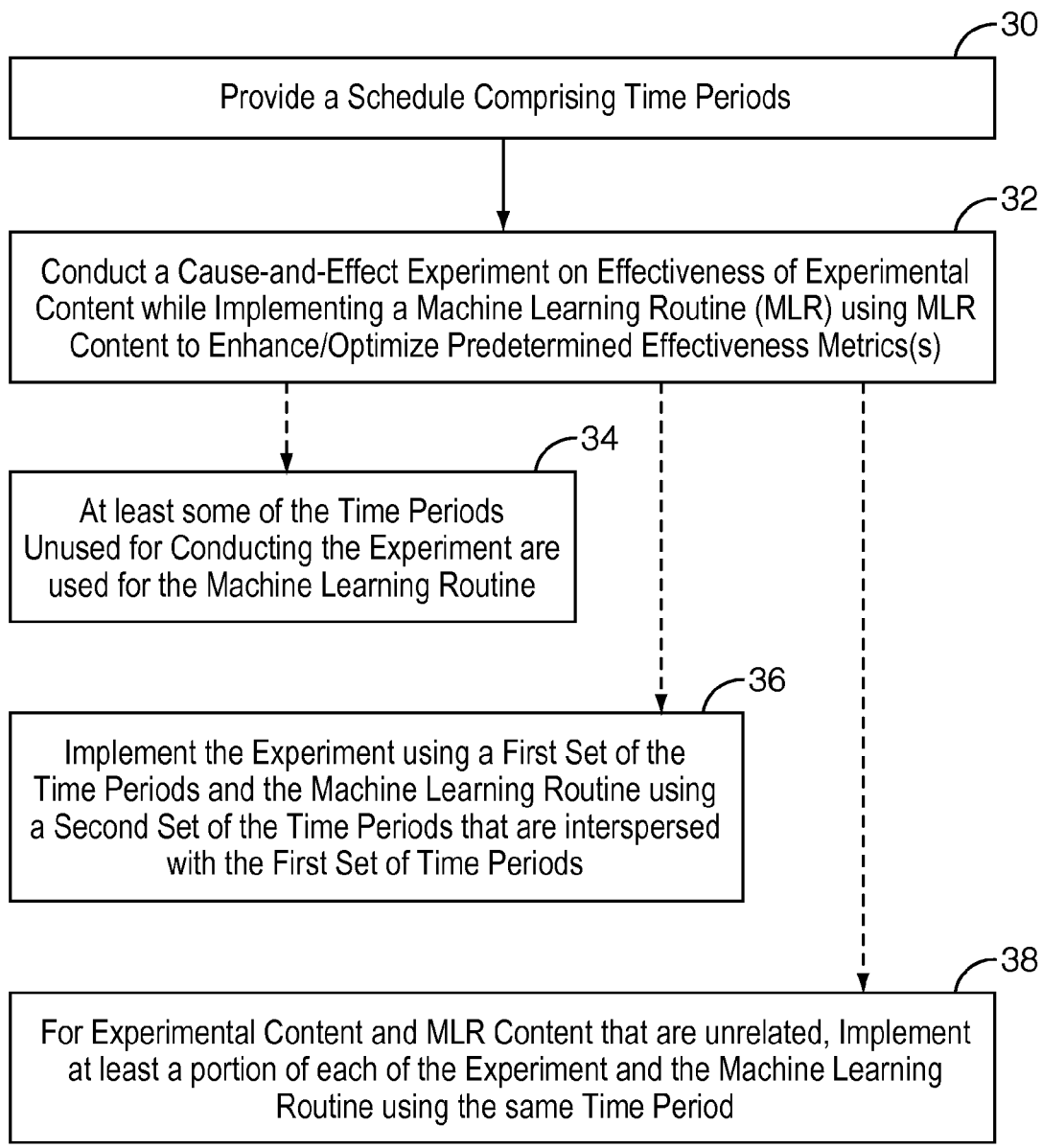
FIG. 3 shows several non-limiting examples of temporal relationships between conducting cause-and-effect experiments and optimizing effectiveness metrics in accordance with embodiments of the invention.

FIG. 3 shows several non-limiting examples of temporal relationships between conducting cause-and-effect experiments and optimizing business content in accordance with embodiments of the invention. Embodiments according to FIG. 3 involve providing 30 a schedule comprising time periods to which communication content can be assigned. Processes according to FIG. 3 further involve conducting 32 a cause-and-effect experiment on effectiveness of experimental content while implementing a machine learning routine using MLR content to enhance/optimize one or more predetermined effectiveness metrics. The temporal overlap between implementing cause-and-effect experiments and optimizing the distribution of content may take several forms.

For example, and as also shown in FIG. 3, at least some of the time periods of the schedule that are unused for conducting one or more experiments may be used 34 for executing one or more machine learning routines. According to another approach, an experiment(s) may be conducted using a first set of time periods of the schedule while a second set of time periods of the schedule interspersed with the first set of time periods may be used 36 for executing a machine learning routine(s). It is understood that more than two sets of time periods may be allocated for concurrently conducting one or a multiplicity of experiments and one or a multiplicity of machine learning routines. According to a further approach, for experimental content and MLR content that are unrelated, at least a portion of each of an experiment(s) and a machine learning routine(s) may be implemented using the same time period or periods.

The approaches shown in FIG. 3 and other alternative approaches can be implemented individually or in various combinations. Also, multiple schedules may be provided and used to implement the approaches shown in FIG. 3 (and in other Figures) in a manner that ensures the integrity of cause-and-effect experimentation while concurrently using machine learning routines to maximize effectiveness metrics.

Traditional approaches known in the art have heretofore been unable to conduct a confound-free cause-and-effect experiment while concurrently executing a machine learning routine as depicted in FIGS. 1 and 2. Conducting a cause-and-effect experiment in the context of digital signage networks (DSNs), for example, generally involves implementing carefully designed, controlled and conducted performance evaluations (experiments) that measure the impact of digitally delivered messages on specific dependent variables (i.e., consumer behavior). These results generate insights about specific independent variables of interest (e.g., message type, message form) for particular dependent variables (e.g., metrics such as upgrades, product sales, etc.) that are of interest to the user. These insights are generated by carefully scheduling content on the user's network that provide confound-free results to the user. Conventional approaches have been unable to facilitate cause-and-effect experimentation while at the same time facilitate execution of optimization routines to automatically maximize pre-specified effectiveness metrics.

In some embodiments, methods of the invention are performed using an experiment, such as a cause-and-effect experiment as described herein. In other embodiments, methods of the invention are performed using other types of experiments, such as quasi-experiments or correlational designs.

Previously, users have had to choose between these alternatives when using prior art approaches is because cause-and-effect experiments requires content to be distributed very precisely, such that confounds are minimized or eliminated within the experiment. By contrast, optimization routines continuously adjust content distribution to maximize a function (e.g., total revenue), and do so without any mechanism to ensure that confounds are not being inserted in the content distribution schedule. As such, conventional implementations require end users to choose between either using a system that distributes content for cause-and-effect results or a system that automatically maximizes specific effectiveness metrics.

Figure 4:
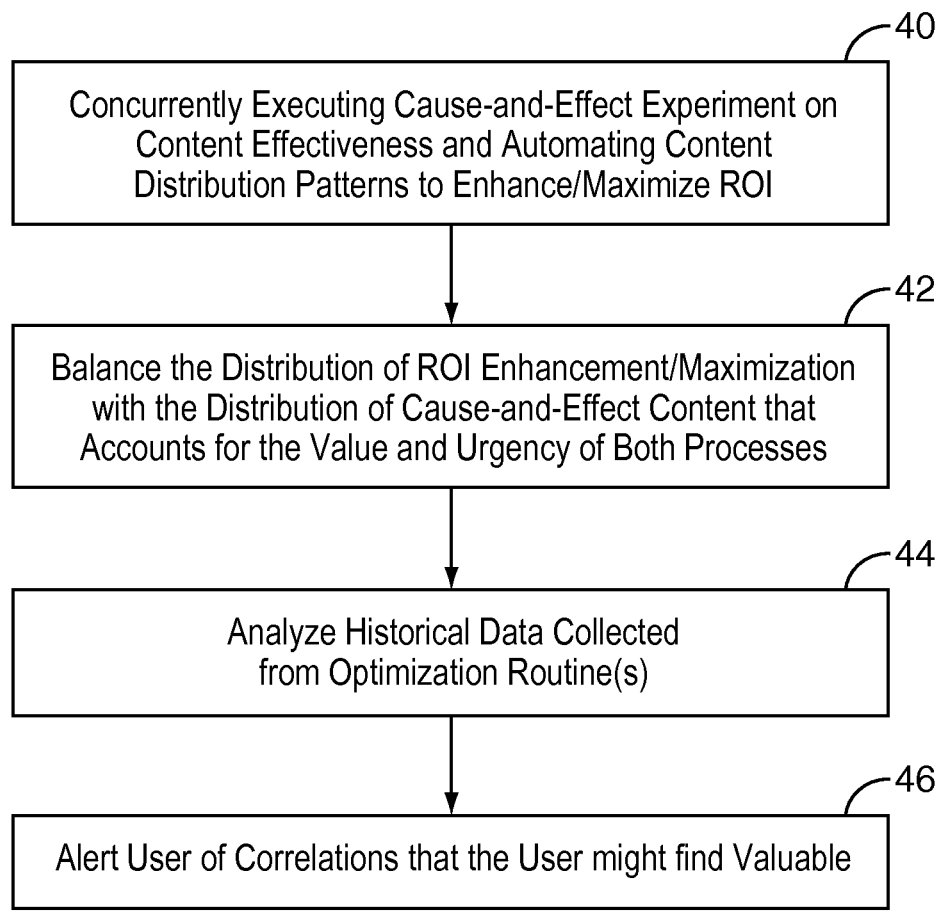
FIG. 4 is a flow chart that illustrates processes for concurrently conducting cause-and-effect experiments on content effectiveness and automatically adjusting content distribution patterns to enhance effectiveness metrics in a manner that accounts for value and urgency of both processes in accordance with embodiments of the present invention.

Embodiments of the present invention are directed to systems and methodologies that, simultaneously across a network of displays, provide the integrity of a cause-and-effect experimentation while facilitating use of optimization routines that maximize effectiveness metrics. Embodiments, such as that illustrated in FIG. 4, are directed to concurrently executing 40 cause-and-effect experiments on content effectiveness in addition to automating content distribution patterns to maximize consumer metrics. Embodiments of the invention may further involve balancing 42 the distribution of return-on-investment (ROI) maximization with the distribution of cause-and-effect content that takes into account the value and the urgency of both of these components. The balancing of these components takes into account the predicted opportunity cost for distributing cause-and-effect experimental content during a time period instead of MLR content that will maximize specific effectiveness metrics. The system will select time periods that will maintain the integrity of the experiment (e.g., appropriate counterbalancing and statistical assumptions necessary for the inferential statistics) that minimizes the opportunity costs associated with the experiment.

Opportunity cost reductions may come in many forms, including, but not limited to, designing an experiment with unequal number of samples in different conditions based upon the value/priority of questions that the experimenter is interested in answering, the cost of using specific samples, and providing on-going cost analysis to determine the expected cost versus benefit for finding a reliable effect given the current results (i.e., means and variances of the different conditions) and specifying a stopping rule based upon statistical properties such as power and effect size. Embodiments of the invention include optimizing the allocation of samples to the cause-and-effect experiments and the MLR routines that minimize the cost associated with the cause-and-effect experiments and maximize the expected reward from the MLR routines.

Because the MLR routines are learning the relationship between the states, actions and rewards, ultimately a very rich historical database will exist. In addition to using this database for predicting the best action (i.e., content) to assign to a particular time period on a particular digital display, this historical database can be used to provide the user with alerts to particular relationships in the data that the user may be interested in knowing and/or testing. Because these relationships are not generated using experimental design, under most conditions they will be simple correlations between independent and dependent variables. These correlation results do not provide the user with cause-and-effect results, but simply a relationship between the independent and dependent variables.

Because the system is learning relationships between the states and the content, there will be a very large set of relationships that will be available. One method for rapidly filtering through these possible relationships is to query the user about the relationships that they find interesting and/or valuable. By querying the user about relationships that are valuable, the system can constantly be analyzing the historical data for valuable relationships. The user can be alerted about specific relationships in the data and given the option to run a cause-and-effect experiment testing the causal effects of the independent variables on the dependent variables, and/or, the user can indicate that the system should automatically design and run an experiment that is valuable and meets specific criteria (e.g., predicted cost).

Those skilled in the art will readily understand that the terms "optimize," "optimization," "maximize," and similar superlatives in the context of the present invention are not absolute terms. Rather, such terms describe the process of either minimizing or maximizing a value based upon the current constraints of the problem. For example, when optimizing the content distribution pattern, the system constantly monitors the performance of the actions that are available to it (i.e., the content that can be assigned to a schedule) and assigns the content that, given its current knowledge, will maximize a particular value. But because the optimization, or maximization routines, are working in a problem space that is highly dynamic and the specific underlying function is unknown, the system is constantly in a state of uncertainty with respect to which action will actually minimize or maximize the objective function. These terms are used commonly in the technical literature relating to machine learning. Therefore, in the context of the presently claimed subject matter, terms such as optimize or maximize are synonymous with terms indicative of enhancement, betterment, improvement, increase, advancement, and the like.

Figure 5:
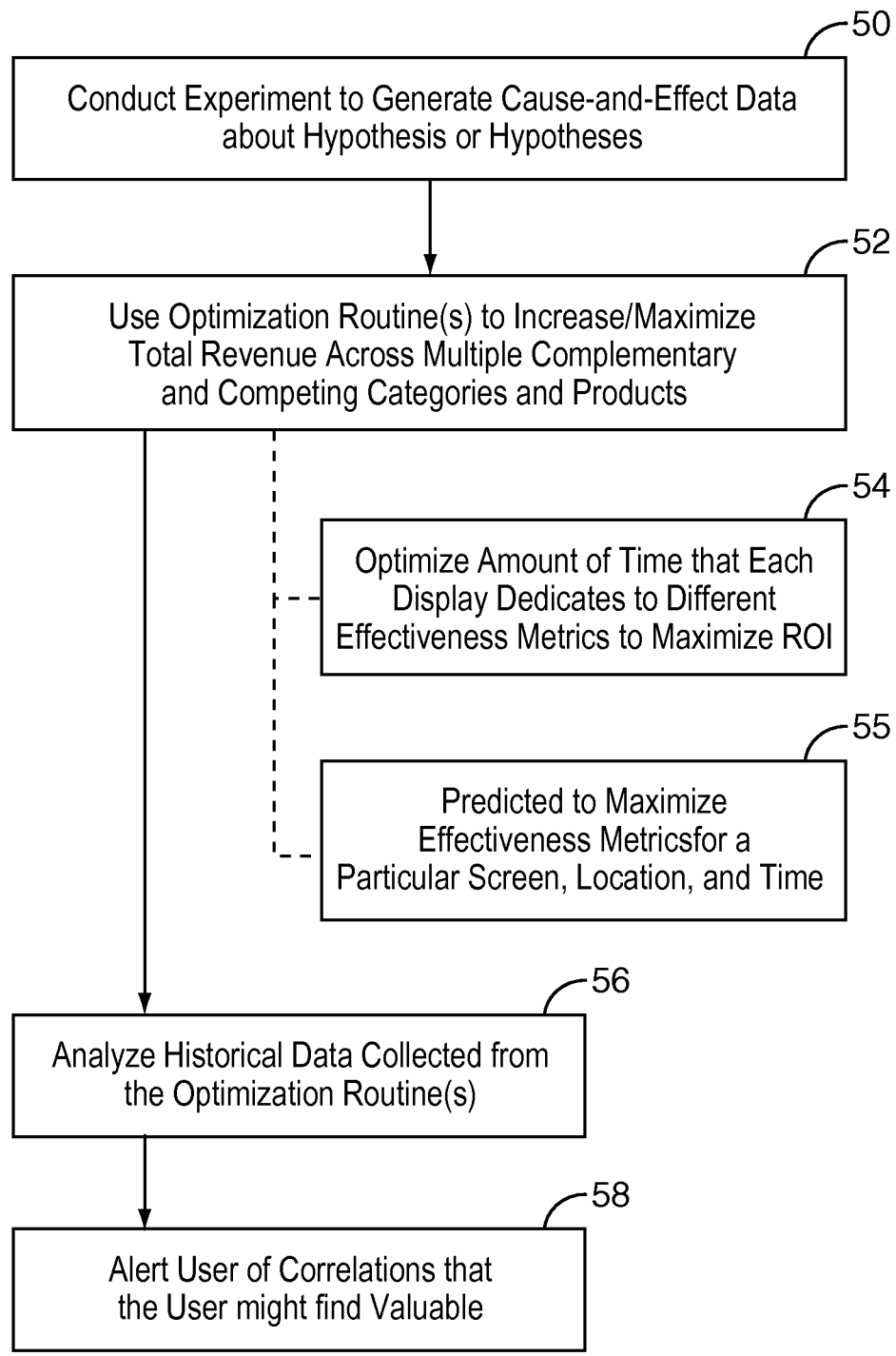
FIG. 5 is a flow chart illustrating a content-distribution and return-on-investment optimization methodology that uncovers correlations of potential value to a user in accordance with embodiments of the present invention.

FIG. 5 is a flow chart illustrating a content-distribution methodology that may be implemented by data processing systems for continuously adjusting content distribution patterns for digitally distributed media, such as digital signs of a digital signage network. Embodiments according to FIG. 5 involve conducting 50 experiments to generate cause-and-effect data about hypotheses entered into the system by a user (e.g., does having images of people in content impact sales?).

Embodiments according to FIG. 5 further involve using 52 optimization routines, while conducting experiments 50, to maximize total revenue across multiple complementary and competing categories and products.

An example of complementary products is shampoo and conditioner. That is, if the customer is driven to purchase shampoo, they are also more likely to buy conditioner. An example of competing products is pre-packaged food versus in-store prepared food. If the customer is driven to buy in-store prepared food, they will be less likely to buy pre-packaged food. By using multiple effectiveness metrics (e.g., shampoo sales, conditioner sales, prepared food sales and packaged food sales) and specifying the relative value of these effectiveness metrics, the MLR learns maximize an objective function that takes into account these competing and complementary consumer behaviours.

Use of optimization routines 52 to increase or maximize the objective function across multiple effectiveness metrics typically involves optimizing 54 the amount of time that each display of a digital display network dedicates to different content messages, and showing 55 versions of content that are predicted to maximize the effectiveness metrics (or objective function) for a particular screen, location, and time. An objective function refers to a set of relative values for each of the different consumer metrics. This is used by the MLR to predict which piece of content will be the most effective for a particular state (display location, time-of-day, etc.). It is also used by the cause-and-effect experiment distribution system to determine the opportunity costs associated with an experiment to optimize the experimental design and select the set of samples (time periods) that will minimize the overall cost of the experiment.

Embodiments according to FIG. 5 also involve analyzing 56 historical data collected from the optimization routines and alerting 58 the user of correlations that the user might find valuable. An example of such a correlation is showing content with people is correlated with increased sales in the morning, but showing content without people is correlated with increased sales in the evening.

Figure 6:
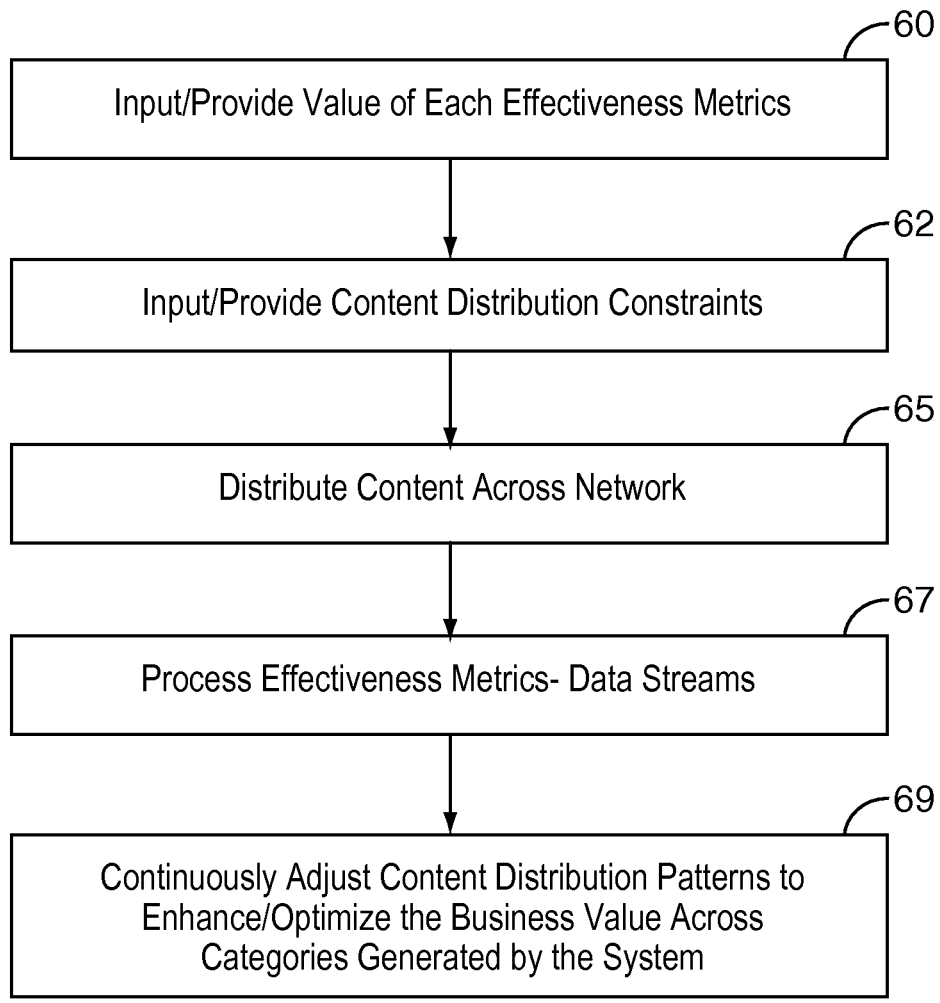
FIG. 6 illustrates processes implemented via a user interface of a digital signage network for receiving input data from a user that is used to generate an optimized schedule for presenting content on a digital signage network that maximize return on investment in accordance with embodiments of the present invention.

FIG. 6 illustrates processes implemented via a user interface of a digital signage network for receiving input data from a user which may then be provided to a DSN system processor. This input data is provided to an algorithm that generates a schedule for distributing content on a digital signage network that is predicted to maximize the effectiveness metrics (or objective function). According to the embodiment shown in FIG. 6, the value of each effectiveness metric (e.g., revenue vs. guest/shopper experience) is input/provided 60 to an optimization algorithm processor to provide an objective function. One or more content distribution constraints (e.g., do not show content X on Display Y at time Z) are input/provided 62 to the processor. Each category of business objective may have one or more effectiveness metrics. The value of each effectiveness metric within each category of business objective (e.g., profit generated by selling different products, the value of different experimental hypotheses) is input/provided 64 to the processor.

A content distribution and data processing module or processor is configured to distribute 65 content across the network and process 67 effectiveness metrics in the form of data streams (e.g., point-of-sale data). The content distribution and data processing module is configured to continuously adjust 69 content distribution patterns in order to learn the relationship between the content (e.g., actions) and the states (e.g., display properties) and maximize the objective function that is specified by the relative values on the different effectiveness metrics.

Figure 7:
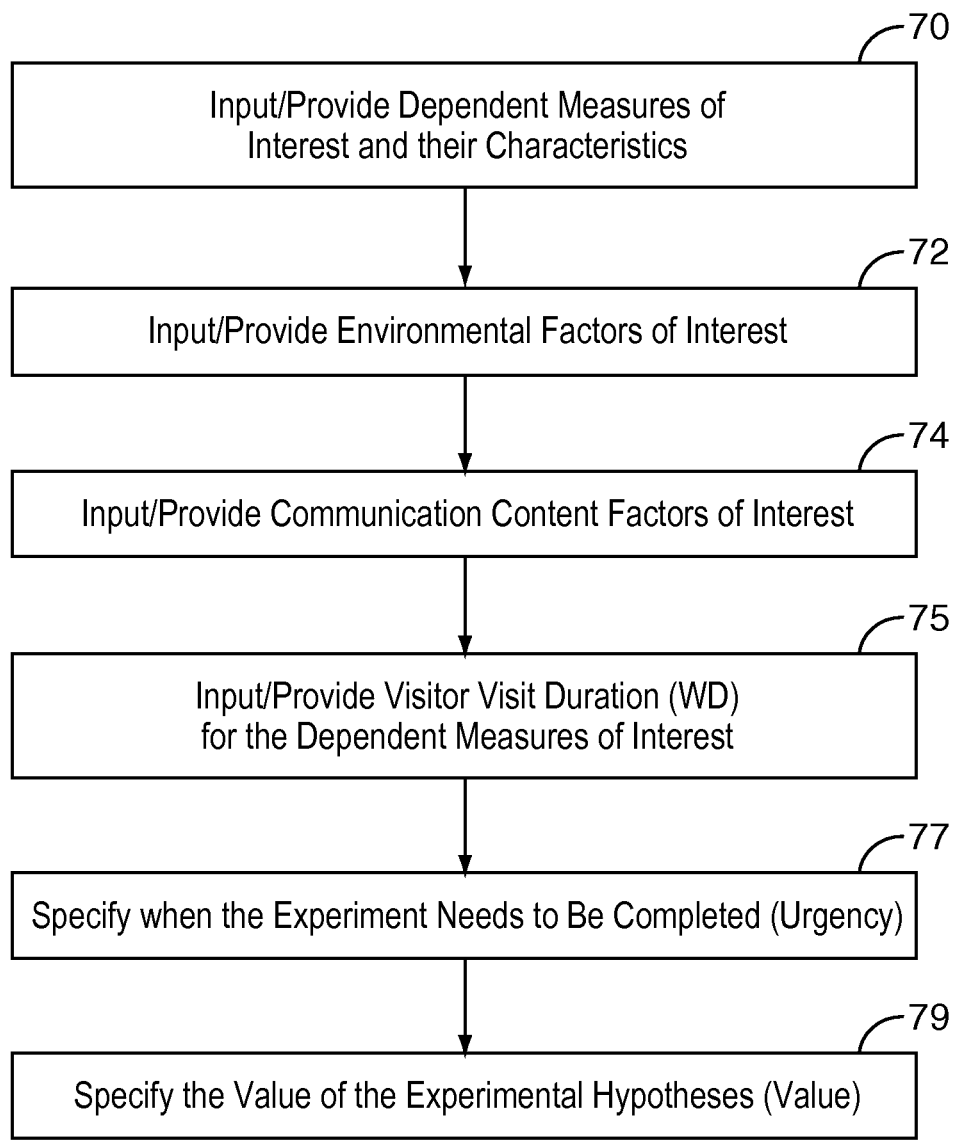
FIG. 7 is a flow chart showing processes implemented via a user interface of a digital signage network for receiving input data from a user that is used to generate an optimized schedule for presenting content on a digital signage network that maximize return on investment in accordance with other embodiments of the present invention.

The following scenario represents one of many possible implementations in accordance with embodiments of the invention. The following representative processes are implemented by a system of the present invention that is capable of measuring the effects of content on effectiveness metrics. The system is preferably configured to generate the necessary conditions for distributing the content to run a controlled cause-and-effect experiment preferably in a manner described hereinbelow. The following components of the experiment would be entered into the system by the user, as is shown in FIG. 7:

EXAMPLE #1

1. What are the dependent measures of interest and what are their characteristics? Input/provide 70 these dependent measures.
   a. e.g., overall sales, room upgrades, bar sales, etc.
2. What environmental factors are of interest? Input/provide 72 these factors.
   a. e.g., hotel size, hotel location, etc.
3. What content factors are of interest? Input/provide 74 these factors.
   a. e.g., content that differs on background color.
   b. content that differs in tactical message (e.g., indulge vs. efficiency).
4. What are the visitor visit duration (VVD) for the dependent measures of interest? Input/provide 75 VVD.
   a. the VVDs define the longest (or typical) period of time that an observer can experience the digital content and the time that they could act on the content.
   b. the VVDs are used to define time-slot samples (TSS) that specify independent periods of time for running a condition of a particular study.
5. Experiment Urgency/Value:
   a. specify 77 when the experiment needs to be completed.
   b. specify 79 the value of the experimental hypotheses (e.g., how much would the user pay to know whether the hypothesis is true).

These dependent and independent variables (i.e., environmental and content factors) are used by the system to design a specific experiment in a manner as described hereinbelow. The system algorithm(s) receive the data that is defined above and assign content to different TSSs such that certain factors are precisely controlled and other factors are randomized (e.g., that which version of content is shown is randomized across occupancy levels). For many experiments, only a certain amount of display time is necessary for the experiment, thus leaving certain time periods (e.g., TSSs) "open." For purposes of clarity, the term "open" as used in the preceding sentence refers to the present availability of a given time period (e.g., TSS) to be used for a purpose other than for the experiment (e.g., a machine learning routine). However, for a given time period, a particular "business goal" may be "open." In this context, for example, if a time period (e.g., TSS) is being used to evaluate a particular business goal, such as Upgrades, another business goal, such as Bar Sales, is "open."

Figure 8:
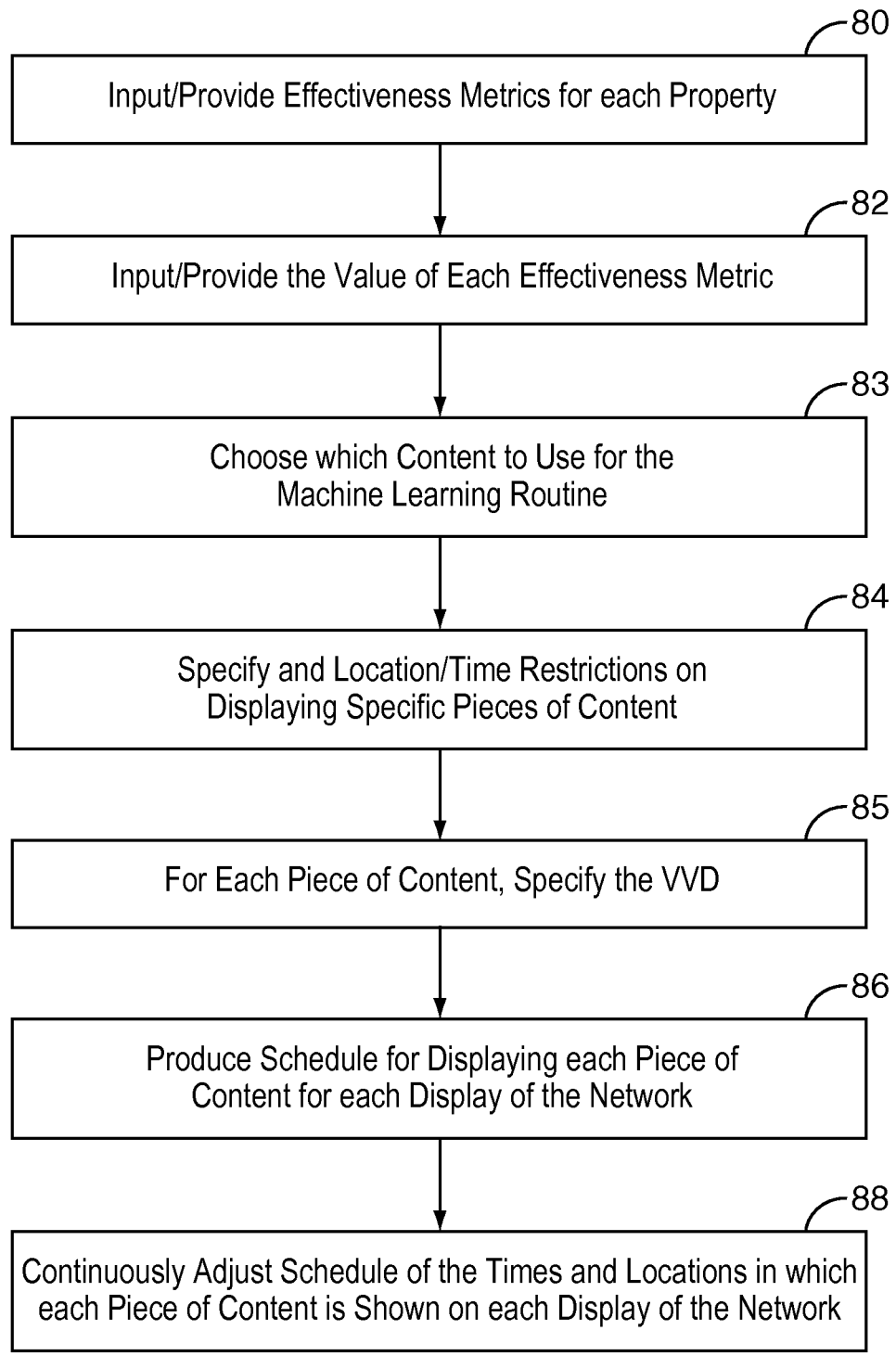
FIG. 8 is a flow chart showing processes for inputting data into an optimization algorithm and how the optimization routine uses these data to generate an optimized schedule in accordance with embodiments of the present invention.

Once the experiment has been defined, the following representative processes are preferably used to fill the "open" time periods (i.e., those not dedicated to the experiment) using a machine learning algorithm to generate content distribution patterns that increase the user's objective function (i.e., the values placed on different consumer metrics). Below is a description of the representative method steps shown in FIG. 8 for inputting data into the machine learning routines and how the routine uses this information to generate a schedule. This is followed by presentations of illustrative deployment scenarios that involve these representative processes.

EXAMPLE #2

Figure 9:
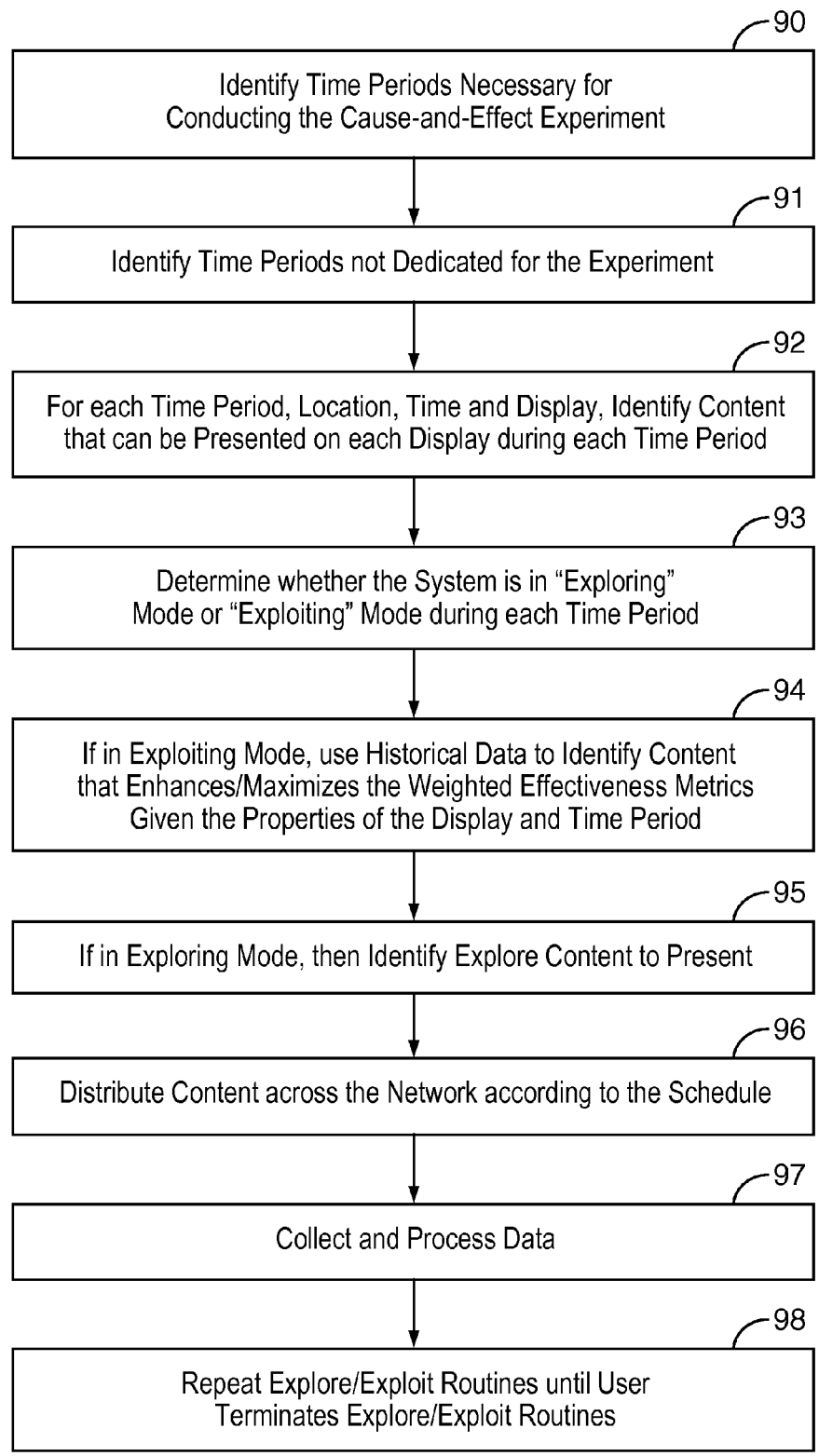
FIG. 9 is a flow chart showing processes for concurrently implementing a cause-and-effect experiment and a machine learning routine via a digital signage network in accordance with embodiments of the present invention.

1. Input/provide 80 effectiveness metrics for each property into the system.
   a. e.g., bar sales, room upgrades, restaurant sales, etc.
2. Input/provide 82 the value of each effectiveness metric.
   a. Different effectiveness metrics may have different profit margins (e.g., bar sales vs. restaurant sales) or they may have different metrics (e.g., number of room upgrades vs. bar sales). Defining the value of each business goal allows the algorithm to compute a single objective function for different pieces of content based upon these values.
3. Choose 83 which content to show on the network.
   a. The user selects from their content database the content that they want to use for the machine learning algorithm. This content can be from a content database from previous experiments and/or can be made explicitly for the machine learning routine (e.g., a reinforcement learning routine involving explore and exploit processes, as is described below).
4. Specify 84 any location/time constraints on displaying specific pieces of content.
   a. The machine learning routine (e.g., a reinforcement learning routine involving explore and exploit processes) presents the content at different locations at different times to learn which pieces of content are the most effective. However, content may be inappropriate for some locations or some time periods.
5. For each piece of content, specify 85 the VVD.
   a. The expected (or longest) period between experiencing (e.g., seeing) the content and acting on the content in a measureable way.
6. The system schedules 86 and continuously adjusts 88 the schedule of the times and locations in which each piece of digital signage content is shown on each display in a digital signage network, with the following constraints and as shown in FIG. 9:
   a. Identify 90 time periods or portions necessary for completing the study.
      i. Assign the experimental content to time periods such that
         1. requested experiments will be completed by the end of the "urgency" date (defined in Step 5.a above).
         2. the cost of the experiment, with respect to the opportunity cost associated with running the experiment versus using MLR is minimized.
   b. Identify 91 time periods not dedicated to an experiment.
      i. These periods are display periods in which there is no experimental content.
   c. For the time period (location, time, and sign/display), identify 92 content (defined in Step 3 and Step 4) that can be presented on this sign at this particular time.
      i. Do not consider content associated that are not appropriate for this time (e.g., advertising Happy Hour at 4-10 AM) or on a particular sign (e.g., room upgrade content on a sign that is not behind the check-in counter) or a particular place (e.g., advertising a restaurant in a hotel that does not have a restaurant).

d. Determine 93 whether system is "exploring" or "exploiting" during each time period. A number of methods for determining this include, but are not limited to the following:
   i. Random: Pre-determine the number of exploit periods (e.g., 90%) versus explore periods (e.g., 10%). With these probabilities, randomly select whether to assign explore or exploit content.
   ii. Semi-Intelligent: Based on historical variance, modify the probabilities of whether to explore or exploit. As the variance of the measurements decreases, increase the likelihood of exploiting.
   iii. Cost Analysis: Estimate the opportunity cost of exploring versus exploiting, and exploit more often when the opportunity costs are high.
e. If in "exploit" mode 94:
   i. Using historical data, identify content that maximizes the weighted business goals given the properties of the sign and time period.
      1. If prior knowledge does not exist, assign content to schedule randomly.
      2. Use regression analysis (or other common predictive functions) on historical data to predict the best "mix" of content to maximize performance (the weighted business goals).
         a. Regression analysis will use historical data with display, location and time variables with each piece of content (and combinations of content) to predict the best mix of content.
f. If in "explore" mode 95:
   i. Identify explore content to present:
      1. Random: From the authorized content to display, randomly select one piece of content.
      2. Time Based: Select pieces of content based on the last time that they were explored.
      3. Semi-Intelligently: Identify "knowledge gaps" in the system's historical database for the current display's properties (time, location, etc.) and present content that will fill that knowledge gap.
7. A content distribution and data processing module distributes 96 content across the network.
8. Collect and process data 97:
   a. Generate reports for the study.
   b. Integrate new data into historical database.
9. Repeat Steps 6-8 until the user terminates 98 the explore/exploit processes.
   a. If any information provided in Steps 1-5 changes, this may modify the content distribution pattern in Step 6.

The following deployment scenario illustrates how the processes described above can be implemented in accordance with embodiments of the invention.

EXAMPLE #3

3a. Experiment Content Distribution

Manticore is a hotel chain that owns five hotels that have a digital signage network. Manticore has classified their five hotels by location type (Urban vs. Suburban) and their size in terms of the number of rooms (Small, Medium, Large).

Manticore wants to understand whether adding a human model in an advertisement increases the likelihood that a customer will choose to upgrade their room (Step 1 in Example #2 above). Because it costs Manticore royalty fees to use a model in their advertisements, they are interested in determining the benefit of using a model over not using a model. They have reasons to believe that the effect of adding a model might be different for their Urban hotels versus their Suburban hotels (Step 2 in Example #2 above).

Manticore designed two pieces of content that are identical in all ways with the exception of one: One piece of content has a model (RoomUpgrade-Model) while the other does not (RoomUpgrade-NoModel) (Step 3 in Example #2 above). Manticore also knows that 99.9% of all customers check-in and make their upgrade decision within 1-hour of entering their hotels (VVD=1 hour, TSS=2 hours; Step 4 in Example #2 above).

Using the procedures described below for designing a cause-and-effect experiment, the system generates a schedule and assigns Experimental Content to the schedule. FIG. 10 shows the distribution of content for the five Manticore hotel properties for this study. Furthermore, Manticore wants to know the answer by the end of the next day (Step 5 in Example #2 above). It is noted that, by extending the urgency date, one can evaluate/demonstrate how the system would modulate the allocation of display time to MLR versus cause-and-effect experimentation. Using this data, the algorithm schedules the content to the five Manticore properties as shown in FIG. 10.

FIG. 10 illustrates a playlist schedule for testing the effect of RoomUpgrade-NoModel versus RoomUpgrade-Model in Urban vs. Suburban. In particular, the playlist schedule shown in FIG. 10 is generated for implementing a cause-and-effect experiment designed by Manticore Hotels to test the performance of two pieces of content (RoomUpgrade-NoModel vs. RoomUpgrade-Model) in Urban vs. Suburban hotels. In this design, the dependent measure is the number of room upgrades, and the Hotel Size is not a variable of interest. Therefore, the algorithm randomizes the distribution of content over this variable. The stippled and slanted squares indicate the time periods (e.g., time-slot sample periods) dedicated to the experiment. The time period (e.g., TSS) for room upgrades (i.e., the dependent measure) is estimated to be 2 hours. As can be seen in FIG. 10, there are a number of "open" time periods that are not dedicated to the experiment in this deployment scenario. These open time periods, which may be TSSs, are shown a screened squares. In this case, the Urgency is to complete the study in one day (see Step 5a in Example #2 above).

3b. Demonstration Assigning Optimized Content to Open Time Slots

Manticore is also interested in using the "open" periods (shown a screened squares in FIG. 10) to increase their ROI.
   1. Manticore is interested in maximizing two business goals: Room Upgrades and Bar Sales.
   2. Manticore has determined that every upgrade is worth $100 while the profit margin in the bar is 40%.
   3. Manticore has four pieces of content in their digital content library:
      i. RoomUpgrade-NoModel
      ii. RoomUpgrade-Model
      iii. Bar-Indulgence
      iv. Bar-Efficiency
   4. Manticore restricts the Bar content from being played in the early morning period (4:00-8:00). Furthermore, one of their establishments (Hotel_U_S) does not have a bar, so they do not want the Bar content to be played at that facility. FIG. 11 illustrates these restrictions.

FIG. 11 is an illustration that shows the content restrictions for the different sites and time periods. The stippled squares are the periods of time and locations that the content cannot be played. The white squares indicate that the content can be played at these locations at these particular times.

Figure 12:
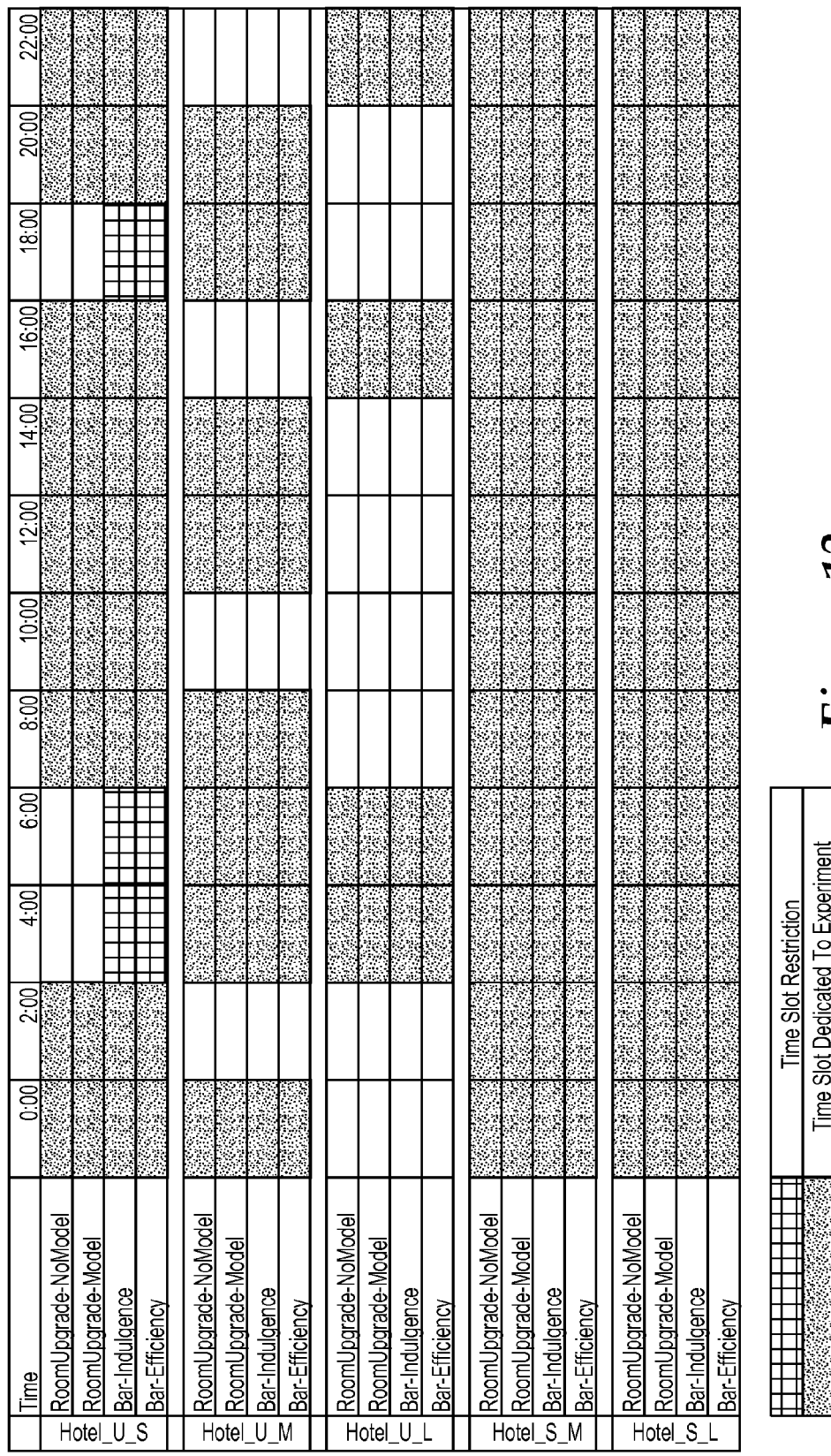
FIG. 12 is a schedule for implementing a machine learning routine while conducting a cause-and-effect experiment for the illustrative deployment scenario of FIGS. 10 and 11, the schedule showing "open" time periods for optimizing content distribution to maximize multiple business goals in accordance with embodiments of the present invention.

5. In this scenario, prior customer studies have found that 99% of all customers will enter the hotel and upgrade a room within one hour (VDD=1 hour and TSS=2 hours for embodiments that use TSSs). By contrast, the typical time between entering the hotel and going to the bar is 12 hours (VDD=12 hours and TSS=24 hours for embodiments that use TSSs).
6. Taking this information, the algorithm now schedules the four pieces of content for Manticore. These experimental time Periods and the restricted periods are shown in FIG. 3, which is an example of an explore/exploit optimization schedule. The stippled regions indicate times that are dedicated to the experiment. The screened squares indicate content restrictions. The first open time period (white squares) is from 4:00 AM-6:00 AM.
    a. It is assumed that the experiment time periods (e.g., TSSs) have been established.
    b. FIG. 12 is an illustration of the open time periods (white regions) divided into the smallest time periods (e.g., TSS units) for the multiple business goals (two hours for room upgrades).
    c. For these time periods, only RoomUpgrade-NoModel and RoomUpgrade-Model will be considered.
    d. The explore/exploit system randomly selects between explore versus exploit modes, with exploit mode being used 90% of the time and explore mode being used 10% of the time. It is understood that these percentages can vary. Using a random number generator, the system determines that this first open time period will be an "exploit" period.
    e. The system looks at the historical data to determine which piece of content would be best at this time for this facility. For Hotel_U_S, the bar content is restricted, since there is no bar in this hotel. Using a weighted score for the bar (see FIG. 14) and upgrades during this exploit period, it is concluded that the best piece of content to present is RoomUpgrade-No-Model ($1800 vs. $800 in FIG. 14).

FIG. 13 shows historical data for the number of upgrades for a given TSS (2 hours) for the two pieces of Upgrade content and for the two pieces of Bar content. FIG. 14 shows the expected ROI for each of the time periods. The values shown in FIG. 13 are weighted values of the ROI for upgrades ($100/upgrade) and ROI for bar sales (40% profit margin). The business goal values are specified in Step 2 of Example #3 (3b) above. The actual values in FIG. 14 are from historical data (FIG. 13) and these business goal values. The bold outlined region under 4:00 is the time period currently being considered. Because there is no Bar in the hotel, the data for the performance with Bar-Indulgence vs. Bar-Efficiency is actually the same.

7. Using the historical data and the business goal weighting, the explore/exploit algorithm assigns content to all of the open time periods and distributes the content to the displays of the network. The results are shown in FIG. 15.

Figure 15:
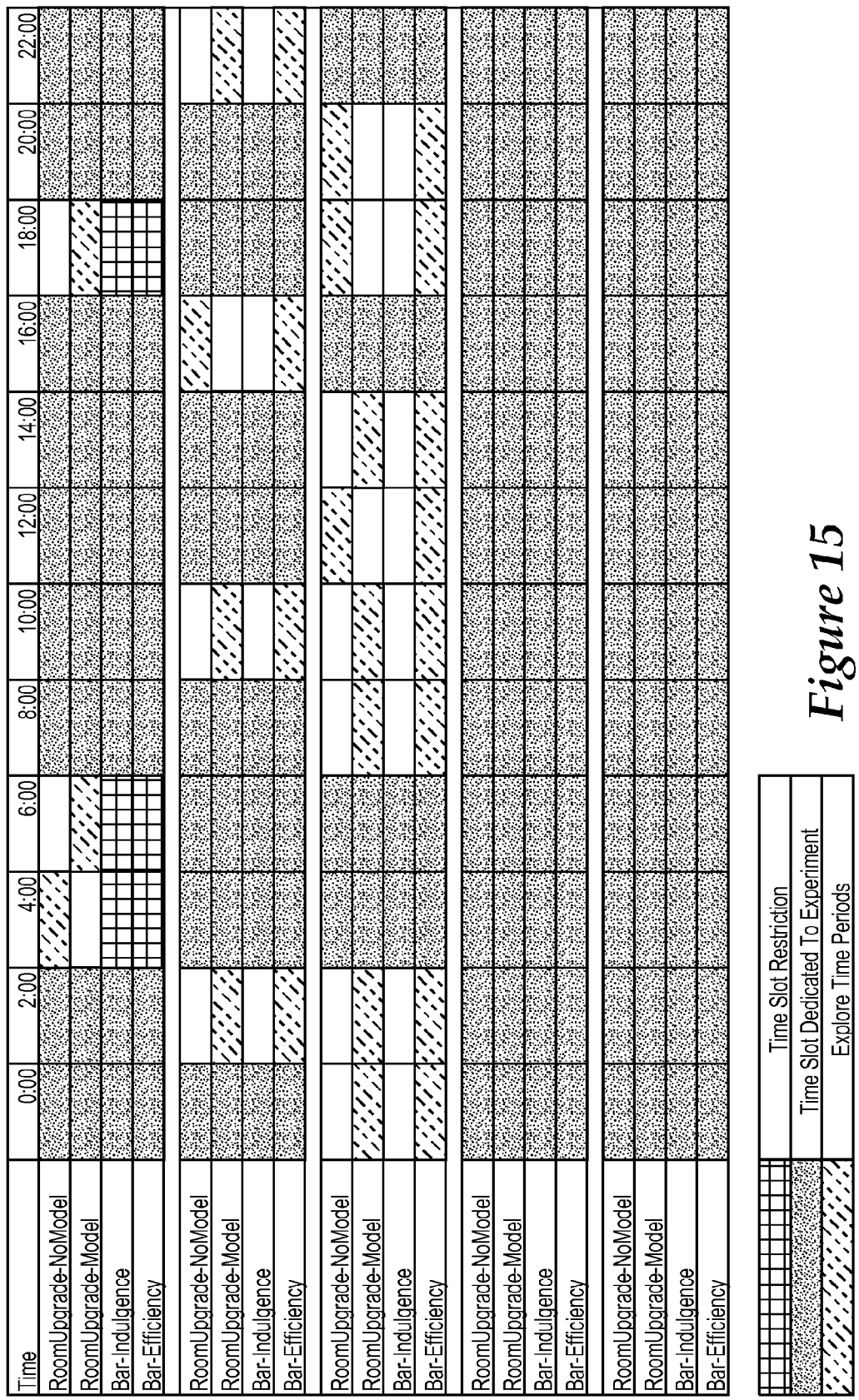
FIG. 15 is a schedule for implementing a machine learning routine while conducting a cause-and-effect experiment for the illustrative deployment scenario of FIGS. 10-12, the schedule showing "open" time periods to which machine learning routine content is assigned in accordance with embodiments of the present invention.

In FIG. 15, the squares with the broken diagonal pattern indicate the times that have been dedicated to the Room Upgrade and Bar content, respectively. The stippled squares represent "explore" time periods in which the algorithm randomly selected one of the lower performing pieces of content to present during that period.

8. Data is then collected from the customer. In this case, the number of upgrades and bar sales are downloaded to the system database. The data are then parsed to assign each piece of data to the appropriate time period and the content that is associated with the time period, as is shown in FIG. 16.

Figure 16:
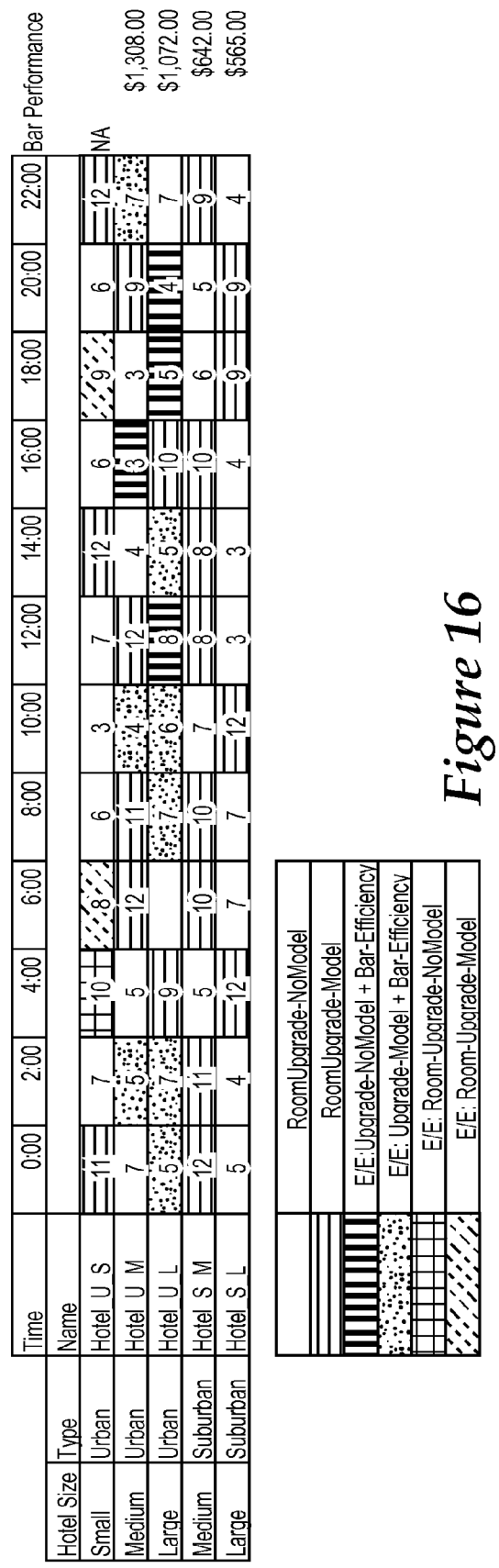
FIG. 16 shows data that was collected during the collection periods of the open time periods of FIG. 15.
Figure 17:
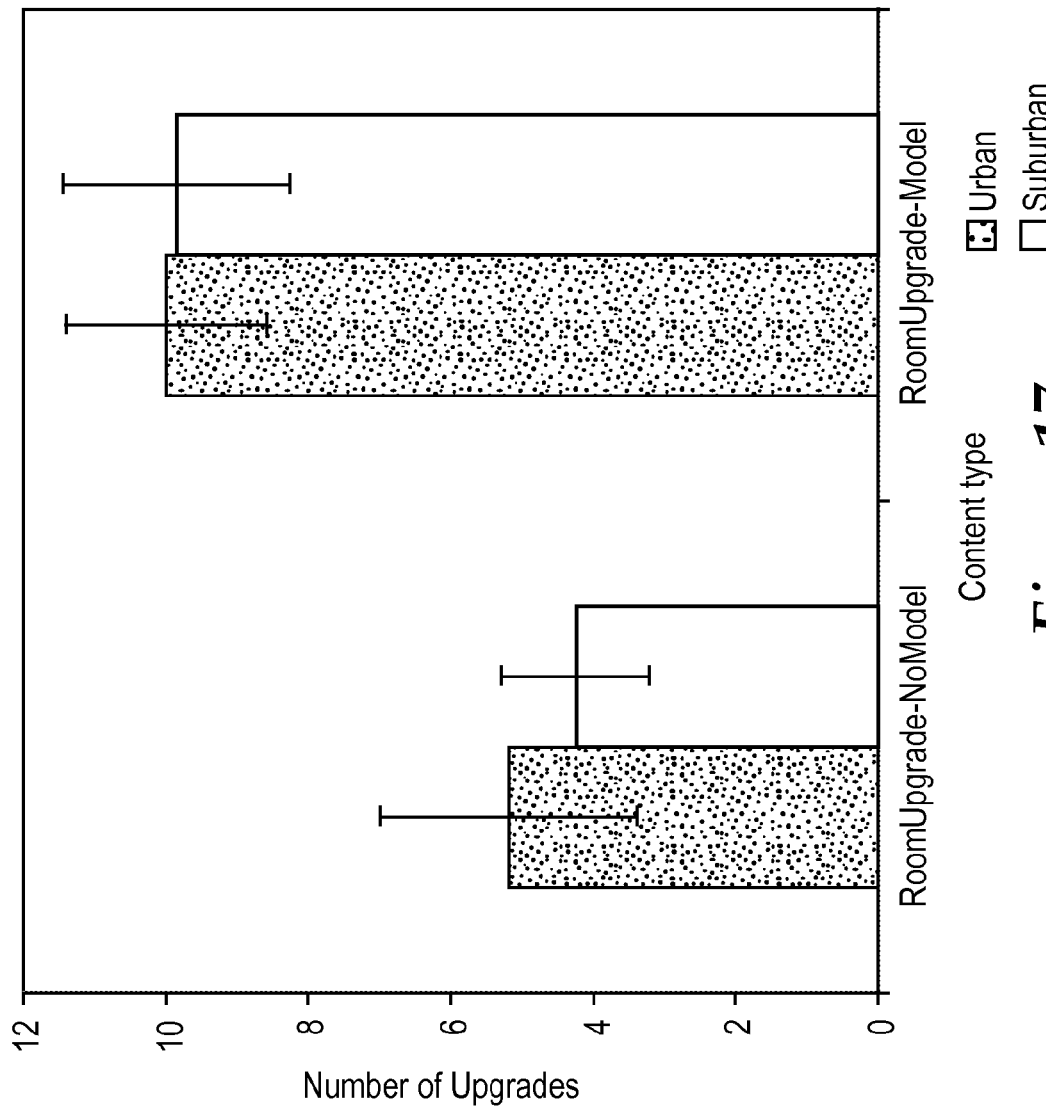
FIG. 17 shows data for the experiment depicted in FIGS. 10-16 that are parsed out of a data stream, analyzed, and presented to the user in accordance with embodiments of the present invention.

As can be see in FIG. 16, data is collected during the time period that the content was presented. The numbers in the patterned and white squares indicate the number of upgrades during that TSS. The bar performance for TSSs associated with Bar Sales are listed on the far right. The Hotel_U_S does not have a bar, therefore it does not have any bar sales.
    a. Data for the experiment are parsed out of the data stream, analyzed, and presented to the customer, as is shown in FIG. 17. This is accomplished by identifying the time periods (e.g., time-slot samples) that are associated with the experiment, and then analyzing by the content associated with these time periods, such as in the manner described hereinbelow. FIG. 17 shows experimental results for the study. It can be seen that RoomUpgrade-Model content is significantly more effective than RoomUpgrade-NoModel content. There is no interaction between the content type and whether the hotel is an Urban or Suburban facility.
    b. Historical data stored in the historical database are update with the new data. The historical data will specify the effect that different pieces of content (and the combination of content) had on the business goal results (e.g., number of updates, bar sales) as a function of the different context variables (time, location, etc.).

EXAMPLE #4

The following illustrative deployment scenario exemplifies the value of implementing an ROI maximization approach of the present invention. The data shown in FIG. 18 demonstrates that optimization routines of the present invention can generate a significant improvement in ROI by optimizing over content, daypart, and location. In this representative example, there are four types of stores (Urban, Suburban, Exurban and Rural). The system is maximizing the ROI for Morning, Afternoon, and Evening periods using three pieces of content (A, B, and C).

In this case, simply presenting the best overall content produces a 2.53% increase in ROI over simply presenting each piece of content randomly (i.e., equally often). Choosing the best content for a particular daypart produces a 5.11% increase over distributing the content equally often over the network. Choosing the content that is best for a specific location produces a 3.53% increase in ROI over distributing the content randomly. However, choosing the content that is the best for all of these context variables (daypart, content, location) generates a 12.94% increase over the randomly distributed approach.

EXAMPLE #5

The following representative deployment scenario illustrates additional complexity that is involved when generating a playlist schedule that accounts for multiple VVDs and multiple business goals in which a machine learning routine is running concurrently with a cause-and-effect experiment. This example illustrates how a user can use a machine learning routine, such as a reinforcement learning routine that employs explore and/or exploit algorithms, to schedule content during certain time periods of the schedule.

In this illustrative scenario, it is assumed that a digital signage network is deployed in a department store, and that the network is configured to perform ROI measurements. It is also assumed that time-slot samples will be used as the time periods of the playlist schedule.

One display is near the in-store bistro, where VVD has been determined to be 45 minutes. The bistro display is running ongoing experiments relating to suggestions of getting a glass of wine, appetizer, desert, etc. with your meal. Additionally, experiments are run having content relating to merchandising for various retail departments of the department store. The experimental content is interspersed with the food-related content.

Another display is located in the book/music department of the department store, where VVD has been determined to be 20 minutes. This display runs experiments relating only to items sold in the book/music department. Another display is located near the escalators on the first floor, not far from, and visible from, the department store entrance. This display runs experiments relating to a variety of content, including the bistro, retail departments, and the book/music department. The overall VVD for the department store has been determined to be 70 minutes. Each display has open time-slot samples of a length determined by the algorithms described hereinbelow.

The user decides to incorporate a machine learning enhancement for department store's digital signage network. For the next quarter, the user's business goals are defined as:
(1) Increase market share for books/music. There is a competitor store two blocks away and the user would like to take some of their business.
(2) Bring more people into the bistro as an evening dining destination, rather than just a place for a quick bite while the customer is shopping.
(3) Sell more fur coats by reviving the old Lay-Away Plan, whereby people pick out their coat and the store holds the coat while the customer pays $150/month until the cost of the coat is paid off.

A schedule can then be generated in a manner described herein that accounts for the requirements and constraints described above. This scenario illustrates additional complexity that can be accounted for using a playlist schedule constructed for concurrently running cause-and-effect experiments and optimization routines in accordance with embodiments of the invention.

EXAMPLE #6

For purposes of simplicity, and to emphasize the role of multiple business goals and multiple VVDs in the playlist schedule generation scenario described in Example #5 above, consider the display that is located in the book/music department. An initial step involves defining the experiment to answer the following question. Which will perform better: advertisements describing book purchasing as an "investment" versus an "earned luxury" for evening versus morning shoppers? In this illustrative example, it has been determined that VVD is 30 minutes and TSS is 60 minutes. It is assumed that a reinforcement learning routine will be used that includes an explore/exploit algorithm.

Figure 19:
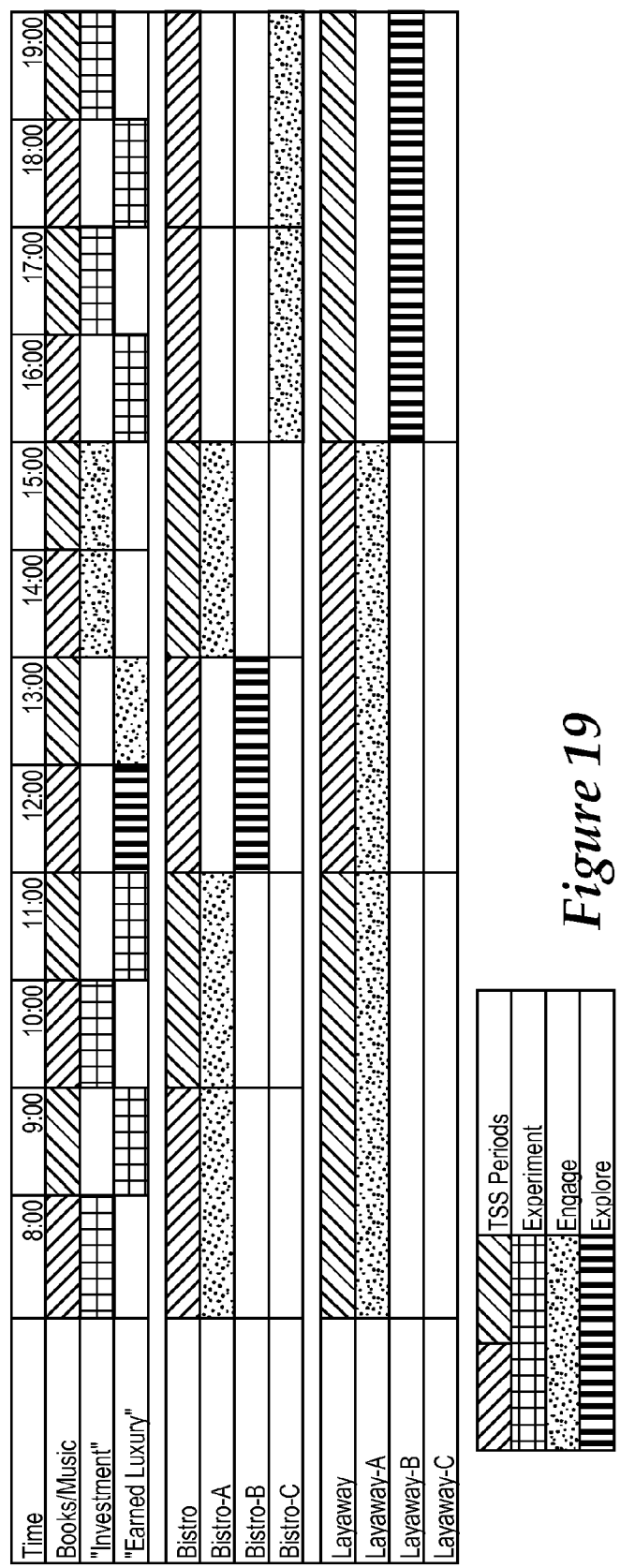
FIG. 19 illustrates a one-day schedule with multiple business goals for another illustrative deployment scenario in accordance with the present invention.

In accordance with Steps 1-5 of Example #2 above, the following are applicable:
The explore/exploit algorithm will use multiple business goals that include:
1. Book/Music Department sales:
   a. VVD is 30 minutes.
   b. 15% profit margin
   c. No time restrictions
   d. 2 pieces of content to be used
2. Bistro sales:
   a. VVD is 1 hour.
   b. 25% profit margin
   c. No time restrictions
   d. 3 pieces of content to be used
3. Fur Coat Layaway sales:
   a. VVD is 4 hours (often times customers will see the layaway advertisements for the coats, leave the store, and return to make the purchase after consulting their spouse).
   b. 60% profit margin
   c. No time restrictions
   d. 3 pieces of content to be used
4. Step 6 of Example #2 above—Specify the Schedule:
   a. In this case, an experiment is to run in the morning (8 AM-12 AM) and in the evening (4 PM-8 PM). The methods described hereinbelow are used to schedule these pieces of content as shown in FIG. 19 (screened pattern).
   b. The explore/exploit algorithm will schedule "Bistro" and "Layaway" content during these times.
   c. During the afternoon period (12 PM-4 PM), the explore/exploit algorithm will also schedule the content for the "Book/Music" content in addition to the "Bistro" and "Layaway" content.
   d. The explore/exploit algorithm will choose content that is either the best performing for that period (exploit) or will evaluate a piece of content that was previously not the best performer (see Steps 6d and 6e in Example #2 above).
   e. Each piece of content will be shown for a 30 second period and will repeat during the particular time-slot sample.
      i. e.g., from 8 AM-9 AM, three pieces of content will repeat in 30 second increments:
         1. Book/Music-Investment
         2. Bistro-A
         3. Layaway-A FIG. 19 illustrates a one-day schedule with multiple business goals (Books/Music; Bistro; Layaway). The diagonal patterned squares illustrate the TSS periods for each business goal. The patterned indicate whether the period is dedicated to an experiment, explore or exploit content. For each 1-hour period, one piece of content for Books/Music, Bistro, and Layaway are shown. It is noted that this schedule is constructed only for one day and one location (the book/music department display). Often, the experiment would be run over multiple days and potentially at multiple locations.

Figure 20:
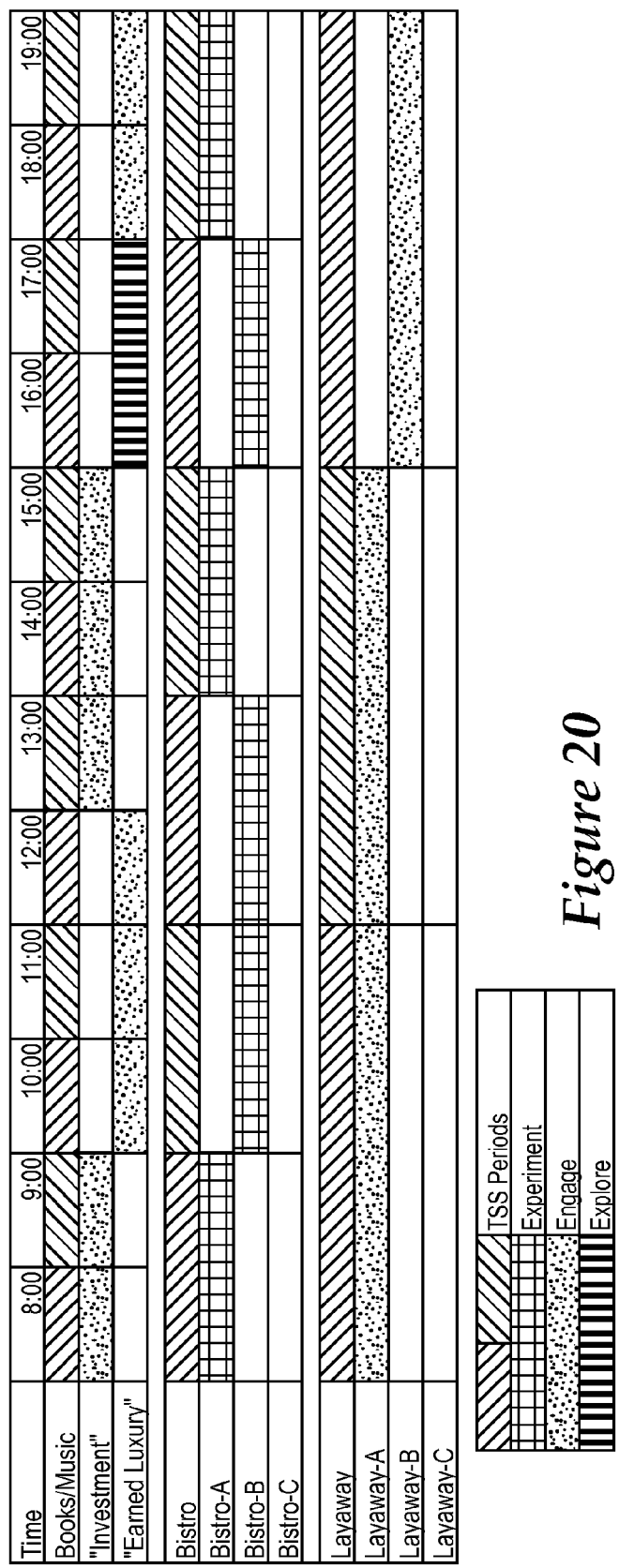
FIG. 20 is an example of a second schedule with which the user tests the effectiveness of different content for the deployment scenario of FIG. 19.

FIG. 20 is an example of a second schedule in which the user is testing the effectiveness of "Bistro-A" content versus "Bistro-B" content. In this illustrative example, the "Book/Music" business goal is under the control of the explore/exploit algorithm, and this algorithm schedules the content in accordance with Steps 6d and 6e of Example #2 above. It can be seen in Example #6 that explore/exploit time-slot samples can be constructed with different viewer visit durations and data collection periods, preferably in the manner discussed hereinbelow.

According to another approach, an explore/exploit routine may use data from a single time-slot sample, understanding that confidence in cause-and-effect is substantially lower. Importantly, however, the described use of the relationship between VVD, TSS, and data collection periods does eliminate same-location carryover effects. To preserve the integrity of true experimentation constraints, all explore/exploit routine content shown during an experimental TSSs must be "unrelated."

By way of example, a one-hour TSS may be sequentially showing 15-second content clips of experimental content, exploit content (business goal A), exploit content (business goal B), and weather report content. In this case, data collection may be simultaneously taking place at three independent point-of-sale systems, one measuring the effect of experimental, one measuring the effect of business goal A exploiting, and one measuring the effect of business goal B exploiting. All data collected is thus "clean" due to the unrelatedness of the communication content.

According to other embodiments, two distinct and "unrelated" schedules may be implemented to run concurrently on the same display. Content switching may occur every 30 seconds or other time interval as dictated by the two unrelated schedules. The two schedules may have very different time features. For example, at least one of VVD, TSS, and data collection periods can differ as between the two schedules. By way of further example, each of VVD, TSS, and data collection periods can differ as between the two schedules.

For example, both schedules can be generated to conduct cause-and-effect experiments (e.g., true experiments). By way of further example, both schedules can be generated to perform machine learning routines, such as explore/exploit routines. In accordance with another example, one schedule can be generated to conduct cause-and-effect experiments, and the other schedule can be generated to perform machine learning routines. It is understood that more than two schedules can be constructed to implement a multiplicity of cause-and-effect experiments, machine learning routines, or a combination of cause-and-effect experiments and machine learning routines.

Whenever a study is being conducted, it comes at a cost to the customer. The time periods dedicated to the study are being used to gather data or knowledge instead of being focused on generating return on investment (e.g., using an explore/exploit algorithm). The cost of the study can be calculated as the difference in revenue generated by using an optimization algorithm versus the amount of money generated during the actual study. Because there is a measurable cost associated with running an experiment (i.e., the opportunity cost associated with not employing a machine learning routine), embodiments of the present invention provide the user with the ability to automatically terminate at an appropriate or predetermined stage.

For example, the user may specify automatic termination of a study when (1) the data has demonstrated a significant result or (2) when, given the current effect size and the estimated variance, the cost associated with the study exceeds the value that the customer places on the study. Although there are known methods describing how one can determine whether or not to continue collecting data, none of these methods heretofore have been applied to or contemplate evaluating experiments with digital content distribution systems.

EXAMPLE #7

Figure 21:
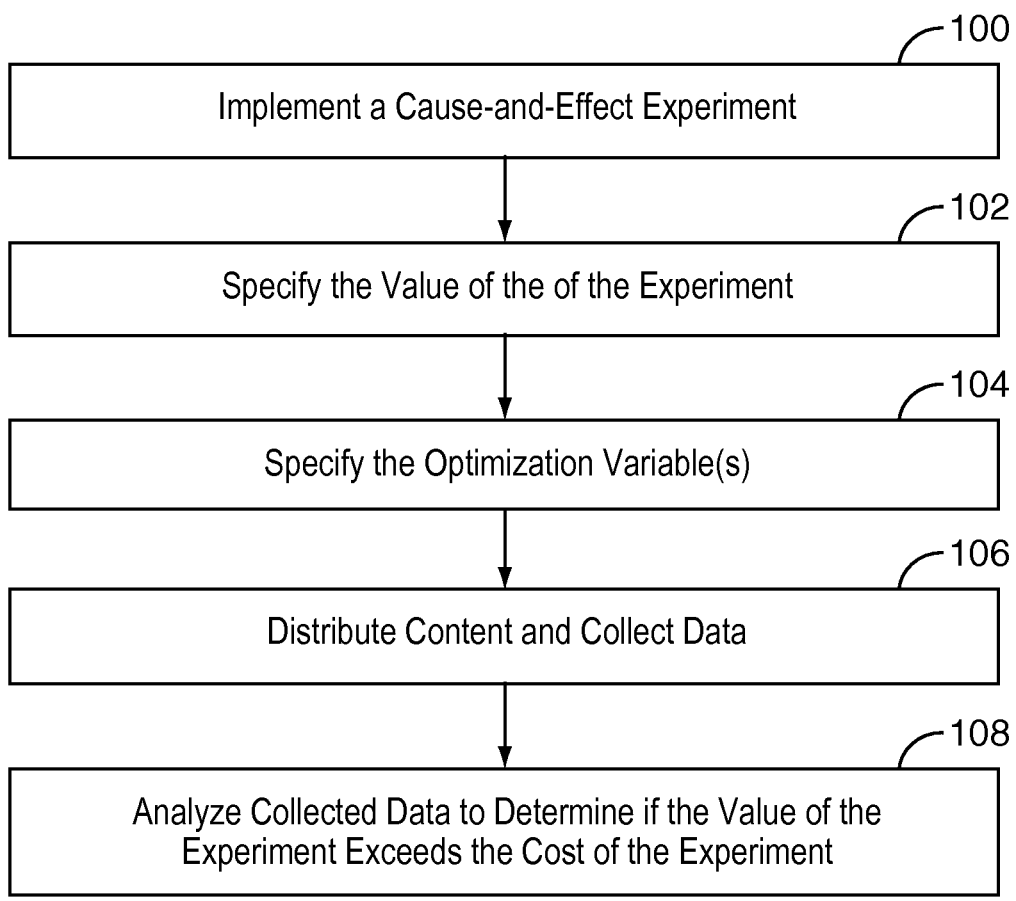
FIGS. 21-23 show representative processes for conducting a cost evaluation of an experiment in accordance with embodiment of the present invention.
Figure 22:
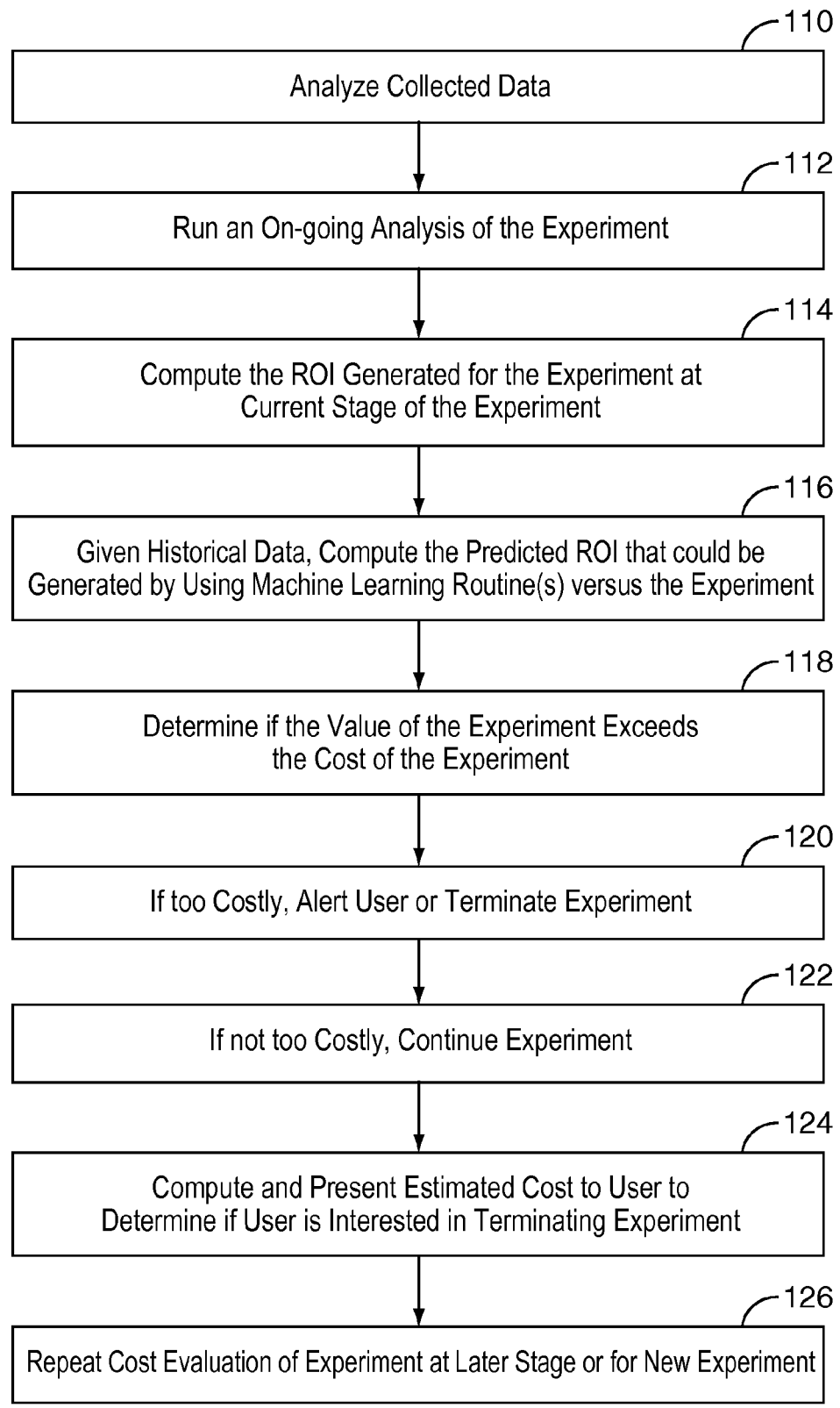
Figure 23:
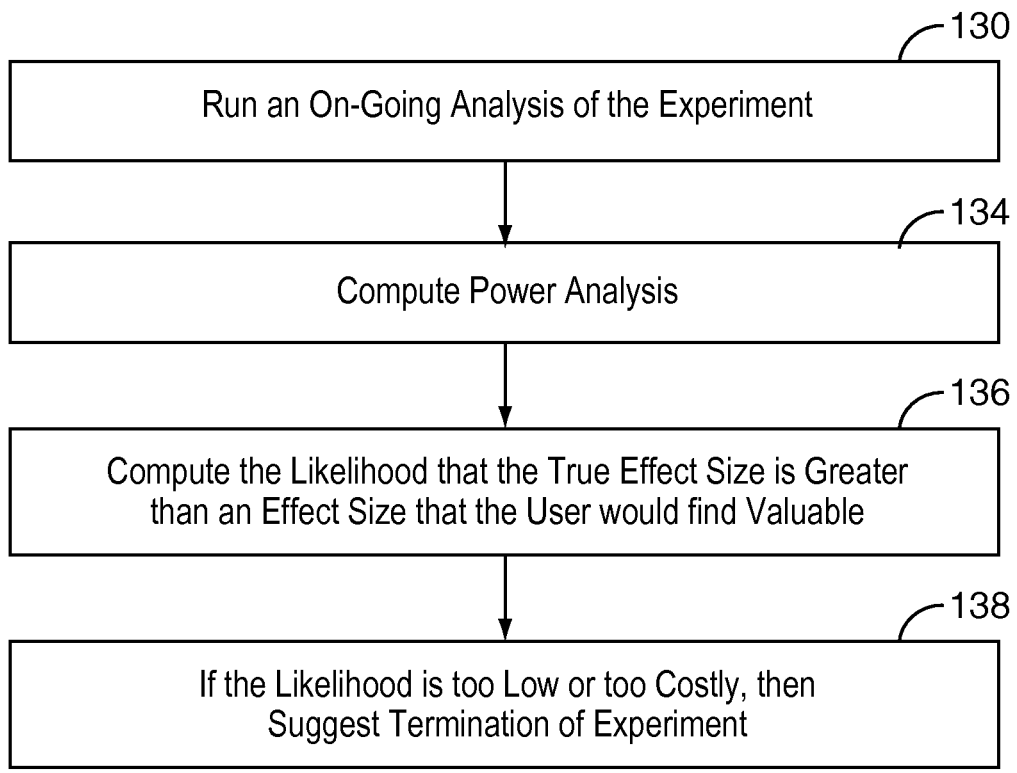

The following is an illustrative example of evaluating the cost of conducting a study in accordance with embodiments of the invention. As is shown in FIGS. 21-23, representative processes for conducting a cost evaluation of a study of the present invention include the following:

1. Implement 100 a cause-and-effect experiment as described herein.
2. Experiment_Value: The user specifies 102 the value of the current experiment.
3. The user specifies 104 the optimization variables as described above in Example #2.
4. Distribute content and collect data 106.
5. Analyze data 108/100:
    a. Run 112/130 an on-going analysis of the experiment:
        i. calculate 132 mean and standard deviations of the content and conditions (see Step 8a of Example #2 above and FIG. 17).
        ii. compute 134 power analysis:
            1. statistical power analysis specifies how many more samples would be needed given the current effect size (differences between the conditions) and the current variance (how much variability there is in the measurements) and the number of samples already collected.
        iii. compute 136 the likelihood that the true effect size is greater than an effect size that the user would find valuable:
            1. if the likelihood is too low (or using a power analysis it is too costly to find out), then suggest 138 termination of the study.
    b. Experiment_ROI: compute 114 the ROI generated for the experiment up to this point (using the weights specified in Step 2 of Example #2 above).
    c. Explore/Exploit_ROI: given the historical data, compute 116 the predicted ROI (using the weights specified in Step 2 in Example #2 above) that could be generated by using the explore/exploit routine versus the experiment.
    d. Determine 118 if the value of the study exceeds the cost of the study:
        i. terminate or alert user 120 if:
            Experiment_Value<(Explore/Exploit_ROI−Experiment_ROI).
        ii. else continue 122
6. Present 124 estimated cost to user to determine if user is interested in terminating study.
7. Repeat 126 steps 1-6 above.

The method steps of Example #7 above describe one approach for deciding whether and when to terminate a study. Those skilled in the art will understand that there are other algorithms for computing when to terminate a study, and that these algorithms may be used in accordance with embodiments of the invention.

An advantage of using a digital signage network in the context of the present invention is that multiple messages can be presented on a single display. This provides both an opportunity and a challenge. Both marketing and basic memory research clearly show that humans typically require multiple presentations of a message to both remember the message and to act upon a message. On the one hand, a digital signage network provides an opportunity to provide different messages over time to a viewer. However, given that it typically takes multiple presentations for a customer to act upon a message, if one is not careful, messages can become ineffective when customers do not experience a message a sufficient number of times to actually modify their behavior.

The challenge is that there is no prescriptive number of experiences that will ensure maximum benefit. The number of experiences required will depend on multiple factors, including, but not limited to:
1. The strength/power of the message:
    a. i.e., how effective the content is
2. The action that is required from the message:
    a. e.g., "Buy CREST Toothpaste" vs. "Buy a HONDA Accord"

3. How distracted the viewer is when processing the content:
   a. i.e., how much the viewer was able to process the content
   b. e.g., driving in a difficult interchange vs. sitting at a bus stop waiting for a bus
4. How receptive the customer is to the message:
   a. i.e., advertising the "Calf and Steer" restaurant to a vegetarian convention.

Figure 24:
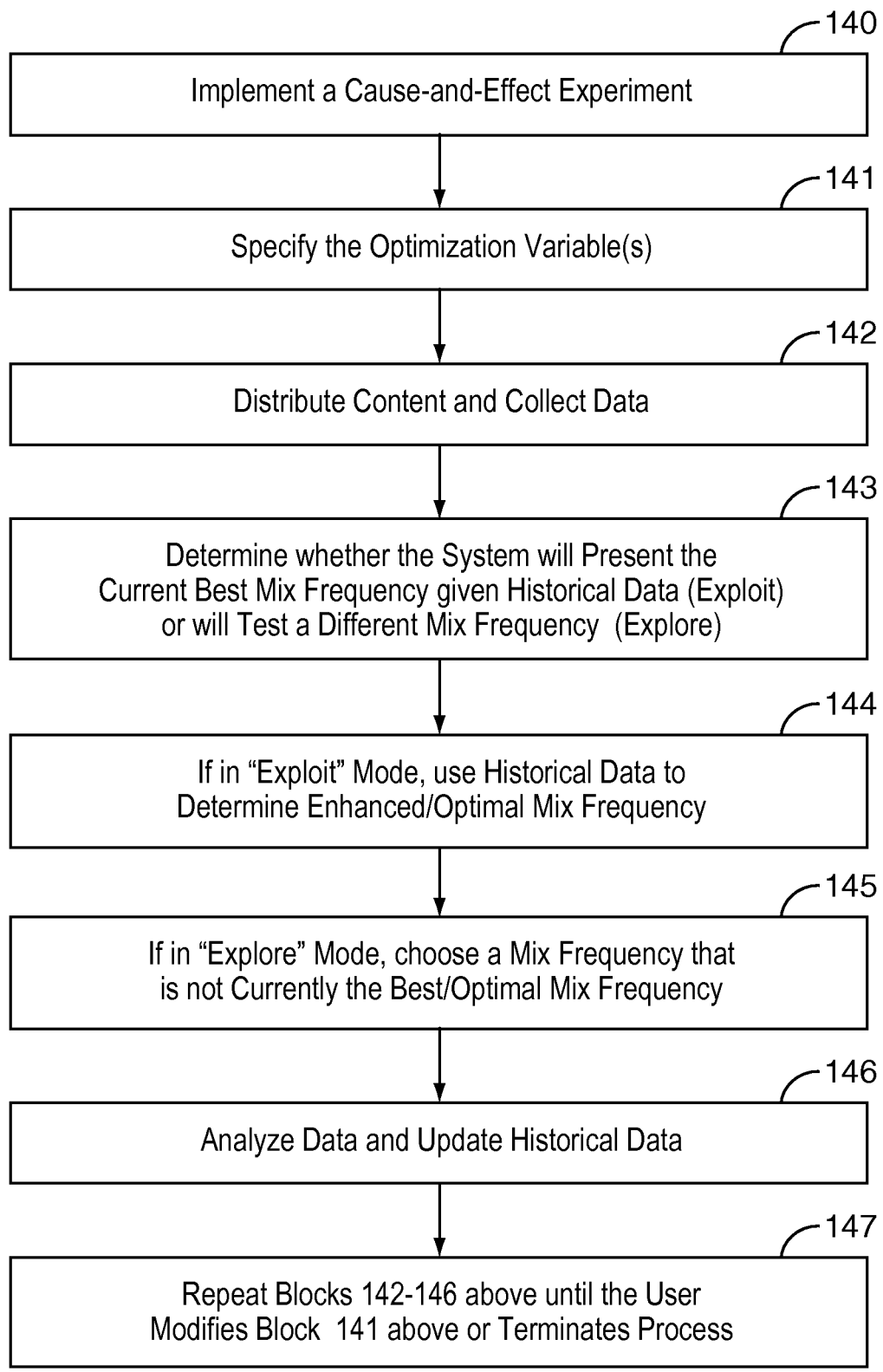
FIG. 24 illustrates representative processes for optimizing the frequency rate of content presentation in accordance with embodiments of the invention.
Figures 25A, 25B:
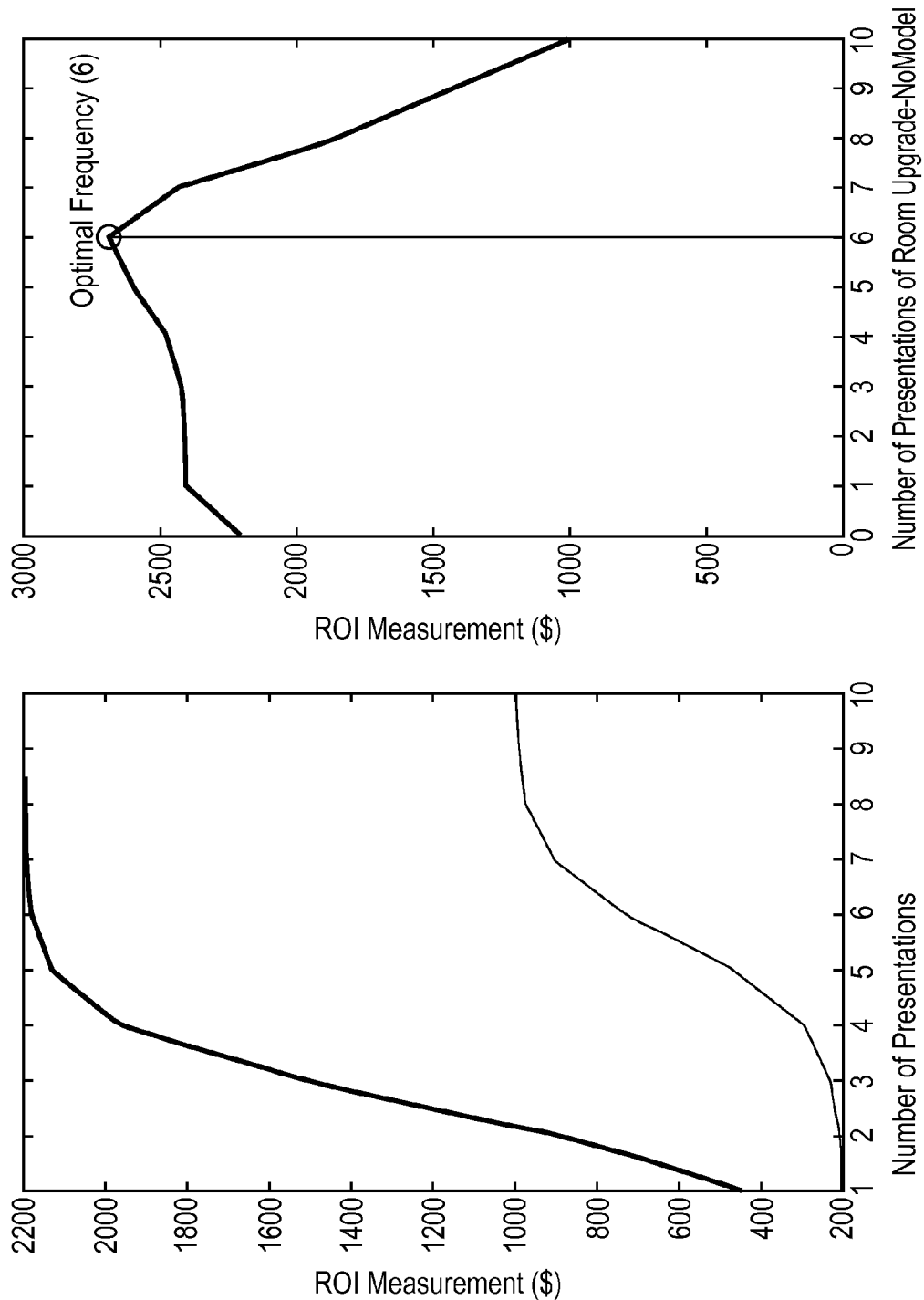
FIGS. 25A and 25B show the results of mixing different content within the same time-slot sample period in accordance with embodiment of FIG. 24.

Embodiments of the invention involve identifying the frequency rate for presenting content on a digital sign that automatically optimizes the presentation frequency of content to maximize a customer's ROI. With reference to FIGS. 24 and 25A-25B, the following example illustrates processes of frequency rate optimization in accordance with embodiments of the invention:

EXAMPLE #8

1. Implement 140 a cause-and-effect experiment as described herein.
2. The user specifies 141 the optimization variables as described above in Example #2.
3. Distribute content and collect data 142 (see Step 6 of Example #2 above):
   a. using the processes described in Step 6d of Example #2 above, determine whether the system will present 143 the current best mix frequency given historical data (exploit) or will test a different mix frequency (explore).
   b. if in "exploit" mode, use historical data to determine 144 optimal frequency mix.
      i. FIG. 25A shows result of historical data showing the effectiveness of two pieces of content as a function of the display frequency within a time-slot sample period. FIG. 25B shows the predicted frequency mix for these two pieces of content and a prediction that the best mix for the time-slot sample period (that has 10 presentation periods) is to present RoomUpgrade-NoModel 6 times and Bar-Efficiency 4 times.
   c. If in "Explore" mode, choose 145 a frequency mix that is not currently the optimal frequency mix.
4. Analyze 146 data and update historical database (see Step 8b of Example #2 above):
   a. store the main effect of presenting the content with the current ratio (see FIG. 25A).
   b. Store the combined effect of presenting the content with the current frequency with the content that it was paired with (see FIG. 25B).
5. Repeat 147 Steps 3-4 above until the user modifies Step 2 above or terminates process.

FIGS. 25A and 25B show the results of "mixing" RoomUpgrade-NoModel with RoomUpgrade-Model within a time-slot sample period. The time-slot sample period can present a total of 10 presentations in this case. FIG. 25A shows the ROI for presenting RoomUpgrade-NoModel and Bar-Efficiency 1 to 10 times during the time-slot sample period. FIG. 25B shows the effect of mixing the presentations of these two pieces of content. The optimization algorithm returns that the optimal frequency is presenting 6 samples of the RoomUpgrade-NoModel and 4 (10-6) presentations of the Bar-Efficiency content for the time-slot sample period.

One of the benefits of the explore/exploit algorithm is that it is designed to automatically "explore" the space of content presentation patterns to find the best, or optimal, content mix to return ROI value for the customer. During this exploration phase, there is a great deal of knowledge that the algorithm begins to uncover. This knowledge comes in the form of particular correlations between content (and the content attributes, such as color, tactics, etc.), locations, customer types, time-of-day, etc. Many of these correlations are spurious correlations that occur due to random chance. Other correlations may have a causal component to them. In order to differentiate between spurious correlations and causal-effects a controlled study is needed.

Figure 26:
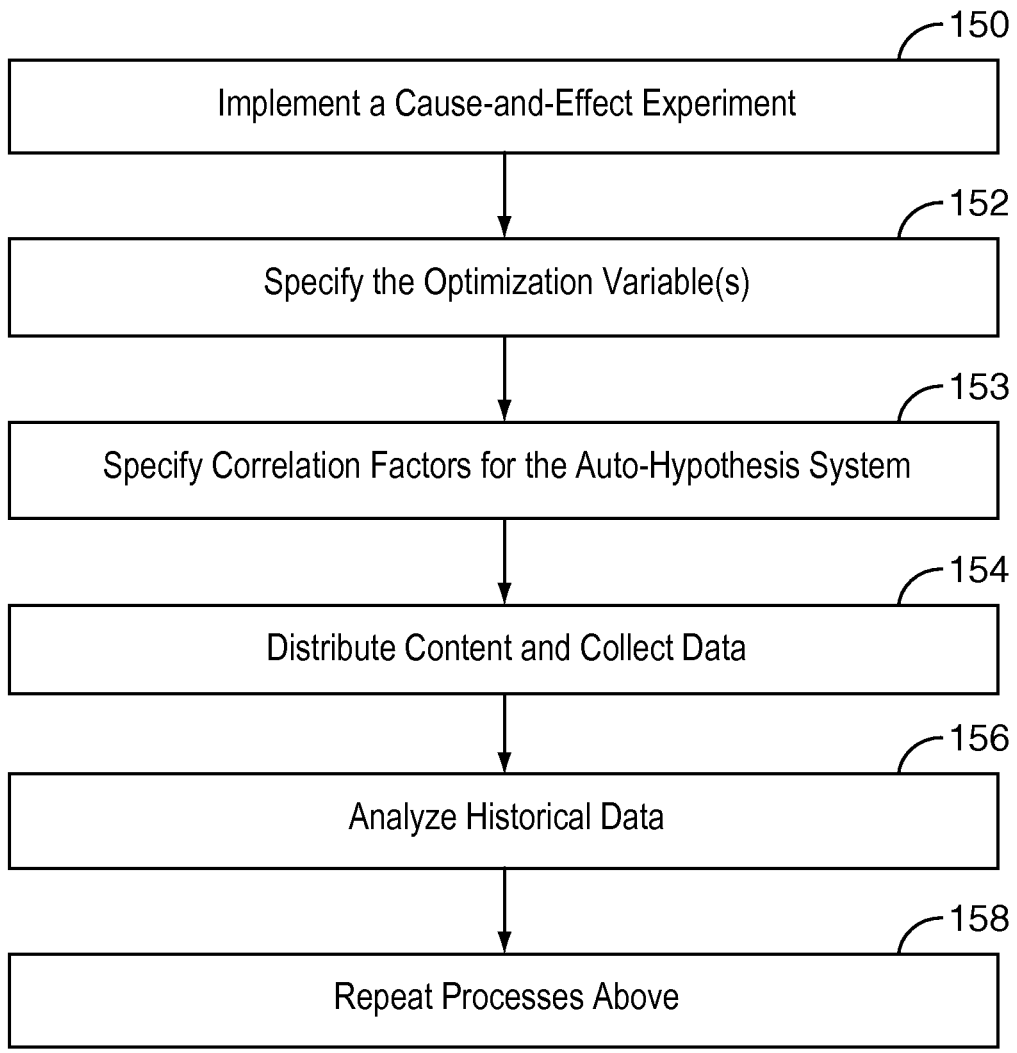
FIGS. 26-28 are flow charts directed to identifying and uncovering valuable correlations using an automatic hypothesis generation methodology in accordance with embodiments of the present invention.
Figure 27:
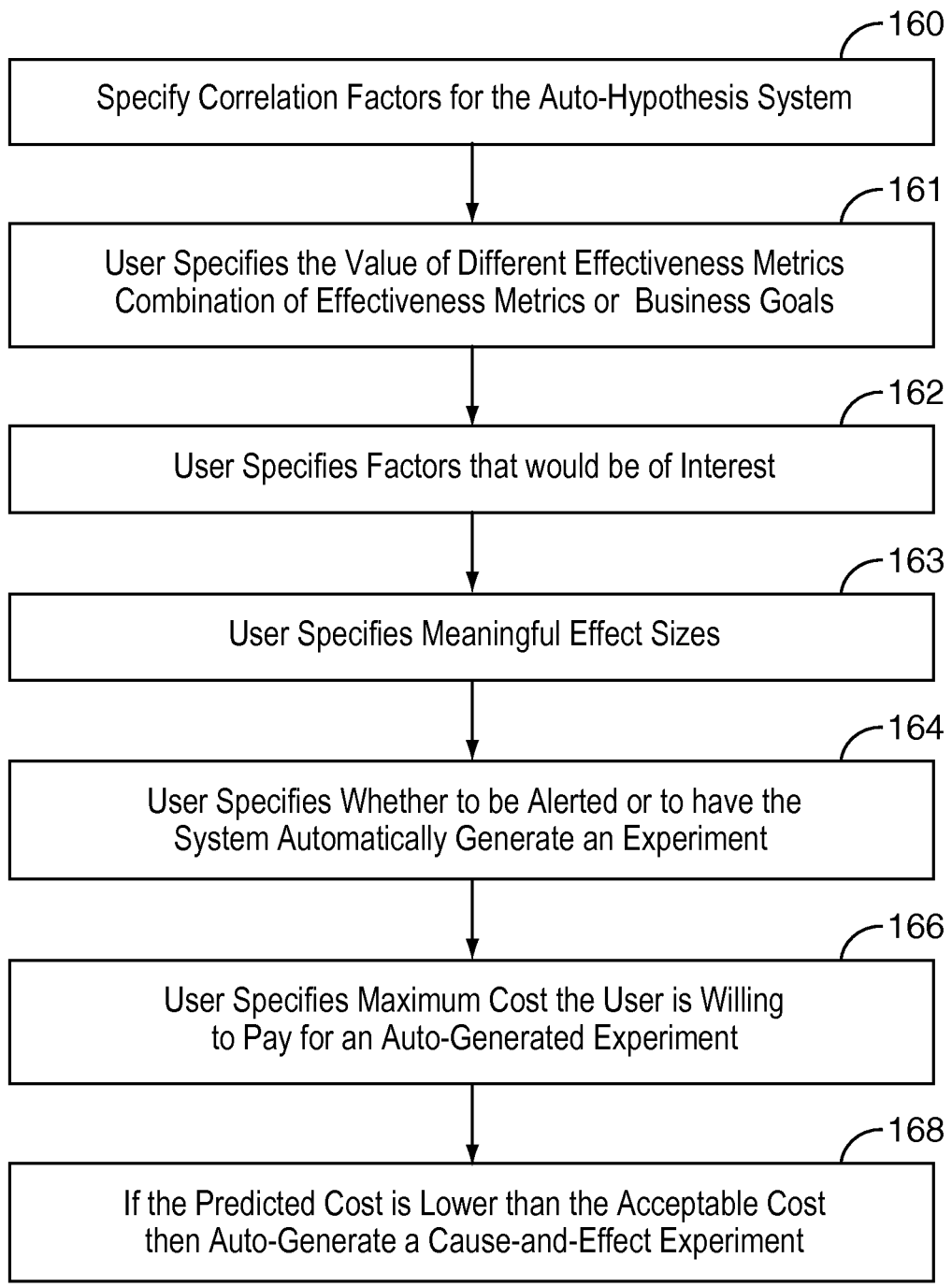
Figure 28:
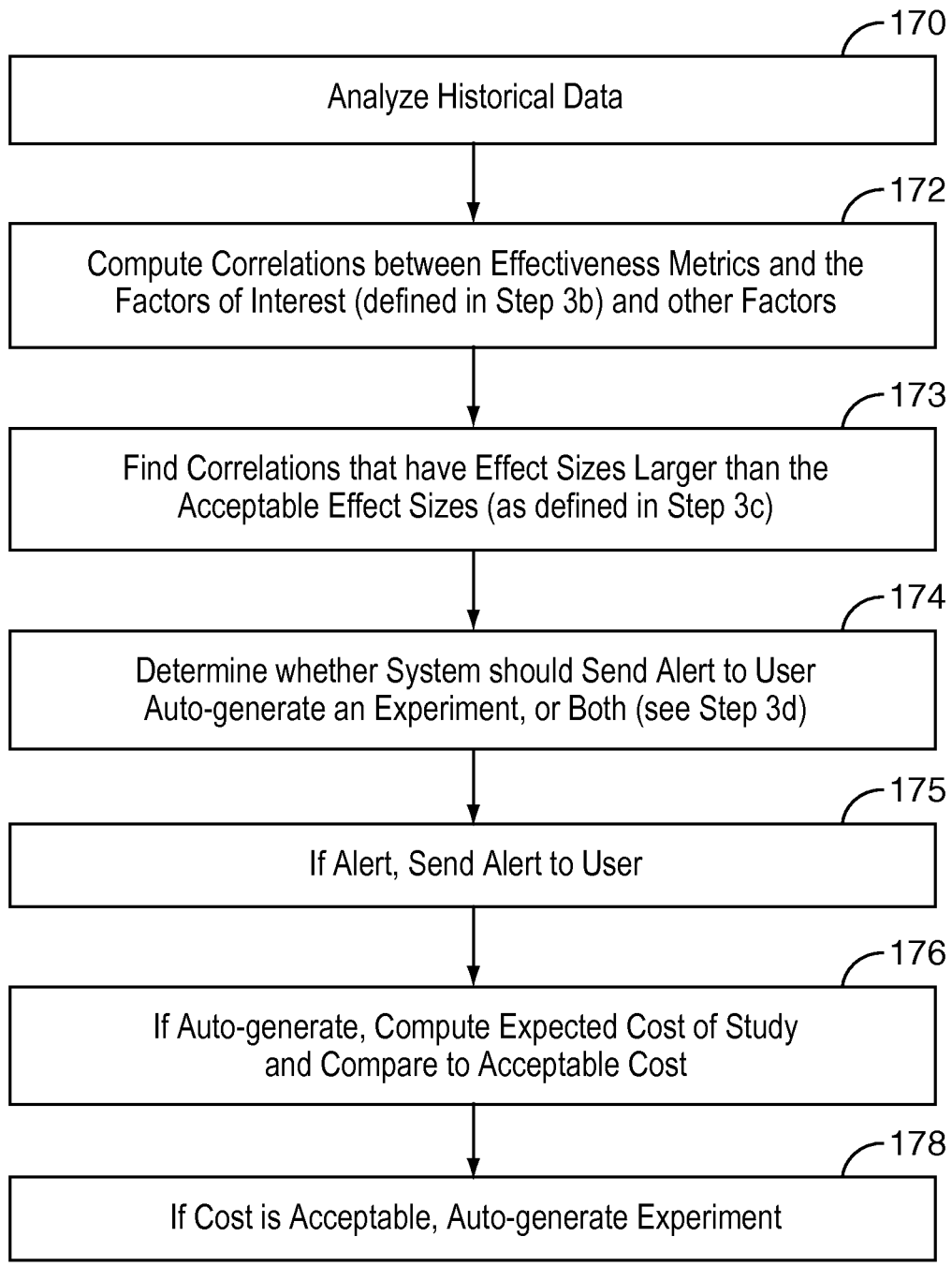

The challenge is in determining which correlations to actually pursue. The explore/exploit algorithm will uncover many correlations in the data. Some may be of significant value to the user while others will not be of much value. Embodiments of the present invention are directed to identifying and uncovering the valuable correlations using an automatic hypothesis generation methodology (referred to herein as auto-hypothesis generation), a representative example of which is described below with reference to FIGS. 26-28.

EXAMPLE #9

1. Implement 150 a cause-and-effect experiment as described herein.
2. The user specifies 152 the optimization variables as described above in Example #2.
3. The user defines 153/160 the correlation factors for the auto-hypothesis system:
   i. the user specifies 161 the value of different effectiveness metrics, combination of effectiveness metrics (objective function), which dependent measures is the user interested in finding correlations (e.g., bar sales, room upgrades, etc.)
   b. the user specifies 162 factors that are of interest:
      i. e.g., any differentiable correlations between hotel types (e.g. Urban vs. Suburban)
   c. the user specifies 163 meaningful effect sizes:
      i. how large of an effect (e.g., a difference of 10%) would trigger the system to alert the user or design a specific experiment
   d. the user specifies 164 whether they want to be alerted or have the system auto-generate an experiment study:
      i. The user can specify a maximum cost 166 that they are willing to pay for an auto-generated experiment (see cost evaluation of study of Example #7 above). If the predicted cost is lower than the acceptable cost, then auto-generate 168 the experiment.
4. Distribute content and collect data 154 (see Step 6 of Example #2 above).
5. Analyze 156/170 historical data:
   a. compute 172 correlations between business effectiveness metrics and the factors of interest (defined in Step 3b above) and other factors
   b. find 173 correlations that have effect sizes larger than the acceptable effect sizes (see Step 3c above)
   c. determine 174 whether the system should send alert to user, auto-generate an experiment, or both (see Step 3d above):
      i. if alert, send 175 alert to user.
      ii. if auto-generate experiment:
         1. compute 176 expected cost of study (see Example #7 above) and compare to acceptable cost in Step 3d(i) above.
         2. If cost is acceptable, auto-generate 178 experiment.
6. Repeat 159 Steps 1-5 above.

In accordance with various embodiments, systems and methods of the present invention may be implemented that continuously analyze all displays of a digital signage network to determine whether each display should present content for purposes of conducting a cause-and-effect experiment or for executing a machine learning routine. Embodiments of the invention may be implemented to continuously analyze all DSN displays to effectively decide whether each display is to be under the control of a cause-and-effect experiment system or under the control of a machine learning system. This decision is preferably made by the DSN system based on the cost of using a particular time period on each display for experiments relative to a lost opportunity of using the same time period on each display for optimizing a predetermined business goal by execution of the machine learning routine.

Figure 29:
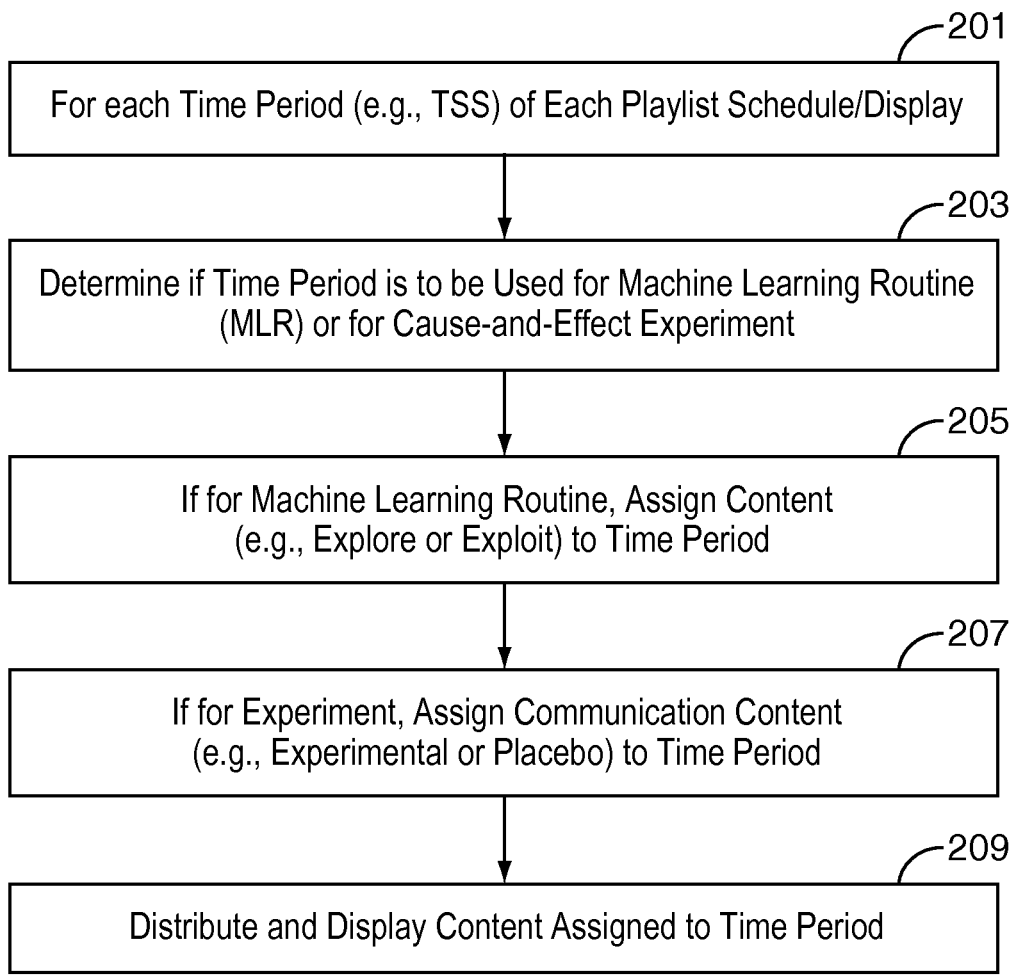
FIG. 29 illustrates a representative embodiment of a methodology for conducting an evaluation of all displays of a digital signage network and assigning display screen time to be under the control of either a cause-and-effect experiment system or a machine learning system in accordance with embodiments of the present invention.

FIG. 29 illustrates a representative embodiment of a methodology for conducting an evaluation of all displays of a DSN and assigning display screen time to be under the control of either a cause-and-effect experiment system or a machine learning system. The methodology illustrated in FIG. 29 effectively hands over a period of time (e.g., a TSS) to either a cause-and-effect experiment system or a machine learning system on a display-by-display basis, and does for each time period.

As is shown in FIG. 29, a DSN system processor or module is configured (i.e., programmed to execute program instructions stored in memory) to determine 201/203, for each time period (e.g., TSS) of each playlist schedule and associated display, if the time period is to be used by or under the control of a machine learning routine or a cause-and-effect experiment. If the module determines that the time period is to be used for a machine learning routine, appropriate content is assigned 205 to the time period as determined by the machine learning routine. For example, the machine learning routine may be programmed to present explore content or exploit content during this time period. If the module determines that the time period is to be used for a cause-and-effect experiment, appropriate content (e.g., experimental content or placebo content) is assigned 207 to the time period as determined by the cause-and-effect experiment. The content assigned to the time portion is distributed and displayed 209. The processes shown in FIG. 29 are repeated for each time period for each display of the digital display network.

Figure 30:
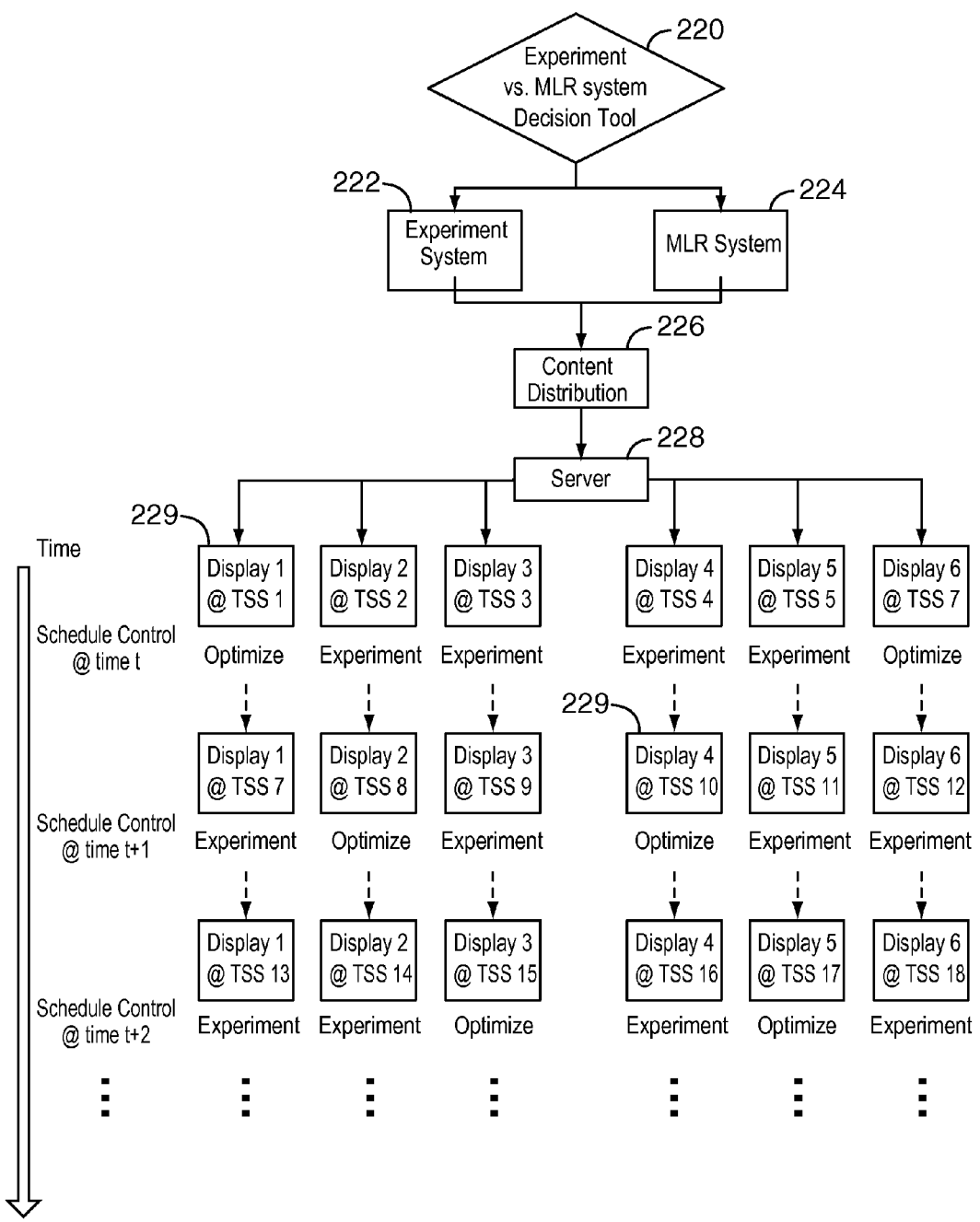
FIG. 30 is a system-wide view of how the processes described in FIG. 29 may be implemented for each time period on a display-by-display basis in accordance with embodiments of the invention.

FIG. 30 is a system-wide showing of how the processes described in FIG. 29 may be implemented for each time period on a display-by-display basis in accordance with embodiments of the invention. A decision tool, such as a DSN system processor or module, decides, based on system-wide conditions, whether 220 a particular time period (e.g., TSS) is to be used by or under the control of a cause-and-effect experiment or a machine learning system. If the former, the experiment system effectively takes control 222 of the time period. If the later, the MLR system effectively takes control 224 of the time period. Appropriate content is distributed 226 across the displays of the network accordingly.

Content distribution 226 is managed in the embodiment shown in FIG. 30 by a server 228. The server 228 is communicatively coupled to a multiplicity of displays 229, six of which are shown in FIG. 30 for purposes of illustration. The state of each display 229 is known at all times and for all time periods, shown as time-slot samples in this embodiment. For each display 229, the current TSS and mode (experiment or MLR mode) is shown for each time, t, of the schedule that is used by the server 228 (preferably by a DSN system processor or module) to control content distribution. In some embodiments, the time between time t and time t+1 is the duration of a time-slot sample. In another embodiments, the time between time t and time t+1 is a duration defined by the Time Interval (TI) as described herein.

Looking vertically along the time axis, the state of each display is shown for each time increment of the schedule control (i.e., @ time t, t+1, t+2, etc.). For example, the DSN system has determined that TSS 1 is to be used for executing a machine learning routine for Display 1 at time t. For time t+1, the DSN system has determined that TSS 7 is to be used for conducting a cause-and-effect experiment for Display 1. Continuing with this example, it can be seen that, for time t+2, the DSN system has determined that TSS 13 is to be used for conducting a cause-and-effect experiment for Display 1. The state of all displays of the DSN system is similarly known and controlled for each time, t through t+n, of the schedule control in accordance with this embodiment of the invention.

FIG. 30 provides a system view that further highlights advantages and benefits not achievable using conventional systems and techniques. To further emphasize aspects of real-world implementation concerns discussed previously, it should be understood that every moment a display is being used for optimization via MLR is a moment that the display is not being used for gaining insights via a cause-and-effect experiments and vice versa. A system that would be considered optimal with respect to allocation of display time would analyze each unit of time for each display and determine whether that unit of display time would add greater value by being used for cause-and-effect experimentation versus being used to maximize business goals. Presently, no conventional system or method exists that can achieve or approach this optimal system.

Advantageously, systems and methods of the present invention make this optimal allocation decision automatically by optimization algorithms in a top-level decision tool. That is, the top-level decision tool ensures that the value derived independently from the two subcomponents (the cause-and-effect experiment system and the MLR system) is maximized across the entire content distribution network, given that each subcomponent needs control of time periods (e.g., time-slot samples) in order to achieve its goals.

One way in which the decision tool may reallocate control is based on information that accrues during and related to a cause-and-effect experiment. The following examples are provided, which refer to time periods in terms of time-slot samples for illustrative purposes.

EXAMPLE #10

Because there are methods for adjusting the execution of cause-and-effect experiments while the experiments are underway, the top-level decision tool can continuously re-evaluate the cost/benefit equation for which sub-system should have control over the various time-slot samples as time progresses. That is, the value of insights gained from a cause-and-effect experiment may be overcome by the cost of conducting/finishing an experiment during the time course in which the experiment actually being conducted.

Based on early dependent variable data, the decision tool (or experiment system) can determine that the projected effect size of the factor under investigation is likely to be much smaller than initially expected, and as such, the experiment would take longer to conduct to reach the desired statistical power, and therefore the cost of conducting the experiment might exceed the expected benefit of the insight, in light of benefit the network owner could otherwise derive by giving control over to the MLR system.

EXAMPLE #11

The value of dedicating a particular time-slot sample (on a particular display, at a particular location) to the control of the experiment system may change as a result of the MLR system's ability to control that time-slot sample/display and gain more value. For example, whereas a particular time-slot sample might have been slotted to run 'condition x' of an experiment, if the MLR system could gain greater value by controlling the time-slot sample at that display, at that location, the decision tool could move the implementation of 'condition x' for the experiment to another display on the system. That is, 'condition x' might have been slotted to play on a display in Dubuque at 10:00 am, but now the decision tool decides to move that condition to a different time-slot sample such that it plays on a display in San Diego at 10:00 am instead.

As such, there are ways in which the decision tool may speed up or slow down an experiment by shifting control of time-slot sample, and, there are ways in which the decision tool may keep the experiment on the same pace, but re-arrange the physical location of where the experimental conditions play in the physical world, across the network. Likewise, the decision tool might reallocate control due to information that accrues from the machine learning routines.

Referring again to FIGS. 30 and 40C, and with reference to decision process 220, the "experiment vs. MLR system decision tool" is a set of algorithms that continuously monitors the network and decides how to allocate control of each TSS for each display to the subcomponent systems: a) experiment system 423, b) MLR system 427. The decision tool 220 uses inputs from: the user regarding the value of experimental insights, the experiment system regarding the required sample size/duration to meet the desired statistical power, the incoming dependent variable data as the experiment progresses, and the estimated or known value of allowing the MLR to control the TSSs in order to maximize current business goals.

The experiment system 423 is the subcomponent configured to receive inputs such as dependent measures of interest and their characteristics, environmental factors of interest, content factors of interest, viewer visit duration for the dependent measure of interest, and experiment urgency/value. The experiment system 423 then generates an experiment to be conducted on the content distribution network. The experiment system 423 can estimate the expected duration/sample size required to reach a desired level of statistical power.

The MLR system 427 is a set of processor implemented machine learning algorithms that continuously manages content distribution in order to maximize outcomes in the data streams of interest. The MLR system 427 takes inputs such as business goals and their value, the value of each effectiveness metric, content available to show on the network, any location or time constraints, and viewer visit duration associated with content. Content distribution 133 across the content distribution network occurs under the direction of both the experiment system 423 and the MLR system 427, (and/or the top-level decision tool 220 itself) via computer hardware and software (e.g., server 228/421).

FIG. 30 shows a representative network of six separate physical locations, each having one display 229, for a total network of six displays. For example, these might be six different quick serve restaurants located in six cities across the U.S. At some point in time during network operation, all displays 229 will be showing content defined by how each TSS gets populated. That is, TSSs on the network may be 30 minutes in duration, and each piece of content may be 30 seconds in length. Thus, 60 pieces of content will play in each TSS. The content pieces are drawn from a library of available content (e.g., stored in server 228/421).

The mix of (up to) 60 unique pieces content that fills each 30 minute TSS is preferably controlled either by the algorithms associated with the experiment system 423 or the MLR system 427. However, as shown in the diagram, any particular TSS across the network may be under the control of either the experiment or the MLR algorithms (where 'control' means choosing the content that fills the TSS and it's play order within the TSS). And, each TSS at any point in time may be under the control of either the experiment system 423 or the MLR system 427.

At the next TSS (the next 30 minute section of time), a display 229 may show content in a TSS that is under the control of the same subcomponent as the previous TSS, or the other subcomponent (as shown by looking down the vertical axis of FIG. 30 as time moves forward). For example, the decision tool 220 may decide that at TSS 1, Display 1 will show content defined by the MLR system 427 (to optimize business goals). Yet, when Display 1 shows content in TSS 7, the decision tool 220 may calculate that, for maximum value to the user, that TSS 7 should be under the control of the experiment system 423. Thus, at any point in time, displays 229 at different locations may be under the control of the same, or different subcomponents (experiment system 423 or MLR system 427) by virtue of showing content in time-slot samples defined by (or under the control of) either the experiment system 423 or the MLR system 427.

Figure 31:
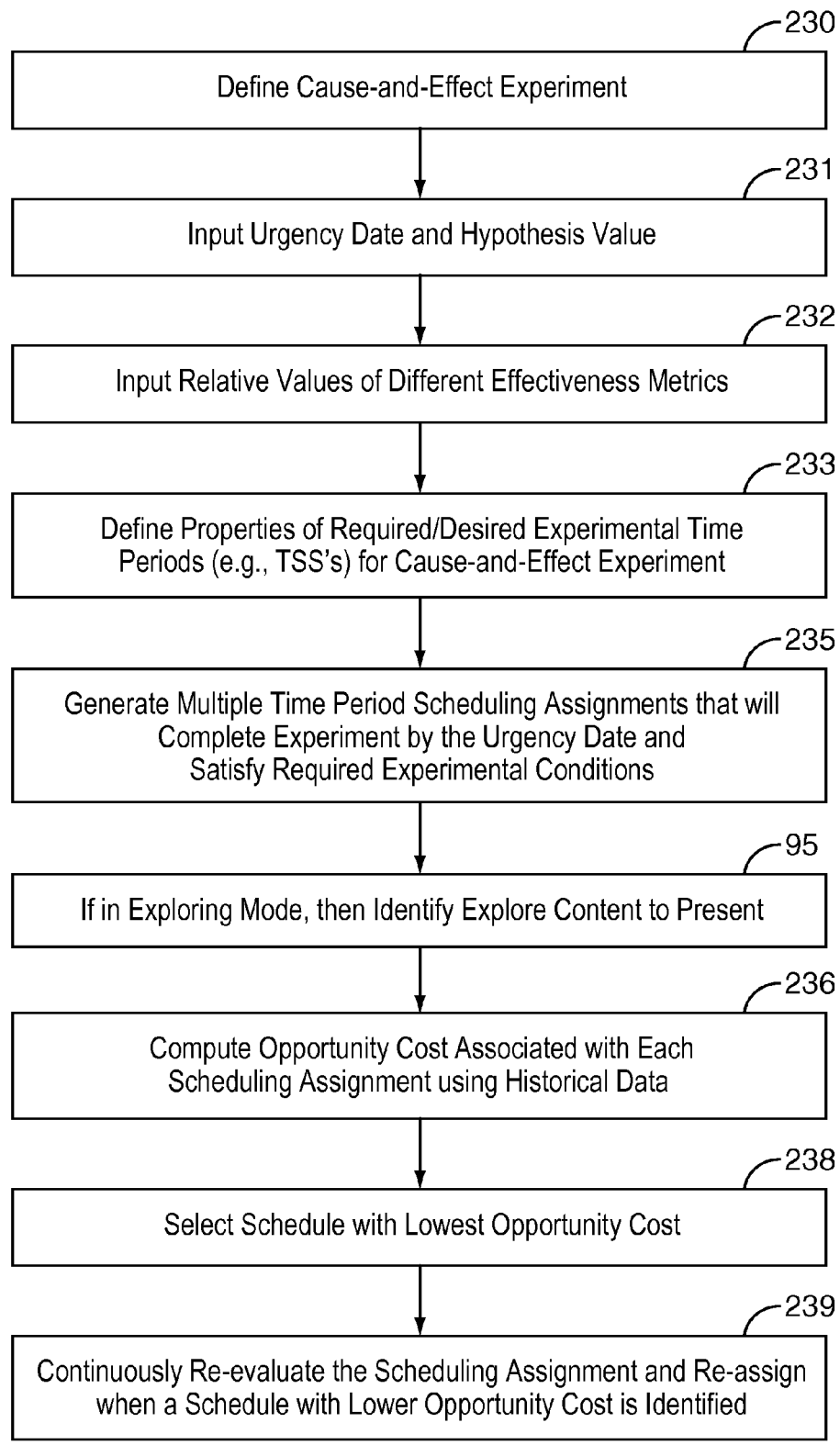
FIGS. 31-33 are flow charts that illustrate processes for continuously evaluating the assignment of display time periods (e.g., TSS's) to either a cause-and-effect experiment system or a machine learning system in accordance with embodiments of the invention.
Figure 32:
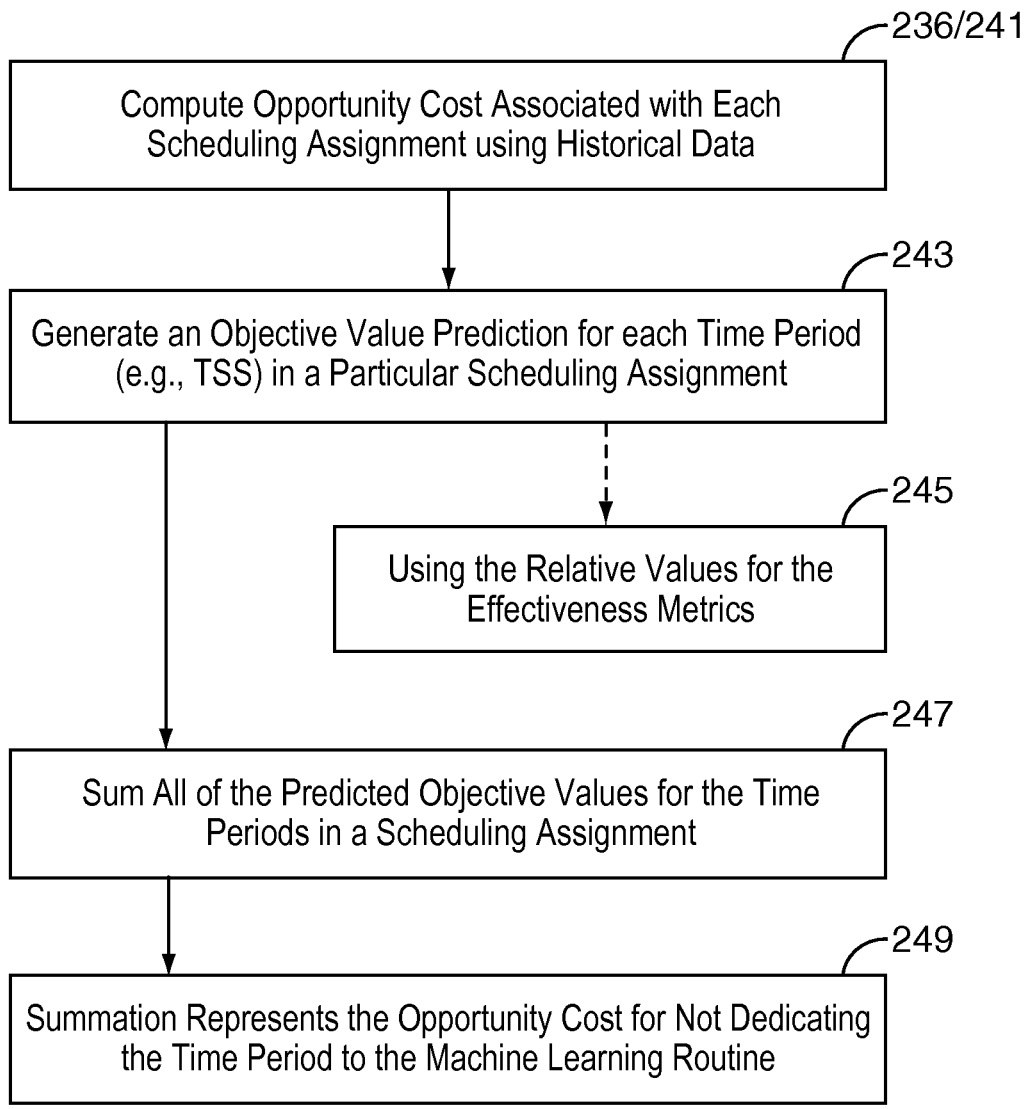
Figure 33:
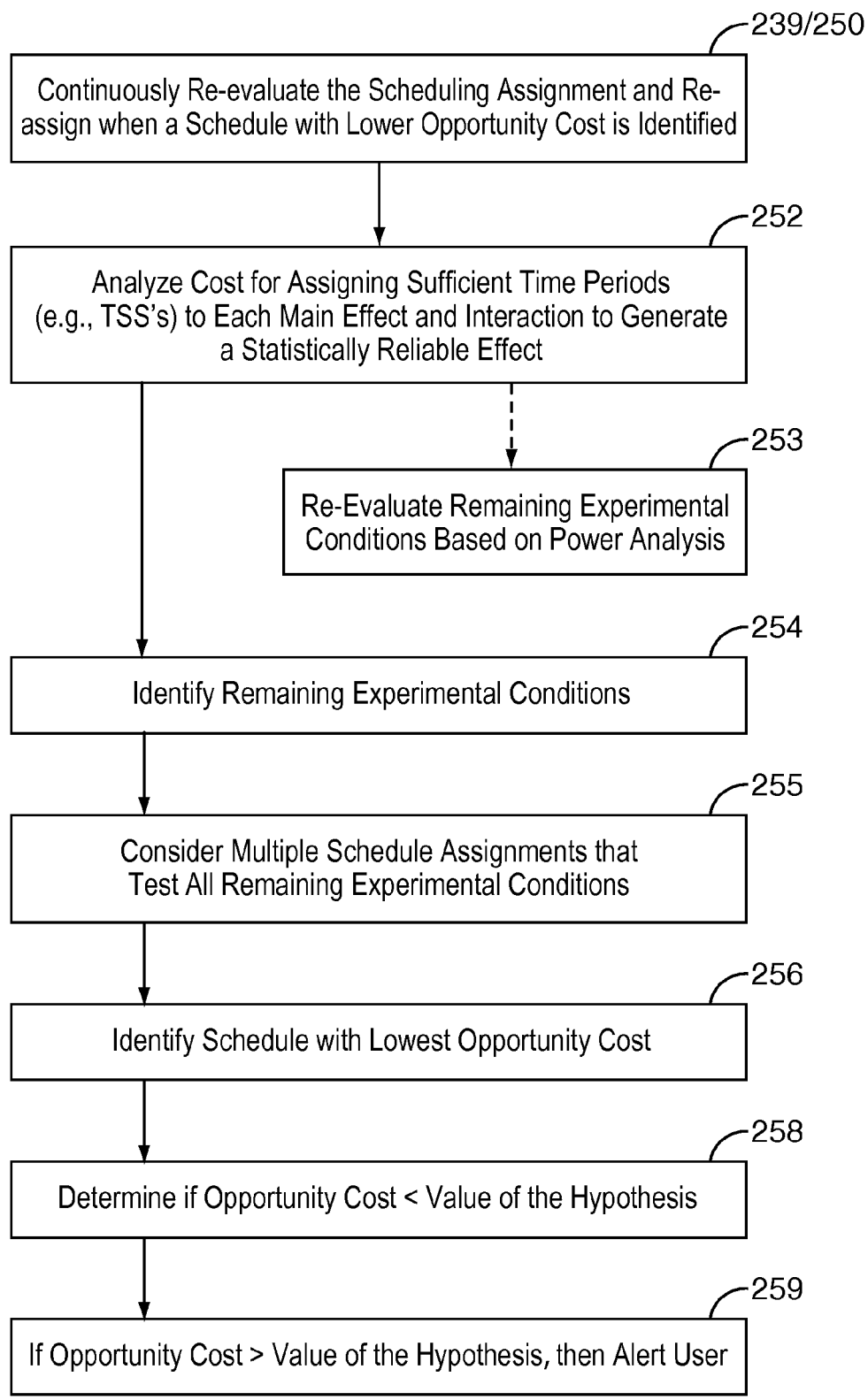

FIGS. 31-33 are flow charts that illustrate processes for continuously evaluating the assignment of display time periods (e.g., TSS's) to either a cause-and-effect experiment system or a machine learning system in accordance with embodiments of the invention. Representative implementations of processes consistent with FIGS. 31-33 are described below in the context of the following examples.

EXAMPLE #12

1. Define 230 a cause-and-effect experiment:
    a. define dependent and independent factors.
2. Input 231 urgency date and hypothesis value:
    a. specify relative values of main effects and interactions in experiment.
3. Input 232 relative values of different effectiveness metrics.
    a. for example, each upgrade is worth $100 and every dollar spent in the bar is worth $0.20.
4. Define 233 properties of required/desired experimental time periods (e.g., time-slot samples) for cause-and-effect study:
    a. specify all of the conditions that need to be run in the experiment.
    b. based upon the value of the main effects and interactions, specify the number of samples within each condition.
5. Generate 235 multiple time-slot sample scheduling assignments that will:
    a. complete the experiment by the urgency date.
    b. satisfy the required experimental conditions.
6. Use the historical data to compute 236/241 the opportunity cost associated with each scheduling assignment:
    a. for each time-slot sample period in a particular scheduling assignment generate 243 an objective value prediction.
        i. The objective value predictions are generated by taking the relative values for the effectiveness metrics and the predicted ROI from the MLR and computing 245 a predicted objective value prediction.

1. e.g., For TSS 1, it is predicted that there will be 10 upgrades and $500 in the bar. The objective value for this TSS would be $1,100=(10×$100/upgrade)+($500×0.2).
   ii. Sum 247 all of the predicted objective values for the TSSs in a scheduling assignment. This value specifies 249 the opportunity cost for NOT dedicating the TSS to the MLR.
7. Choose 238 the schedule with the lowest opportunity cost.
8. Continuously re-evaluate 239/250 the scheduling assignment and re-assign when a schedule with a lower opportunity cost is identified.
   a. Newly acquired historical data and/or new relative values on the effectiveness metrics will change the predicted values of different TSS. These changes can affect the least expensive scheduling assignment.
   b. Analyze 252 the cost for assigning enough samples to each main effect and interaction to generate a statistically reliable effect.
      i. Based on the power analysis re-evaluate 253 the remaining conditions (i.e., re-assign the sample conditions) that need to be conducted that takes into account the value of the individual hypotheses and the costs associated with each hypothesis.
   c. Identify 254 the remaining experimental conditions (e.g., those associated with Time-of-day, store type, etc.) that still need to be tested.
      i. These are the conditions that remain to be tested that were identified in Step 4 above.
   d. Consider 255 multiple schedule assignments that test all of the remaining conditions.
      i. Use the same method described in Step 6 above.
   e. Identify 256 the schedule that has the lowest opportunity cost.
   f. Determine whether the opportunity cost is less than the value of the hypothesis (Step 2 above).
      i. If no, then alert 259 the user.

EXAMPLE #13

Manticore is interested in evaluating whether a human Model in upgrade content is more effective than No-Model on the number of upgrades. Manticore is also interested in evaluating whether having a model interacts with the time daypart. More specifically, Manticore is interested in evaluating morning check-in versus evening check-in. The primary question of interest is whether the Model improves performance over No-Model regardless of the time-of-day that it is shown. The secondary question is whether the use of a Model interacts with the Time-of-Day.

To optimize the design of the study, the user inputs the value of the two questions. In this illustrative example, the user specifies that the Model vs. No-Model has a value of $10,000, while the interaction has a value of $3,000. An urgency date is set to complete the study within 30 days. The user is also queried about the minimum effect size that they would consider to be of value. The user specifies an effect size of at least 10% would be needed to be of interest.

The system first evaluates whether the opportunity costs associated with two different designs are below the threshold of the value set by the user for the answers to the two questions being asked (i.e., Model vs. No-Model and the interaction of Model with Daypart).

The first analysis is to determine the predicted opportunity cost for running an experiment evaluating the effectiveness of using a Model vs. No-Model. First, the system identifies the collection of time periods that can be used to complete the study. Using the properties of the time-slot samples, the system uses the historical data to determine the variance of the upgrade data and completes a power analysis to determine the number of samples to find a significant main effect of the size specified by the user (10%). The power analysis predicts that 150 samples are necessary (75 Model and 75 No-Model) to find a reliable effect.

Given this collection of time-slot samples, the system uses its historical database to generate a prediction about the expected rewards for these different time-slot samples using a machine learning routine (Expected Reward for the Machine Learning Routine, denoted ER(MLR) in this illustrative example). Also, using the historical database, the system makes a prediction about the expected reward for presenting the Upgrade content (Expected Reward for the True Experiment, denoted as ER(TE) in this illustrative example). The predicted ER(MLR) in this example is $20,000 and the ER(TE) is predicted to be $15,000. The opportunity cost is calculated as the difference between these two predictions:

$$OC\_Model=ER(MLR)-ER(TE\_Model)$$

In this case the opportunity cost ($5,000=$20,000−$15,00) is below the value of the answer to the hypothesis related to the use of Models within content ($10,000).

The system then considers the opportunity cost for answering the question related to the interaction (Model vs. No-Model with Morning vs. Evening). A second set of time periods are considered that only include Morning and Evening time periods. According to the user input (described above), the value of the interaction is $3,000. Thus, if adding the constraint of daypart increases the cost of the experiment by more than $3,000, then the user will be alerted to this fact. The opportunity cost of generating an experiment with the interaction is calculated by:

$$OC\_Interaction=(ER(MLR)-ER(TE\_Interaction))-OC\_Model$$

The ER(MLR) is calculated by making predictions about the MRL expected value for only the Morning and Evening dayparts—other dayparts are not considered. In this case, the ER(MLR) is calculated to be $23,000.

Using the historical database, the predicted expected reward for presenting the upgrade content material during these same periods is $16,000. Thus, the predicted opportunity cost for running the experiment with the interaction is $2,000 (($23,000−$16,000)−$5,000). The initial analysis shows that the opportunity cost of running the experiment with an interaction ($2,000) is below the value specified by the user of the answer ($3,000).

Given that the opportunity costs for both questions are lower than the value to the answers, the system generates an initial schedule that satisfies the requirements of the study with appropriate counterbalancing and randomization that will be completed by the 30-day urgency period specified by the user.

As data is being collected, the system is continuously re-evaluating the power analysis and the number of samples that are necessary to complete the study. Furthermore, the opportunity costs are also continuously evaluated to determine whether the predicted opportunity costs associated with answering each question remains below the value of the answer specified by the user.

In this example, after day 3 of the study, a power analysis of the interaction shows that, because there is a small interaction effect, a significant number of samples would be needed to generate a significant (and meaningful) difference (from an initial estimation of 200 samples to 1000 samples). This increase in necessary sample size produces an opportunity cost for the interaction that exceeds the value of the interaction specified by the user ($3000 value and a predicted opportunity cost of $12,000). That is, the effect size of the interaction is very small. By contrast, the effect size of the Main Effect of Model vs. No. Model is very large and the predicted opportunity cost for finishing the experiment with only the Main Effect is still below the value of the answer ($10,000 value and a predicted opportunity cost of $5,000). The user is alerted to the fact that the opportunity cost associated for finding a significant interaction now exceeds the value of the study and queried as to whether the user would like to continue the study with the interaction or simply run the study to generate an answer to the interaction.

With either response, the system will need to generate a new schedule. If the user decides to continue with the study, the schedule will have to include a significantly larger set of samples. If the user decides to continue with the study, but only run it with the interaction, the system will re-schedule the content to include content during all dayparts (not just morning and evening dayparts).

The system will continue to generate a power analysis to ensure that there are enough samples to complete the study with statistical reliability and that the opportunity costs for finding an answer do not exceed the value associated with the question.

Other embodiments of this system include those in which no urgency date is provided by the user. In this case, the system will cue up the experiment and will constantly evaluate whether particular time periods should be used for this experiment or not. One method for the system to automatically decide whether a particular time period should be allocated to the experiment is to derive a value of the time period for the experiment versus for the MLR. The method for calculating the predicted expected reward for the MLR is the same as that described above. The method for calculating the value of the time period for the experiment is derived by taking the value of the experiment (or hypothesis being investigated) and dividing that value by the estimated number of time periods needed to conduct the study (using a power analysis). When a time period that is necessary for conducting the experiment is being considered, the system will conduct this calculation (time periods not necessary for the experiment have zero value). If the value of the time period is greater than the expected reward for the MLR, then the system will allocate that time period to the experiment—otherwise the time period is allocated to the MLR. The user can monitor the progress of the experiment, and if the value of the hypothesis begins to increase, the user can modify the value to increase the speed at which the system will complete the study. In another embodiment, the user may only specify the urgency date and no value of the hypothesis. Under this condition, the system will specify a schedule and continuously update the schedule that minimizes the cost for conducting the experiment before the end of the urgency date.

Embodiments of the present invention are directed to systems and methods that facilitate user input of data associated with one or more hypotheses for a cause-and-effect experiment and data associated with one or more business goals. After entry of these and other necessary data, processes of the present invention, such as those described above with reference to FIGS. 29-33 for example, are executed to ensure that, for each time period of a playlist schedule and for each display of a network of displays, that the system will work to maximize the utility of the network to achieve the user's requirements indicated by the user's input data. The user need not be further involved in these processes unless involvement is desired. The user may, at any time, query the system to determine the state of the network displays, and may do so at various levels of resolution—with granularity down to a time period-by-time period basis (e.g., TSS-by-TSS basis) if desired. The user may implement changes to these processes, such as by terminating an experiment or increasing the amount to time periods allocated to explore and/or exploit routines, for example.

As was discussed previously, a machine learning system may be implemented in accordance with embodiments of the present invention exclusive of a cause-and-effect experiment system. According to embodiments of the invention, a machine learning system is preferably implemented using a digital signage network of a type described herein. Time periods of a playlist schedule are allocated for presenting various content on each display of the DSN network in accordance with a particular machine learning routine. Content is distributed and data is collected in accordance with MLR algorithms for optimizing content distribution patterns that maximize one or more effectiveness metrics (e.g., point-of-purchase sales, upgrades, customer loyalty, etc.). Various type of MLR systems may be implemented, including those configured to execute reinforcement learning routines, logistic regression routines, unsupervised learning routines, semi-supervised routines, transduction routines, genetic algorithms, support vector routines, and learning-to-learn routines, among others, and those that use one or more neural networks.

According to various embodiments, an MLR can be conducted without any cause-and-effect experimentation. Under these conditions, the constraints that a cause-and-effect experiment require can now be removed. More particularly, when considering content to present during a particular time period, the DSN system does not have to consider whether the content has the potential of confounding the cause-and-effect experiment. Thus, when the MLR is being run without cause-and-effect experiments, the MLR can consider all of the content that it has at its disposal (e.g., explore content, exploit content, etc.). Representative processes for implementing content optimization routines exclusive of cause-and-effect experiments according to embodiments of the invention include those shown in blocks 92-98 of FIG. 9, for example.

Other representative embodiments of systems and methods that employ MLR routines without a cause-and-effect experiment are those that use time-slot samples. According to these embodiments, the system assigns content to TSS's that are defined by the Viewer Visit Durations (VVDs) associated with the time that a customer can potentially see a display sign and ultimately act upon the content presented by the display. Methods for defining a TSS are described herein. For a particular TSS, the MLR selects the content without considering whether the content would confound a cause-and-effect experiment. The MRL then executes the necessary algorithms as shown in blocks 92-98 of FIG. 9, for example.

The following discussion is primarily directed to details for implementing a cause-and-effect experiment in accordance with embodiments of the invention. Although primarily describing cause-and-effect experiments, many aspects of the following discussion are applicable or adaptable to implementation of machine learning systems, such as the embodiments described hereinabove. By way of introduction, there are two major classes of research: experimental and non-experimental. Embodiments of the invention that involve cause-and-effect experiments are generally directed to systems and methods for conducting "true" experimental research and to sub-systems and sub-processes of such systems and methods that have stand-alone utility and usefulness. However, while systems and processes of the present invention described herein find particular usefulness when used as part of a true experiment, many of the systems, processes, and methodologies described herein find usefulness and value outside the context of a true experiment.

For example, various aspects (e.g., sub-systems and sub-processes) of the systems and processes described as part of a true experiment may be implemented in quasi experiments, correlational studies, or other forms of non-experimental research. Implementing various system aspects and methodologies described herein can significantly improve the efficiency and accuracy of non-true experimental systems and methodologies. It is therefore to be understood that the processes, methodologies, systems, and devices described herein are not limited to use only within the context of true experimental research, but may be used advantageously in other forms of research, such as non- or quasi-experimental research and correlational studies.

Experiments are typically conducted to determine empirically if there are relationships between two or more variables, and typically begin with the formation of one or more hypotheses positing that there is a relationship between one or more independent variables and one or more dependent variables. For example, a researcher at a pharmaceutical company might formulate a hypothesis that the amount of a new drug that patients take will be related to the blood pressure of patients. Various types of experiments may be distinguished by the manner and degree to which they are able to reduce or eliminate the effects of confounding variables. Confounding variables are factors that could vary systematically with the levels of the independent variable. Only "true experiments," however, can empirically determine causation, which is why the Food and Drug Administration requires that "true experiments" be used to provide data regarding the effectiveness of new drugs, for example.

Independent variables are the variables defined or manipulated by the experimenter during an experiment, the amount and/or frequency of a drug administered to patients, for example. Dependent variables are the variables posited to be predicted by the value of the independent variable, such as the blood pressure of patients. The experimenter then conducts an experiment to determine if there is indeed a relationship between the independent and dependent variables, such as if the amount of a drug patients receive is related to the blood pressure of patients in a pharmaceutical experiment.

Confounding variables may also influence the dependent variable. These confounding variables are not of primary interest in the experiment, yet can influence the dependent variables and therefore obscure an accurate cause and effect relationship between the independent and dependant variables. The experimenter is trying to understand the causal relationships between the independent and dependent variables, however, these confounding variables can render the results of an experiment uninterpretable. Some examples of confounding variables include Hawthorne effects, order effects, carryover effects such as between-location confounds and within-location confounds, demand characteristics, and/or any other factor that could vary systematically with the levels of the independent variables, e.g., such as the body mass of a test subjects in the pharmaceutical experiment discussed above.

Confounding variables make it difficult or impossible to know which factor (variable) caused any observed change in the dependent variable(s). The existence of confounding variables that are not properly controlled during the experiment renders it difficult or impossible to make statistical inferences about causal relationships between the independent and dependent variables.

Various types of experiments may be distinguished by the manner and degree to which they are able to reduce or eliminate the effects of confounding variables. The only research methodology that reliably reveals causality is true experiments. The term "true experiment" denotes an experiment in which the following three characteristics must exist:

1. There are at least two levels of an independent variable.
2. Samples are randomly assigned to levels of the independent variable. That is, each sample in the experiment is equally likely to be assigned to levels of the independent variable.
3. There is some method of controlling for, or eliminating, confounds.

Experiments that lack any of the above three characteristics are not true experiments, and are often referred to as quasi-experiments or correlational designs. Only true experiments allow statistical inferences to be drawn regarding the causal relationships between independent and dependent variables. Quasi-experiments and correlational designs may allow relationships between independent and dependent variables to be established, but it is not possible to determine whether those relationships are causal. Various types of experimental designs (including true experiments) have been described, for example, in Campbell, D. T., & Stanley, J. C., *Experimental and Quasi-Experimental Designs for Research*, Rand McNally, (1963).

Delivering content on displays of a digital signage network within physical environments is rife with potential for confounds that do not exist within the Internet domain. In a physical environment, although people are generating dependent variable data (e.g., point-of sale or POS logs, satisfaction survey responses, sensor events), it is difficult to connect the dependent variable data to the levels of the independent variables (e.g., content on displays) to which they might have been exposed. Consumers wander through stores and may or may not notice the displays or the content playing on them. Moreover, the content played may change while the consumer is within viewing range, thus exposing them to multiple levels of the independent variable. Furthermore, many other variables might influence dependent variable data, ranging from more-or-less predictable variables, such as changing hotel occupancy rates or seasonal temperature variances, to the unpredictable, such as competitive marketing promotions and road construction.

Two types of confounds within the physical environment present extremely difficult measurement-related challenges: Between-location confounds and within-location confounds, also referred to as between-location and within-location carryover effects. It is possible to have both within- and between-location carryover effects. Within-location carryover effects occur when viewers who were present during one experimental condition (e.g., while control content is displayed) are still present during a different experimental condition (e.g., when experimental content is displayed). Between-location carryover effects occur when viewers at one location act on the content at a different location.

Embodiments of the invention relate to methods and systems that provide for determining the existence of, and measuring the strength of, cause-and-effect relationships between content being communicated and its effectiveness on recipients. Methods and systems implemented in accordance with embodiments of the invention facilitate distribution of communication content and assessment of the effectiveness of distributed communication content and, as discussed above, facilitate automatic optimization of content distribution patterns to maximize return on investment or other pre-established business objective. Embodiments of the present invention provide for distribution of communication content in a manner such that the distribution pattern enables measuring of content effectiveness.

Embodiments of the present invention provide for systematic control of the pattern (i.e., timing and location) at which communication content is distributed in order to control for and/or eliminate confounds.

Communication content may take many forms, including visual or aural, or any form that can impact or be detected by the human sensory system (e.g., the five senses of the human sensory system, including tactile or touch, taste, and smell, in addition to vision and hearing). Communication content may be static, dynamic or a combination thereof.

Distributing communication content may be effected in many ways, including electronically, optically, audio broadcasting, or graphically or pictorially via static or dynamic images, for example. Communication content may be distributed to and within a variety of physical environments, including retail stores, banks, hotels, airports, roadways, railways, and other public or private spaces. Communication content may be presented via stationary or mobile structures, devices, and systems.

According to embodiments of the present invention, a computer-implemented system and method provide for generating time-slot samples, each of which is assigned a clock time. Each time-slot sample has a specified time duration referred to as a time-slot sample duration, to which content may be assigned, and a data collection period for measuring effects of the assigned content. The data collection period of a time-slot sample is a period of time during which dependent variable data is collected. According to other embodiments, a computer-implemented system and method provide for assigning pieces of content to time-slot samples for displaying on displays for measuring effects of the assigned content pieces.

Embodiments of the present invention provide for the distribution of communication content and to assessing effectiveness of such content consistent with constraints of a true experiment. Embodiments of the present invention are directed to providing, for use in a computer-implemented process, rules for displaying communication content consistent with constraints of a true experiment. The rules, which may be time based or event driven, preferably control or eliminate confounds, such as carryover effects. The communication content is displayed according to the rules. Data relating to effectiveness of the communication content is collected, and the effectiveness of the communication content is evaluated based on the collected data.

Embodiments of the present invention are directed to algorithmically distributing content across one or more displays such that the distribution pattern meets the constraints of a true experiment for measuring the effects of the content. Conducting true experiments on communication content distribution networks, such as digital signage networks or the Internet, provides for determining the existence of, and measuring the strength of, cause-and-effect relationships between communication content and measures of business success (e.g., sales, sensor events, survey data, etc.).

Embodiments of the present invention employ algorithms to automatically schedule and present signage content such that the content presentation pattern precisely corresponds to the experimental design. The output of the algorithms may be used as the basis for parsing the dependent variable data to correspond to the experimental conditions.

While digital signage networks, for example, present many challenges, such networks also offer ideal conditions for experiments than other media, such as broadcast or cable television, radio, and print. With regard to television and radio, for example, advertisers cannot control which televisions play their commercials (i.e., manipulate independent variables), and they cannot measure the direct effect of the commercial on product sales (i.e., measure effects of the independent variable on the dependent variable). Since most marketing research methodologies have evolved from these media models, market researchers appear to have overlooked the possibility of conducting true experiments.

Digital signage networks, by way of further example, allow for precise scheduling of advertising content (i.e., the ability to precisely manipulate independent variables). And, because displays are typically near the product or otherwise in an environment in which changes in behavior can be measured, it is possible to measure behavioral changes that arise from the content (i.e., it is possible to measure effects of the independent variable on the dependent variable). Also, data used to evaluate success against objectives are typically already collected in a form that can be readily used within the experiment.

According to methodologies of the present invention, the independent variable is preferably digital signage content and the dependent variable may be any measure with business implications (e.g., sales data, sensor data, survey data). Using systems and methods of the present invention, it is possible to systematically control the pattern (i.e., timing and location) at which digital signage content is distributed across the digital signage network in order to control for and eliminate confounds.

In the context of various embodiments of the present invention, the independent variables correspond to the properties of the content, such as a strategic message or even an executional element like a dominant color or use of a photographic image. There are always at least two levels of the independent variable: either both are experimental content or one level is experimental and one is control content. Experimental content is the content that is hypothesized to have an impact on the dependent variable (analogues to the drug or drugs being tested in a clinical drug trial experiment). Control content is any content that would not be expected to impact the dependent variable (analogous to a placebo pill in a clinical drug trial experiment). Manipulating the independent variables involves assigning either experimental or control content to be presented on signs at different times and different locations. The different levels of the independent variables are randomly assigned (with constraints, as described below) to the different signs and different locations. The dependent variables can be any variable that would be posited to be impacted by the content (e.g., sales data, sensor data measuring pre-purchase behavior).

Confounding variables, as discussed above, may influence the dependent variable and therefore obscure an accurate cause and effect relationship between the independent and dependant variables. If the experiment is double-blind, for example, and given proper randomization, there are only two categories of possible confounds; carryover effects (e.g., between- and within-location confounds), which are described above, and content confounds.

Content confounds occur when more than one version of experimental content for the same dependent variable is played during the same time-slot during which measurement of the dependent variable is being measured. Such instances render it impossible to know which content underlies any observed change in the dependent variable. These types of confounds may be eliminated by ensuring that, within a given time-slot, only experimental and/or only control content is presented.

As previously discussed, carryover effects occur when it is possible for a viewer to observe content during one time-slot corresponding to an experimental condition and act on the content during a time-slot associated with a different experimental condition. Again, such instances render it impossible to know which content underlies any observed change in the dependent variable. Within-location carryover effects occur when viewers who were present during one experimental condition (e.g., while control content is displayed) are still present during a different experimental condition (e.g., when experimental content is displayed). Within-location confounds may be controlled by ensuring that the time-slot samples to which content can be assigned are sufficiently long to ensure that during some of the time-slot samples (e.g., half of the time-slot sample), the vast majority of the viewers (e.g., 95%) present at the viewing location were not present during the previous time-slot sample. In this case, data are preferably only recorded during the portion of the time-slot sample in which the vast majority of viewers who would have been present during the previous time-slot sample would have left the location.

An alternative approach involves using most or all of the data recorded during the time-slot sample, but weighting the data more heavily toward the end portion of the time-slot sample as compared to the beginning portion of the time-slot sample. Furthermore, any still existing within-location carryover effects (e.g., those that would arise from the 5% or fewer consumers that would have been exposed to both versions of test content) may be eliminated by counterbalancing the order at which content is presented (e.g., ensuring that content B follows content A as often across the experiment as content A follows content B).

Between-location carryover effects occur when viewers at one location act on the content at a different location. Between-location carryover effects may be eliminated by ensuring that locations within plausible traveling distance of each other are constrained in the content they play such that it is not possible to leave one location while one experimental condition is in force and go to a nearby location and act in ways that affect the dependent variable(s) while other experimental content is in force.

Two types of blocking may be employed for different reasons; blocking by optimization factors and blocking by noise variables. Optimization factors are those factors at the signage location that might have implications for the effectiveness of the content. Such factors include signage location, ambient lighting, socioeconomic status of viewers, dayparts, and the like. Blocking by these factors allows for factorial analyses to measure interactions between content and optimization factors (e.g., measuring whether content A is more effective in the morning whereas content B is more effective in the evening). Blocking by noise variables can be used to increase statistical power by eliminating variability associated with factors that impact the dependent variable that are predictable but that are of no interest with respect to the experiment.

Provided hereinbelow are representative examples directed to distribution of communication content and assessing the effectiveness of such content in a manner consistent with constraints of a true experiment. These examples are provided for illustrative purposes only, and do not limit the scope or application of the disclosed principles. Rather, a wide variety of media and communication distribution architectures and methodologies are contemplated, including those involving print media, cellular or wireless communication devices, Internet accessed content and devices, including fixed and portable (e.g., hand-held) devices, in-store and outdoor (e.g., electronic billboard) display systems. A wide variety of content that can be communicated over such architectures and devices is also contemplated, including advertising content, teaching content, and way finding content, for example.

Although the automated experimental design methodologies described herein are generally focused on digital signage applications, it is understood that such methodologies may be applied to numerous marketing communication tactics, including webpage design, Internet advertising, point-of-purchase printed marketing, and direct marketing, among others. For example, Internet analytics methods or web-based automated experimentation systems, such as the systems disclosed in U.S. Pat. Nos. 6,934,748 and 7,130,808 which are incorporated herein by reference, may be modified in accordance with the present invention to provide for implementing true experimental design or sub-processes that have constraints of a true experiment.

Aspects of the present invention may be incorporated in automated content distribution systems and methods that are not directed to experimentally measuring the effects of the distributed content, but involve distributing content based on other constraints, such as fulfilling contract obligations. An example of such a system and method is disclosed in U.S. Patent Publication No. 2006/0287913, which is incorporated herein by reference. In such systems and methods, content distribution may be performed while simultaneously measuring the effectiveness of the distributed content in accordance with the present invention.

The following non-limiting examples of systems and methodologies illustrate various embodiments of the present invention. Some of the examples are directed to systems and algorithms that facilitate measuring the effectiveness of communication content consistent with constraints of a true experiment. Some of the examples are directed to systems and algorithms that facilitate control of the pattern at which communication content is distributed in order to control for and eliminate (or significantly reduce) confounds. Some of the examples are directed to systems and algorithms that may be implemented to facilitate non-experimental analyses of content effectiveness, such as in quasi-experimental analyses and correlational studies.

Figure 34A:
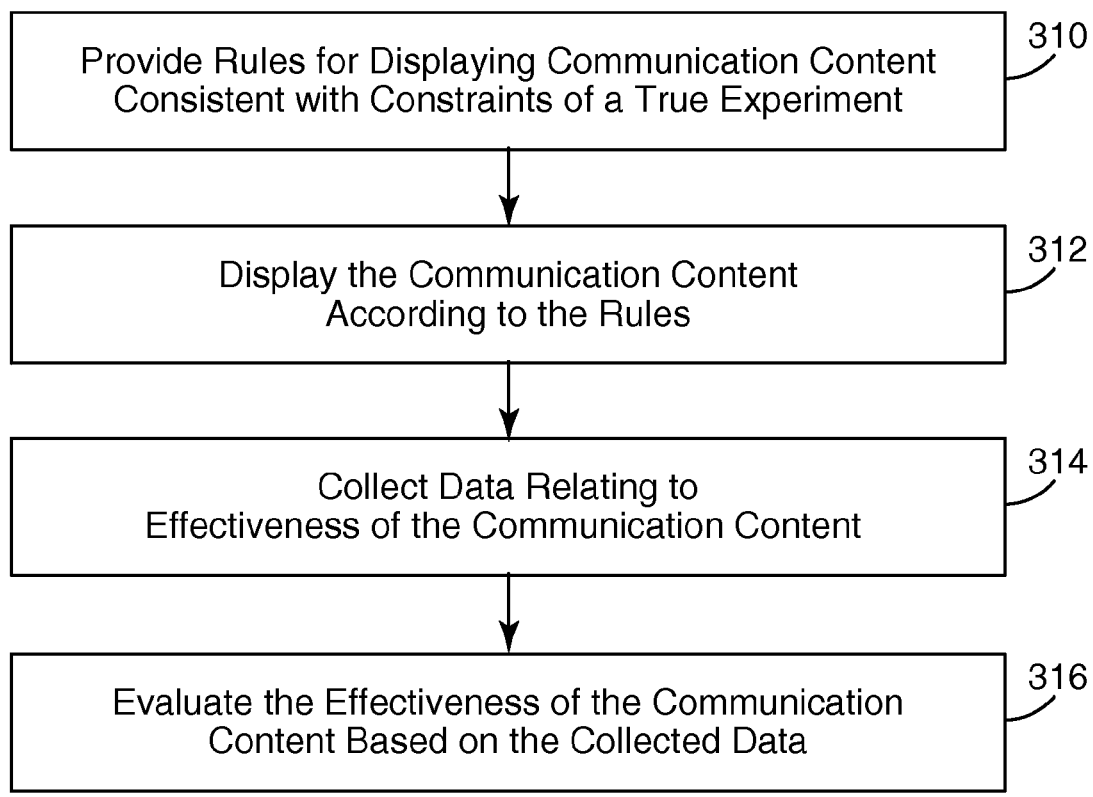
FIG. 34A is a diagram that illustrates processes implemented by computer assistance for distributing communication content and assessing effectiveness of such content in accordance with embodiments of the present invention.

Various embodiments of the present invention provide for automatic parsing of the dependent variable data to correspond to the experimental conditions. FIG. 34A illustrates embodiments that involve the provision 310 of rules for displaying communication content consistent with constraints of a true experiment. In some embodiments, provision 310 of these rules involves creation of such rules consistent with constraints of a true experiment. In other embodiments, previously created rules are provided to a system that provides for displaying communication content consistent with constraints of a true experiment. As is further shown in FIG. 34A, the communication content is displayed 312 according to the rules. Data relating to the effectiveness of the communication content is collected 314, and the effectiveness of the communication content is evaluated 316 based on the collected data.

Figure 34B:
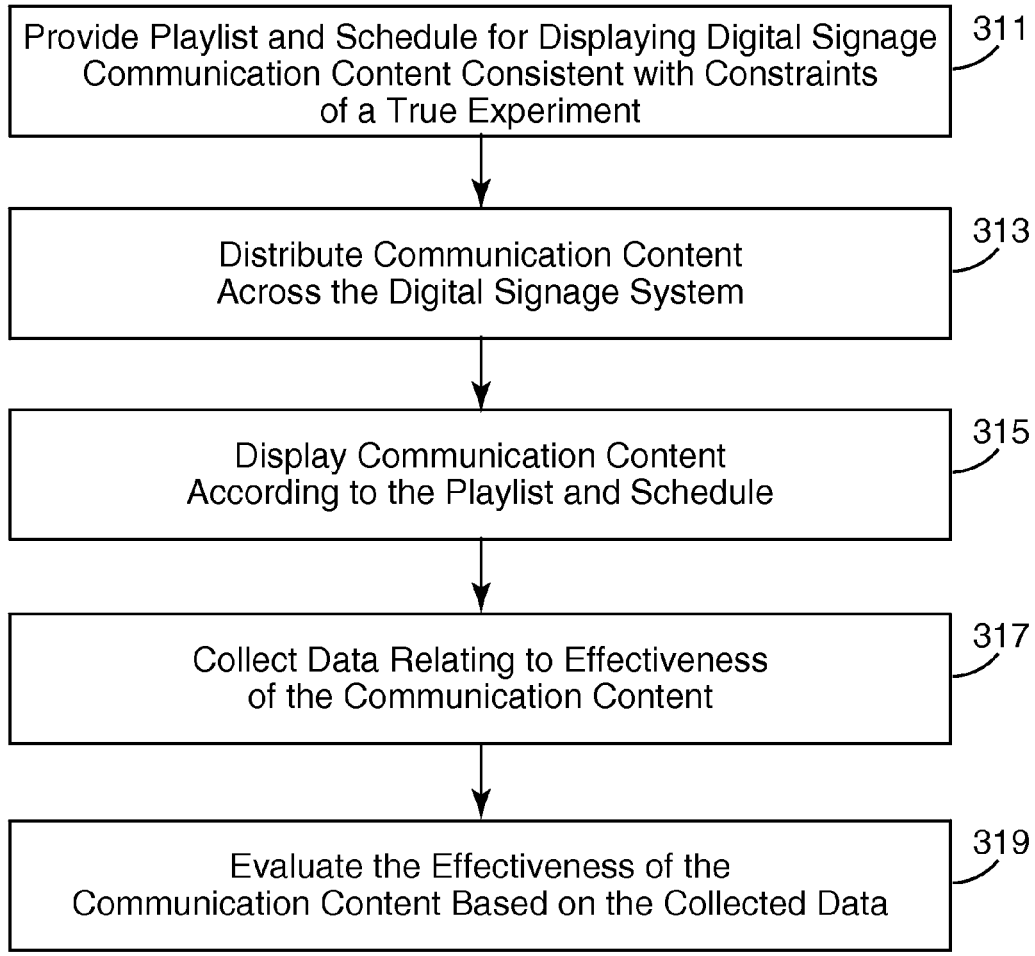
FIG. 34B is a diagram that illustrates processes implemented by computer assistance for distributing communication content and assessing effectiveness of such content in accordance with embodiments of the present invention.

FIG. 34B is illustrative of embodiments directed more particularly to automatic scheduling and presentation of digital signage content. According to FIG. 34B, a playlist and schedule for displaying communication content consistent with constraints of a true experiment are provided 311. A playlist refers to the order of individual pieces of content, and a schedule dictates playback of pieces of content, such as those defined by a playlist.

In some embodiments, provision 311 of the playlist and schedule involves creation of the playlist and schedule consistent with constraints of a true experiment. In other embodiments, a previously created playlist and schedule are provided to a system that provides for displaying communication content consistent with constraints of a true experiment. The communication content is distributed 313 across a digital signage system. The communication content is displayed 315 on displays of the digital signage system according to the playlist and schedule. Data relating to the effectiveness of the communication content is collected 317, and the effectiveness of the communication content is evaluated 319 based on the collected data.

It is to be understood that one or multiple processing devices (e.g., PCs, mini-computers, network processors, network servers, etc.) may be used to perform one, some, or all of the processes shown in FIGS. 34A-34B and in other Figures of this disclosure. For example, a first processor or set of processors may be used in the creation of playlists and schedules. A second processor or set of processors may be used to distribute content at one location or across a digital signage system. A third processor(s) may be used to display content according to the playlists and schedule, while a fourth processor(s) may be used to collect data relating to content effectiveness. A fifth processor(s) may be used to evaluate the effectiveness of content based on the collected data. In some embodiments, these processes and other processes discussed herein (e.g., those associated with machine learning systems) can be implemented by one or more processors that may be networked so as to effect communication between some or all of these processors.

In other embodiments, some or each of such processes may be implemented by processor(s) that are not networked or otherwise linked to effect communication therebetween. For example, a first processor(s) may be configured to execute a set of program instructions to implement playlist and schedule creation, while a second processor(s) may be configured to execute a set of program instructions for distributing content to one or a number of display devices. Unless otherwise indicated, the terms processor, computer or module (and their variations) as used herein and in the claims contemplate a single processor, multiple processors of which some or all may be communicatively coupled, disparate processors (single of sub-networks) that are not communicatively coupled together, and other configurations of processing resources.

Figure 35:
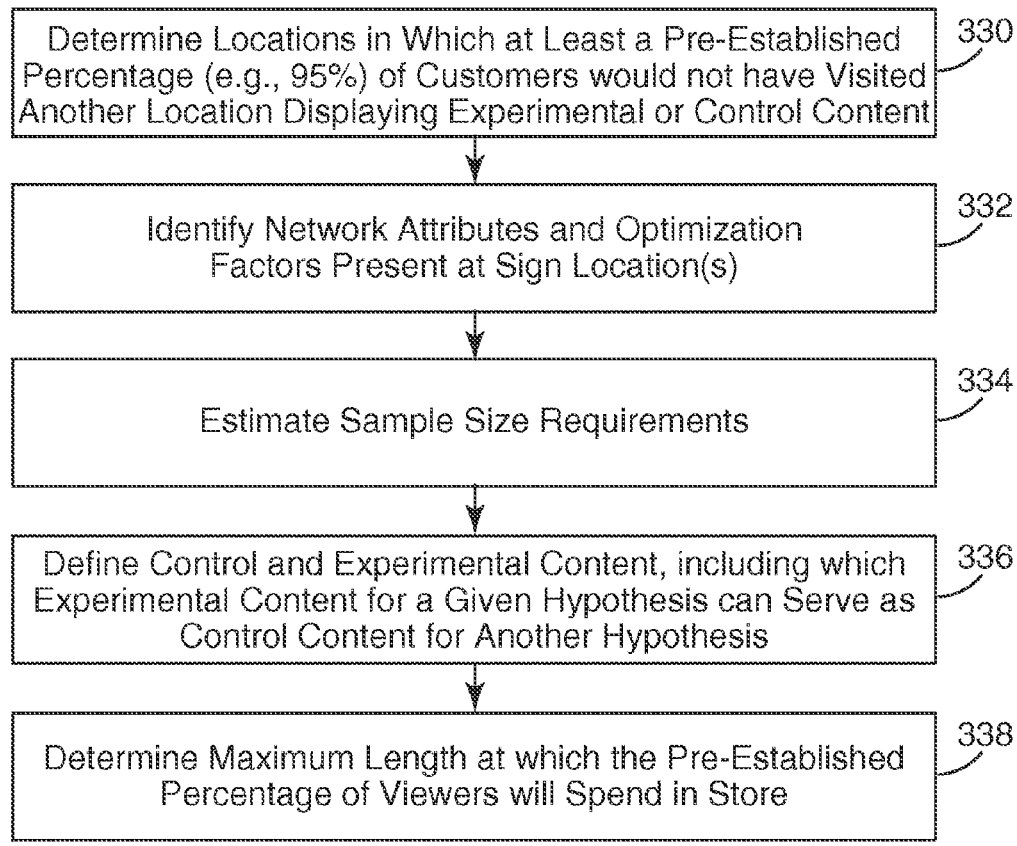
FIG. 35 illustrates processes involving network setup and data gathering in connection with algorithmically scheduling and presenting communication content consistent with constraints of a cause-and-effect experiment in accordance with embodiments of the present invention.
Figure 36A:
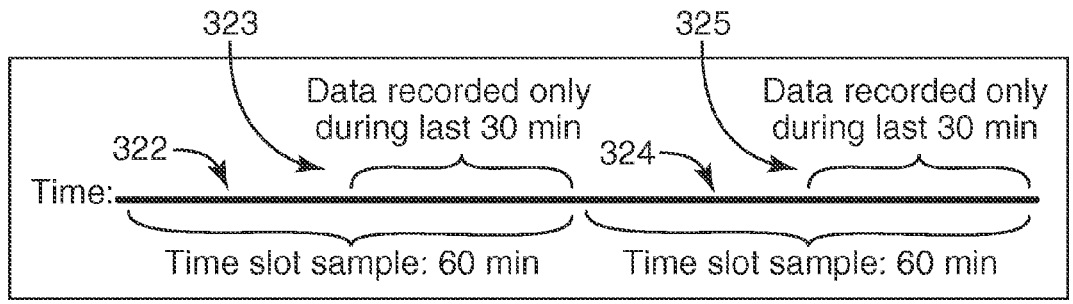
FIG. 36A illustrates processes for controlling location carryover effects in connection with distributing communication content and assessing effectiveness of such content in accordance with embodiments of the present invention.
Figure 36B:
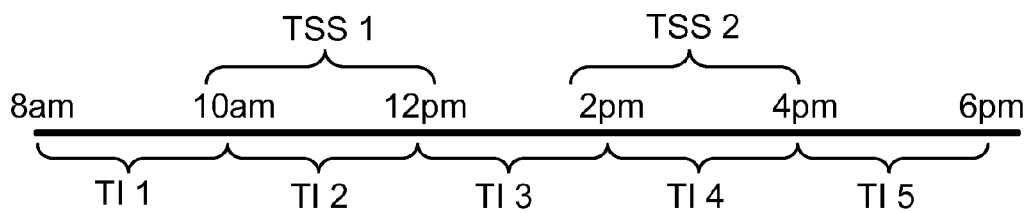
FIG. 36B illustrates processes for controlling location carryover effects in connection with distributing communication content and assessing effectiveness of such content in accordance with other embodiments of the present invention.

FIGS. 35 and 36A-36B illustrate processes related to algorithmically scheduling and presenting communication content consistent with constraints of a true experiment in accordance with embodiments of the present invention. FIG. 35 shows various processes involving network setup and data gathering in connection with algorithmically scheduling and presenting communication content in accordance with embodiments of the present invention.

According to the illustrative example shown in FIG. 35, setting up the digital signage network setup involves determining display locations that facilitate control, reduction, or elimination of confounds, such as carryover effects. For example, setting up the network may involve determining locations 330 in which at least a predetermined percentage (e.g., 95%) of customers would not have visited another location displaying experimental or control content. It is not critical that a value of 95% is chosen. However, it is understood that the greater the value chosen, the less likely it is that the result could underestimate the precise amount of the return on investment from the content. The value of 95% is simply large enough that, with proper counterbalancing, the impact of carryover effects would be almost nonexistent.

It is important to ensure that the vast majority of viewers will not have an opportunity to see the message at one site and act upon it at another site that is playing different control or experimental content. Instances of this happening would be instances of carryover effects, which can confound the results of the experiment. For example, if one were conducting experiments on displays in automobile dealerships, one would need to know which dealerships are close enough in proximity to each other such that a viewer could see content in one dealership and purchase vehicle in another dealership partaking in the experiment. This can be accomplished as part of the digital signage network setup. For example, the software could prompt the installer to select all of the locations across the network at which viewers could plausibly visit after leaving their dealership (e.g., other dealerships in the same geographic region).

Network attributes and optimization factors present at sign locations are preferably identified 332 at part of the digital signage network setup. Such factors may include characteristics of each site that predictably impact the value of the dependent variables at the locations (e.g., store size, socio-economic class, other advertising efforts, daypart differences in the typical number of viewers at the location). These factors then become blocking factors in the experiment.

There are two categories of blocking factors. One category includes those factors in which the experiment would test for interactions, and that would have implications for strategic decisions about what content to display (e.g., content A might be more effective at low Socio-Economic Status (SES) dealerships whereas content B might be more effective at high SES dealership). The other category of blocking factors are those that do not have obvious implications for which content to show, but that should nonetheless be blocked against in order to increase the statistical power of the experiment. Again, these factors can be specified during the software installation process and updated thereafter.

Network setup also includes estimating sample size requirements for the experiment 334. Ideally, a statistical power analysis is preferably used to calculate how much data is needed to find statistically significant results of at least some minimum magnitude that is of business interest.

Control and experimental content are defined 336 as part of the network setup. Control content (i.e., the placebo) can be any message that is neither intended nor likely to influence the desired behavior, such as local weather or news, or messages about a product or service that is unrelated to the dependent variable. Experimental content is the content that is hypothesized to cause a change in the dependent variable. It is noted that, under some circumstances, experimental content for one hypothesis can serve as control content for a different hypothesis.

Data regarding the maximum duration that the vast majority of viewers spend at the site conducting their business is acquired 338 and used to control for carryover effects. Examples of processes for eliminating or controlling for location carryover effects are described in commonly owned U.S. patent application Ser. No. 12/166,984, filed on Jul. 2, 2008, which is incorporated herein by reference.

FIG. 36A illustrates processes for controlling (e.g., reducing or eliminating) location carryover effects in connection with distributing communication content and assessing effectiveness of such content in accordance with embodiments of the present invention. FIG. 36A illustrates how within-location carryover effects are controlled if the maximum duration at which 95% of customers would spend at the signage location is 30 minutes. In this illustrative example, the time-slot sample 322, 324 during which content is played is double the maximum duration at which 95% of customers spend at the location.

Data recording does not begin until 95% of the customers who were present during the previous time-slot sample would have left the signage location. In this example, data are only recorded during the last 30 minute portion 323, 325 of the time-slot sample 322, 324. It is noted that the time interval for each location is preferably represented by the smallest unit of time across which dependent variable data can be measured. For example, sales data collected in some point-of-sale systems is provided in units of seconds, whereas other systems report sales only across units of hours. FIG. 36B illustrates processes for controlling location carryover effects in connection with distributing communication content and assessing effectiveness of such content in accordance with other embodiments of the present invention.

Figure 37:
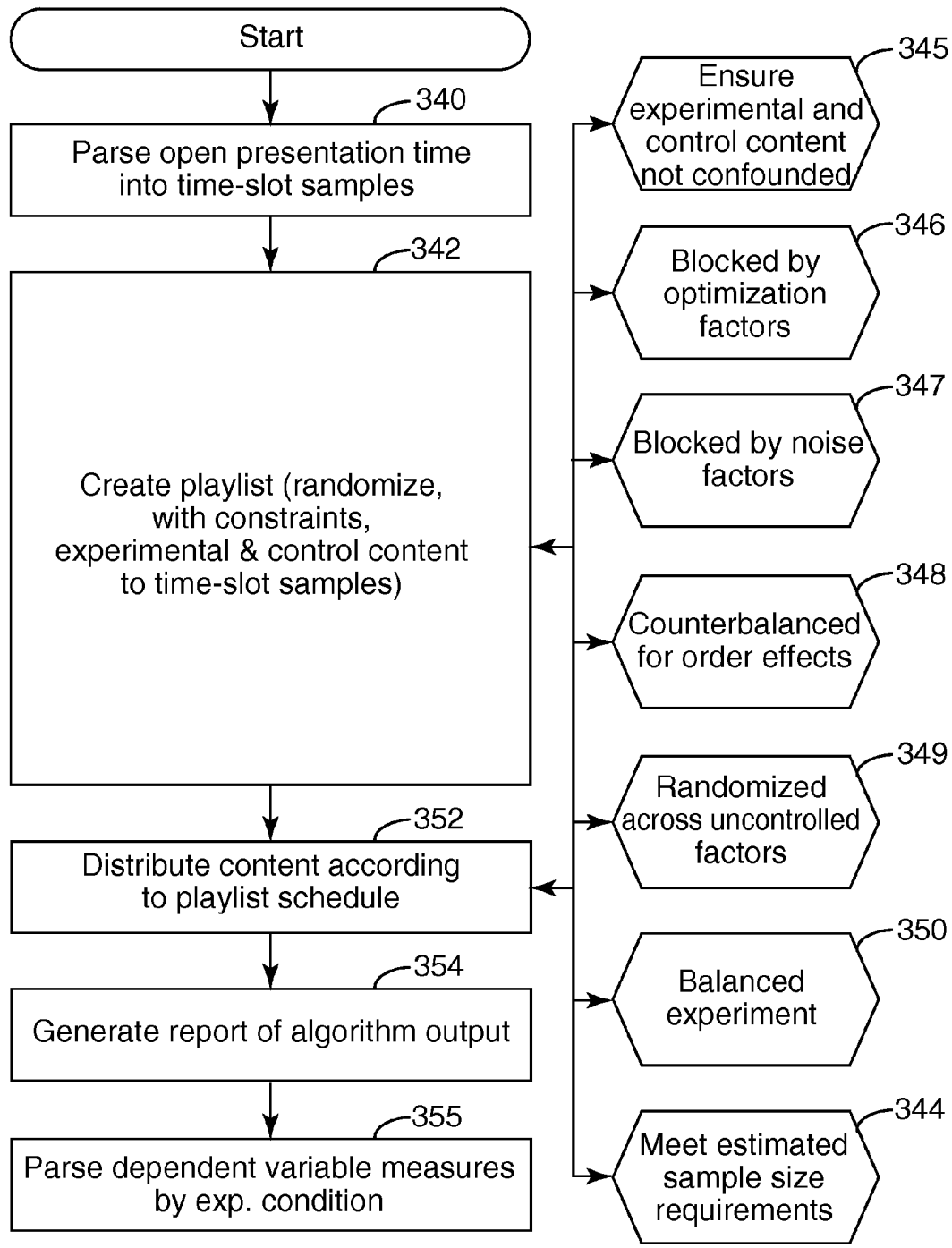
FIG. 37 illustrates processes for algorithmically scheduling and presenting communication content consistent with constraints of a cause-and-effect experiment in accordance with embodiments of the present invention.

FIG. 37 illustrates processes for algorithmically scheduling and presenting communication content consistent with constraints of a true experiment in accordance with embodiments of the present invention. The processes shown in FIG. 37 illustrate various actions of an experimental design and execution process of the present invention. FIG. 37 is intended to illustrate a comprehensive system that incorporates numerous features that facilitate scheduling and presenting communication content consistent with constraints of a true experiment. It is understood that all of the features shown in FIG. 37 need not be incorporated in a system and methodology of the present invention. Selected feature(s) shown in FIG. 37 may be utilized in stand-alone applications or combined with other features to provide useful systems and methods in accordance with embodiments of the invention. FIGS. 38A-39B, for example, illustrate various useful combinations of the features shown in FIG. 7. Many combinations of the features shown in FIG. 37 may be implemented in non-experimental systems, such as quasi-experimental systems and those that employ correlational or regression analyses or artificial neural networks.

Many of the processes shown in FIGS. 37-39B (and figures associated with various machine learning embodiments discussed above) have inputs that are typically received from other processes, systems (e.g., POS systems), sensors (e.g., presence sensors), or from a user, among others. These inputs include the following: duration data for each piece of content that is being tested for effectiveness (CD); duration of interest (DI) after which the content is viewed not to be of interest if the content caused a change in the behavioral or transactional data being measured; pair-wise content relatedness data (CR) (i.e., is content A expected to differentially impact the same behavioral or transactional data as content B?); pair-wise location relatedness (LR) (i.e., the likelihood that viewers can be exposed to content at location A and behave at location B within the above stated duration of interest); optimization factors present at sign location (OF); estimated sample-size requirements, which may be optional, for how many time-slot samples are required for each piece of content, by optimization factors (SS); maximum duration that a certain percentage of target viewers (e.g., 95%) spend at the sites where displays are located (viewer visit duration or VVD); time intervals (TI) for data collection/aggregation for data streams of interest that target viewers can affect during visit to the site (TI); blocking factors (i.e., the most powerful factors that are pre-dictive of dependent variable data but that are not per se of interest for optimizing content); absolute placebo content; and experimental content.

Viewer visit duration is an important parameter that represents the maximum time that a specified percentage of viewers spend at a location. VVD is typically calculated from individual VVDs for many viewers, understanding that there will be a distribution of individual VVDs depending on a large number of factors that influence the time an individual spends at a location. Precision of VVD depends on the size of the location. A small location, e.g., a small store, would have well-defined opportunities for seeing the content and then acting on the content within a few minutes.

Viewer visit duration may be determined in a variety of ways, such as by estimating the VVD based on an expected VVD. Determining the VVD may be based on one or more factors, including, for example, transactional data, prior sales data, sensor data (e.g., proximity or presence sensor data), and observational data. Other approaches for determining the VVD are discussed in illustrative examples provided hereinbelow.

It is understood that some "viewers" will never see (or comprehend) displayed content, but may nonetheless purchase an advertised item (generalized to the behavior being measured). Other viewers will see the content and not buy, and other viewers will both see and buy an advertised item. In this regard, methods of the invention are directed to revealing the difference between measured behavior as a function of content (experimental vs. control) being displayed. It is noted that this behavior difference being measured will also be a function of display location (e.g., in an obscure corner where few will see it vs. a very conspicuous position where all will see it). If the display is seen by few/none, then the most compelling content (FREE Flat Screen TVs Today!!!) will result in virtually no difference for measured behavior (picking up the free TVs).

Location is an important term that refers to the physical space within which the viewer can be both exposed to levels of independent variables (e.g., in the form of digital signage content) and cause a change in dependent variable data (often dependent variable data will consist of point-of-sale or sensor data) corresponding to the independent variables. Often, the location in a retail environment is the physical space owned by the retailer. However, there are some circumstances when the location will be a subset of the space owned by the retailer. For example, consider the case of a hotel lobby having a display nearby the check-in desk, where an experiment is testing the relative effectiveness of two pieces of digital signage content designed to increase the probability that guests will upgrade to a nonstandard room. In this case, the location would be the hotel lobby area (and not the entire hotel) because viewers could only be exposed to the content within the hotel lobby, and it is very unlikely that viewers would upgrade to a nonstandard room other than during their first visit to the hotel lobby. As such, this is a controlled physical space allowing for precise VVDs.

In the case of a city having a single outdoor display and multiple retail establishments where consumer behavior is measured (e.g., by purchasing an advertised product presented on the city's single outdoor display), for example, VVD becomes much less precise. Shopping mall environments typically fall somewhere between a controlled location allowing for precise VVDs and the exemplary city scenario discussed above. By way of contrast, it is noted that the most controlled situation is a location represented by a person sitting at a computer display, responding to (i.e., behaviorally acting on) content by way of mouse clicks and/or keystrokes.

As was discussed previously, carryover effects occur when the effects of one level of an independent variable persist when attempting to measure the effects of another level of the same independent variable. The solution to controlling for or eliminating carryover effects provided by embodiments of the present invention is to ensure that sufficient time has passed between (1) changing levels of independent variables; and (2) collecting data after changing levels of an independent variable.

One way to ensure that carryover effects are eliminated in the context of digital signage content is to wait very long periods between changes of levels of independent variables and/or wait very long periods between changing levels of an independent variable and collecting dependent variable data. For example, one could only show one level of an independent for a week or more at a time. Then, by collecting data during the entire week, it would be unlikely that many of the data points collected during the week would be impacted by a different level of the independent variable (e.g., "save money" in this example). However, such an approach severely limits the number of instances across time that levels of independent variables can be changed.

Those skilled in the art will appreciate that the speed with which conclusions can be generated from experiments is directly related to the number of instances across time that independent variables can be manipulated. Embodiments of the present invention advantageously provide for use of VVD and TI as inputs to determine how often changes in the levels of an independent variable occur, thus allowing one to control for or eliminate carryover effects while changing independent variable levels as frequently as possible.

Referring again to FIG. 37, a schedule is parsed 340 into time-slot samples. Parsing the schedule is essential for eliminating carryover effects. Parsing typically involves algorithmically parsing the schedule such that time-slot samples can be assigned to the schedule or schedules which dictate playback of the content.

Creation 342 of a playlist involves algorithmically assigning content to time-slot samples such that the content distribution pattern (i.e., timing and location at which content is played) meets the constraints of the experiment. This may be accomplished, for example, by ensuring experimental and control content is not confounded 345, randomly assigning content to time-slot samples with specific constraints that ensure blocking 346 by network optimization factors (i.e., factors that are being studied), blocked 347 by other factors that can be controlled and predicted but that are otherwise not of interest in the study (i.e., noise factors), counterbalancing 348 for order effects, randomizing 349 across uncontrolled factors, ensuring that the design is balanced 350 such that there is roughly an equal number of time-slot samples across blocks, and meeting 344 established sample size requirements.

The content is distributed 352 according to the playlist schedule. Ideally, this process 352 and associated algorithms are embedded within content management software, so that the content can be automatically distributed according to the created playlist schedule. A report of the algorithmic processes discussed above is preferably generated 354. The report preferably identifies what content was presented, and when and where the content was presented. The report may also indicate what dependent variable data to code, and any optimization, noise, and blocking factors were present or used. Other data pertinent to processes or performance impacting the algorithms may also be included on the generated report. It is understood that these and other data/information is recorded so that a report of the algorithmic processes may be generated. The report preferably specifies which dependent variable to code within each time-slot sample, and which dependent variable data to use or discard due to possible contamination by carryover effects or other confounds.

Dependent variable measures are parsed 355 by experimental condition, which may use data of the generated report. For example, dependent variable data (e.g., POS sales data) is preferably time and location stamped, such that this data can be automatically parsed according to the experimental conditions for analysis (and/or for use by a machine learning system, such as those described hereinabove).

Figure 38A:
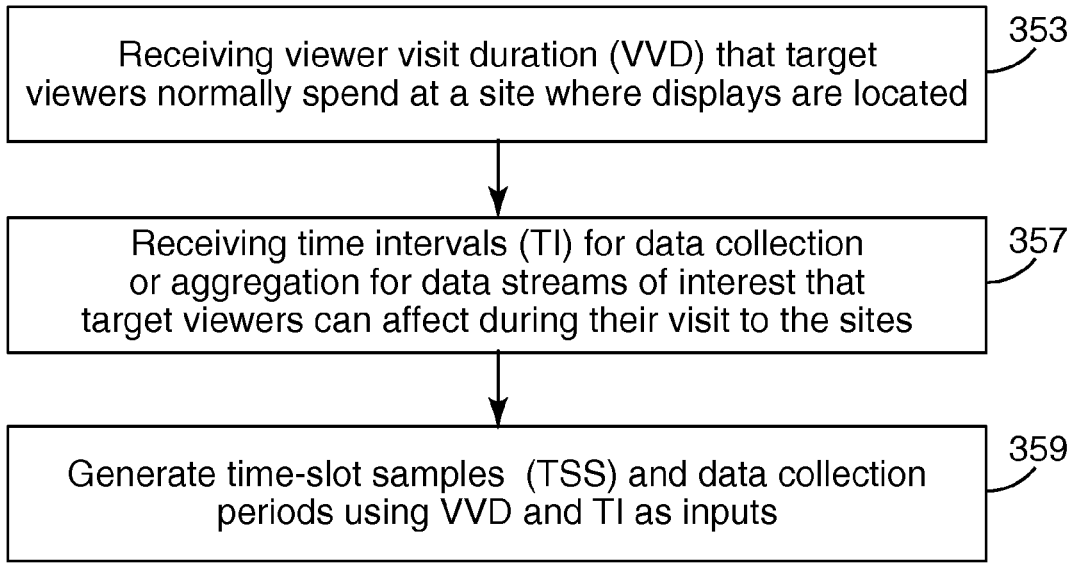
FIG. 38A illustrates various processes involving generation of time-slot samples in accordance with embodiments of the present invention.

FIG. 38A illustrates various processes involving generation of time-slot samples in accordance with embodiments of the present invention. According to FIG. 38A, viewer visit duration that target viewers normally spend at a site where displays are located is received 353. Time intervals for data collection or aggregation for data streams of interest that target viewers can affect during their visit to the sites are received 357. Using viewer visit duration and the time intervals, a number of time-slot samples needed to measure effects of content assigned to the time-slot samples are determined 359, and a data collection period associated with each of the time-slot samples is determined.

Embodiments of the present invention, as exemplified by the processes shown in FIG. 38A, generate "samples," referred to herein as time-slot samples, to which content can be assigned for measuring the effects of the assigned content. These "samples," and the methodologies that generate such samples, have significant value and represent an end product that can be utilized by a purchaser of these samples to test the effectiveness of content.

Figure 38B:
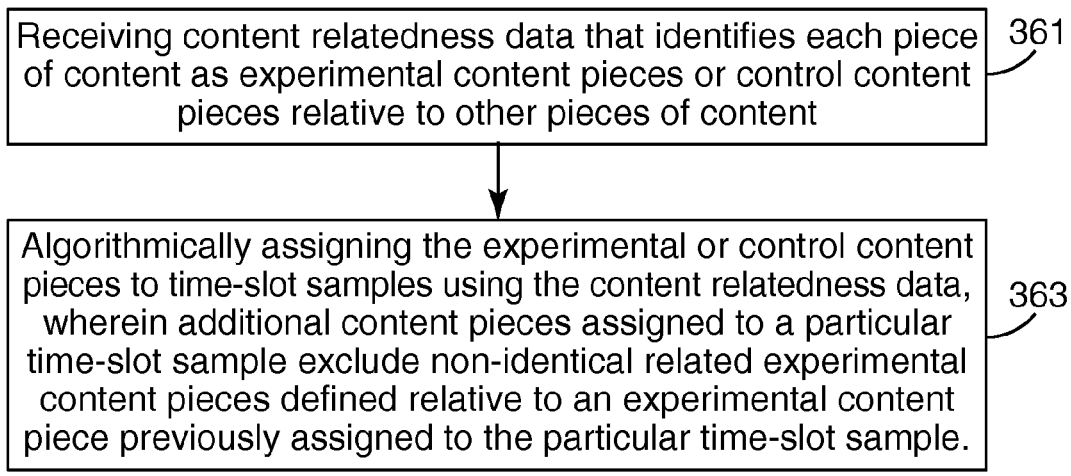
FIG. 38B illustrates various processes involving assigning content to time-slot samples in accordance with embodiments of the present invention.

FIG. 38B illustrates various processes involving assigning content to time-slot samples in accordance with embodiments of the present invention. According to FIG. 38B, content relatedness data that identifies each piece of content as an experimental content piece or a control content piece relative to other pieces of content is received 361. The processes of FIG. 38B further involve algorithmically assigning 363 the experimental or control content pieces to time-slot samples using the content relatedness data. The content pieces assigned to a particular time-slot sample exclude non-identical experimental content pieces relative to an experimental content piece previously assigned to the particular time-slot sample.

The processes shown in FIG. 38B, in one sense, describe a technique or tool (e.g., software) that can be used to increase the speed and accuracy of conducting experiments on the effectiveness of content. A technique or tool implemented in accordance with FIG. 38B represent a valuable end product that provides utility to one that wishes to conduct experiments on the effectiveness of content. By way of analogy, and in the context of the biological research domain, tools are developed and used to increase the speed and accuracy of conducting experiments on, for example, cancer cells and for decreasing the cost of conducting such experiments. For example, genetic sequencing tools have been developed to automatically control the steps of genetic sequencing. In a similar fashion, tools and techniques implemented in accordance with FIG. 38B may be used to increase the speed and accuracy of conducting experiments on the effectiveness of content, and to decrease the cost of conducting such experiments.

Figure 38C:
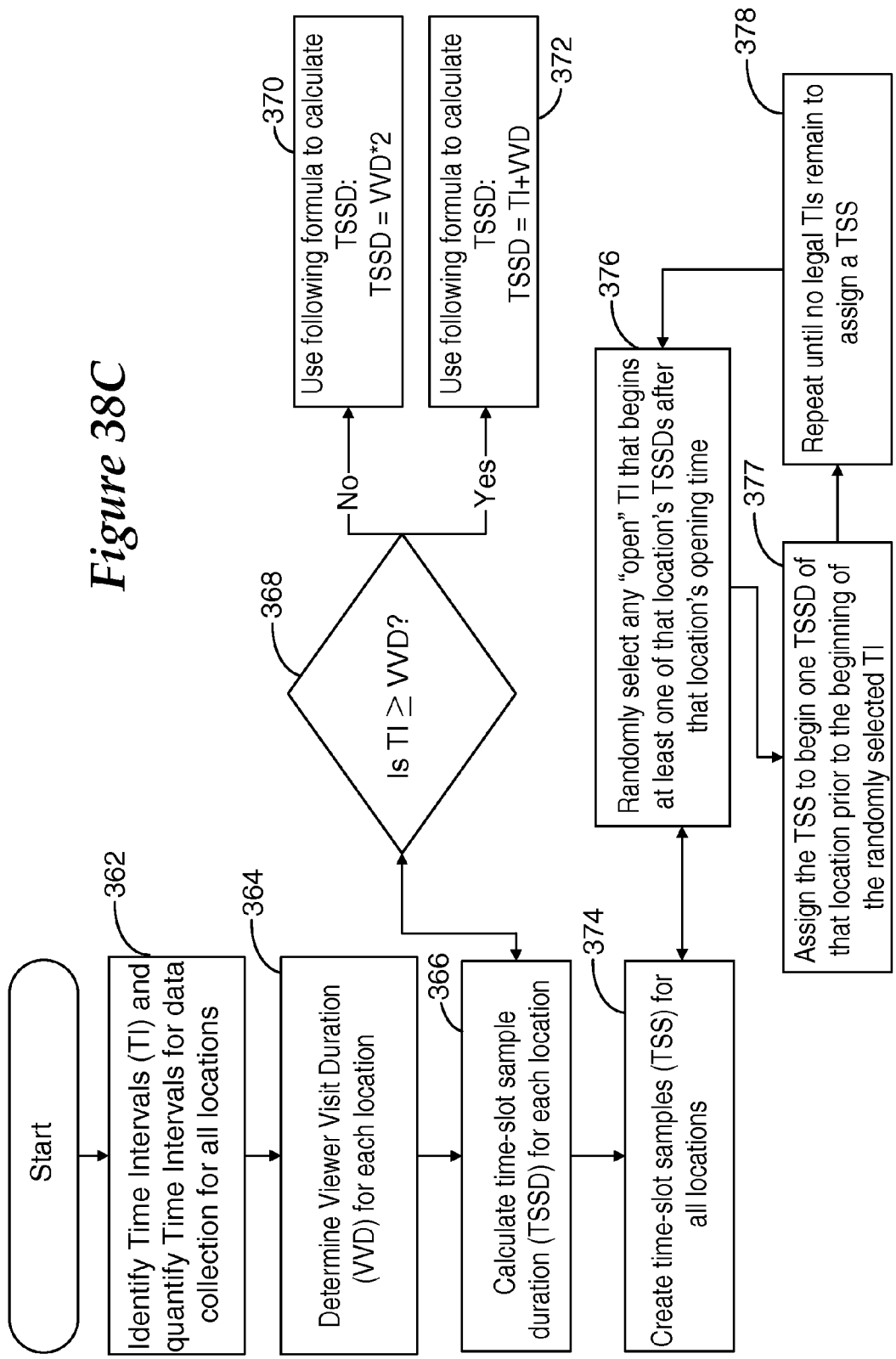
FIG. 38C illustrates an embodiment of an algorithm that may be used for parsing a schedule into time-slot samples using a complete randomization process in accordance with embodiments of the present invention.

FIG. 38C illustrates an embodiment of an algorithm that may be used for parsing a schedule into time-slot samples using a complete randomization process in accordance with embodiments of the present invention. According to FIG. 38C, the duration of time intervals (TI) for each display location is identified and quantified 362. The viewer visit duration (VVD) for each location is determined 364. As discussed previously, a TI represents the smallest unit of time across which dependent variable data can be measured, and VVD is the maximum amount of time that a predetermined percentage (e.g., 95%) of the viewers spend at the location during any one visit.

Time-slot sample duration (TSSD) is determined 366 for each display location. Time-slot sample duration is a specific duration of time that a time-slot sample lasts. During a TSSD, different experimental and control content is played, preferably in a manner such that there is no overlap that would produce confounds. According to one approach, and as indicated at blocks 368, 370, and 372 of FIG. 38C, time-slot sample duration may be computed as follows:

Is $TI \geq VVD$

If No, then $TSSD=VVD*2$

If Yes, then $TSSD=TI+VVD$ [1]

It is noted that if the TI is not equal to nor greater than the VVD (e.g., TI is 1 second) in Formula [1] above, then half of the duration of the time-slot sample duration will include viewers that were not present for content from the previous time-slot sample. Importantly, only data collected during this second half (i.e., the data collection period of the TSSD in this example) is included in the analysis, and in conjunction with counterbalancing, this eliminates carryover effects.

A randomization process ensues, by which time intervals are subject to random selection 376. The algorithm randomly selects any "open" time interval that begins at least one of a particular location's TSSDs after that location's opening time. The term "open" time interval in this context refers to a time interval that does not already have a time-slot sample associated with it.

A time-slot sample is assigned 377 to begin one TSSD of that location prior to the beginning of the randomly selected TI. This process 376, 377, 378 continues until no legal TIs remain to assign a TSS. It is noted that time-slot samples are selected with the following constraint: time-slot samples subsumed by previously selected time-slot samples are excluded (e.g., if content is already being played from 9:01-9:20, the system does not choose 9:01-9:20 for candidate slots).

Figure 38D:
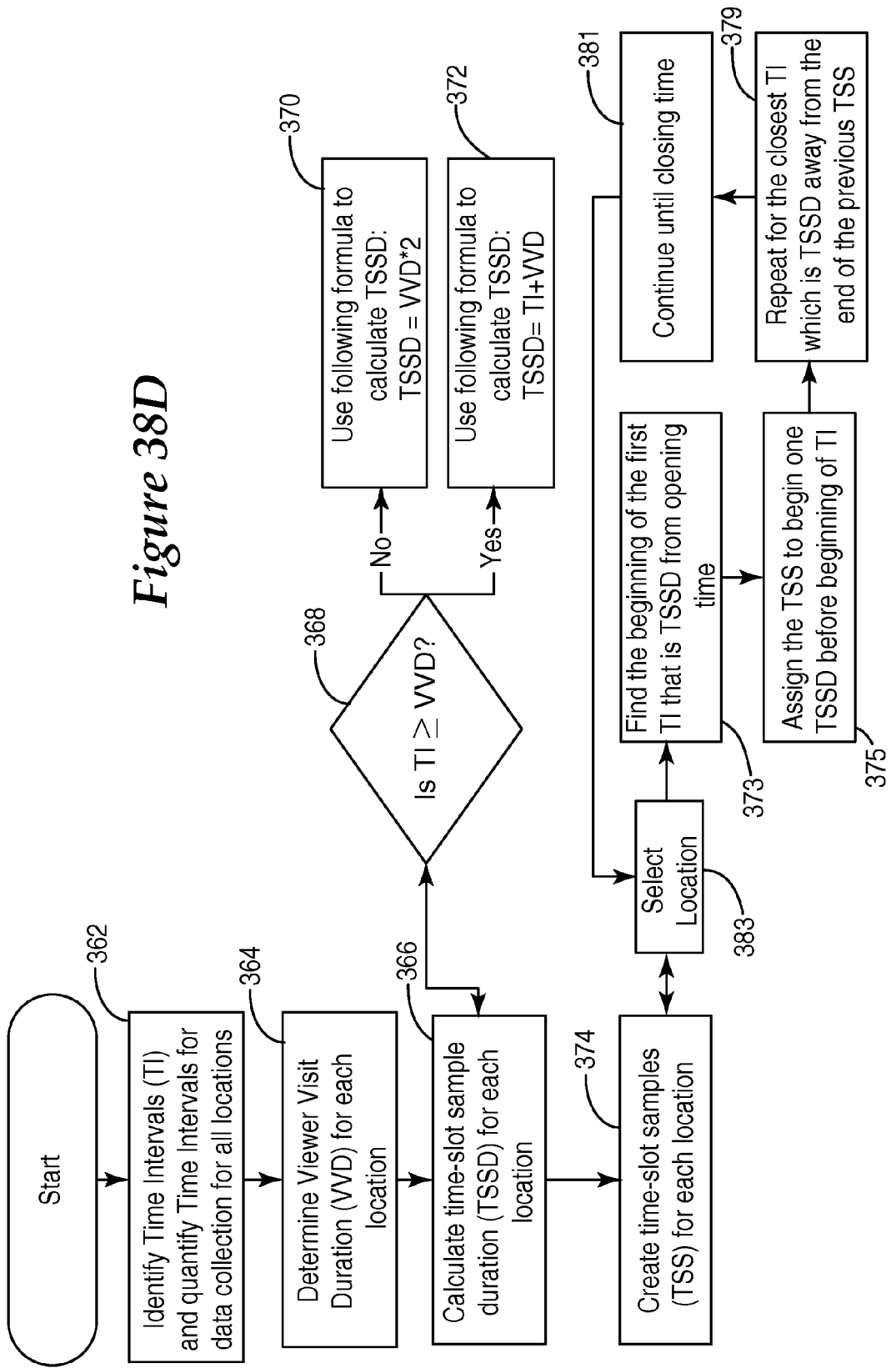
FIG. 38D illustrates an embodiment of an algorithm that may be used for parsing a schedule into sequentially generated time-slot samples in accordance with embodiments of the present invention.

FIG. 38D illustrates an embodiment of an algorithm that may be used for parsing a schedule into sequentially generated time-slot samples in accordance with embodiments of the present invention. Processes 362-372 of FIG. 38D are the same as the corresponding processes of FIG. 38C. Processes 376, 377, and 378 of FIG. 38C are illustrative of a complete random time-slot sample generation methodology. Processes 383, 373, 375, 379, and 381 of FIG. 38D are illustrative of a sequential time-slot sample generation methodology.

According to the sequential time-slot sample generation methodology of FIG. 38D, creating time-slot samples for each location 374 involves selecting 383 a location at which content is to be presented. The beginning of the first TI that is TSSD from the location's opening time is found 373. A TSS is assigned 375 to begin one TSSD before the beginning of the TI. This process 373, 375 is repeated 379 for the closest TI which is TSSD away from the end of the previous TSSD until the closing time is reached 381. This TSS creation process 374 is repeated for each selected location 383. Generating time-slot samples in a sequential manner as shown in FIG. 38D generally results in achieving greater efficiency of TI utilization.

Another means of quickly generating results needed to evaluate content effectiveness is the ability to use multiple locations on a network, each having a display capable of showing content. Each location can be producing time-slot samples needed to fulfill the quantity of data to validate a hypothesis. In general, the rate of data generation scales with the number of locations, e.g., ten locations working in concert can generate about ten times the samples as a single location. This arrangement leads to the added possibility of learning about interactions between content effectiveness and display locations.

The methodology disclosed in this application also allows the ability to simultaneously test multiple independent variables during the same time-slot samples, providing that the content associated with the different independent variables is unrelated. This is because experimental content for one independent variable can be control content for another independent variable. Using this technique further increases the speed of experimentation as it is possible to simultaneously conduct experiments addressing multiple business objectives, thus liberating display time to achieve business goals.

Figure 38E:
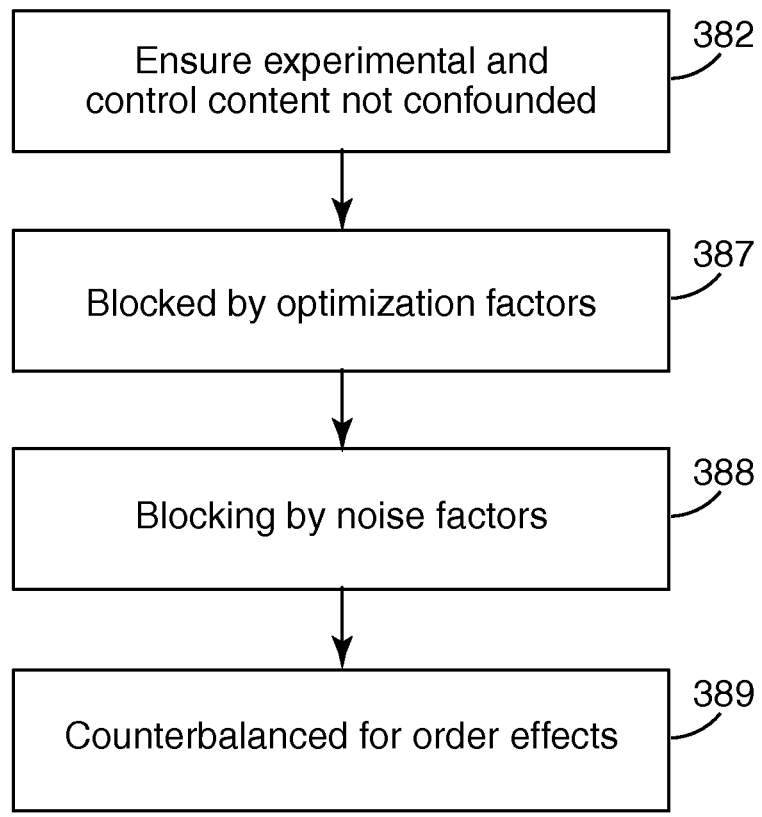
FIG. 38E illustrates processes of an algorithm that may be employed to create an experimental design playlist in accordance with embodiments of the present invention.

FIG. 38E illustrates processes of an algorithm that may be employed to create an experimental design playlist in accordance with embodiments of the present invention. The algorithm shown in FIG. 38E involves ensuring that experimental and control content is not confounded 382. According to the approach illustrated in FIG. 38E, each piece of experimental content is randomly assigned to a time-slot sample. This process ensures that two pieces of content that are being compared with one another with respect to impact on the dependent variable are never played within the same time-slot sample.

The process of random assignment is repeated with the constraint that only control content is assigned to the same time-slot sample as any piece of experimental content. This ensures that there are no location confounds. It is noted that it is valid to assign experimental content for one hypothesis to a time-slot sample that already contains experimental content for another hypothesis, provided that the content can serve as a control for the experimental content for the other hypothesis. That is, one can run two experiments at once provided that the hypotheses are orthogonal (and can additionally run one or more machine learning routines as described hereinabove).

The algorithm of FIG. 38E may further involve blocking by optimization factors 387. This allows for factorial analyses to measure interactions between content and optimization factors. The algorithm shown in FIG. 38E may also involve blocking by noise factors 388 in order to increase statistical power. These processes preferably continue to assign content to time-slot samples until main effect and interaction effect sample size requirements are satisfied and the design is balanced. The algorithm may further provide for counterbalancing 389 for order effects. Within each time-slot sample, the order in which individual pieces of content are displayed is counterbalanced using known techniques (e.g., Latin Squaring).

FIG. 38F illustrates processes of an algorithm that assigns content to time-slot samples for testing the relative effectiveness of the content in accordance with embodiments of the present invention. The algorithm shown in FIG. 38F involves selecting 502 any time-slot sample between the experiment's starting and ending points that has not already been assigned experimental content. The algorithm further involves randomly selecting 504 any piece of experimental content and assigning 506 the selected experimental content to play during the entire duration of the selected TSS.

The processes shown in blocks 502, 504, and 506 are repeated 508 until all time-slot samples under the control of the Experiment System are filled with experimental content. A report of the algorithm's output may be generated 510. The report may contain various information, such as that previously described with reference to FIG. 37. It is noted that if the time-slot samples are tagged with attributes, this will allow for hypotheses to be generated based on any interactions that are found between the content assigned to time-slot samples and the attributes of the time-slot samples and enable exploratory data analysis.

Figure 38G:
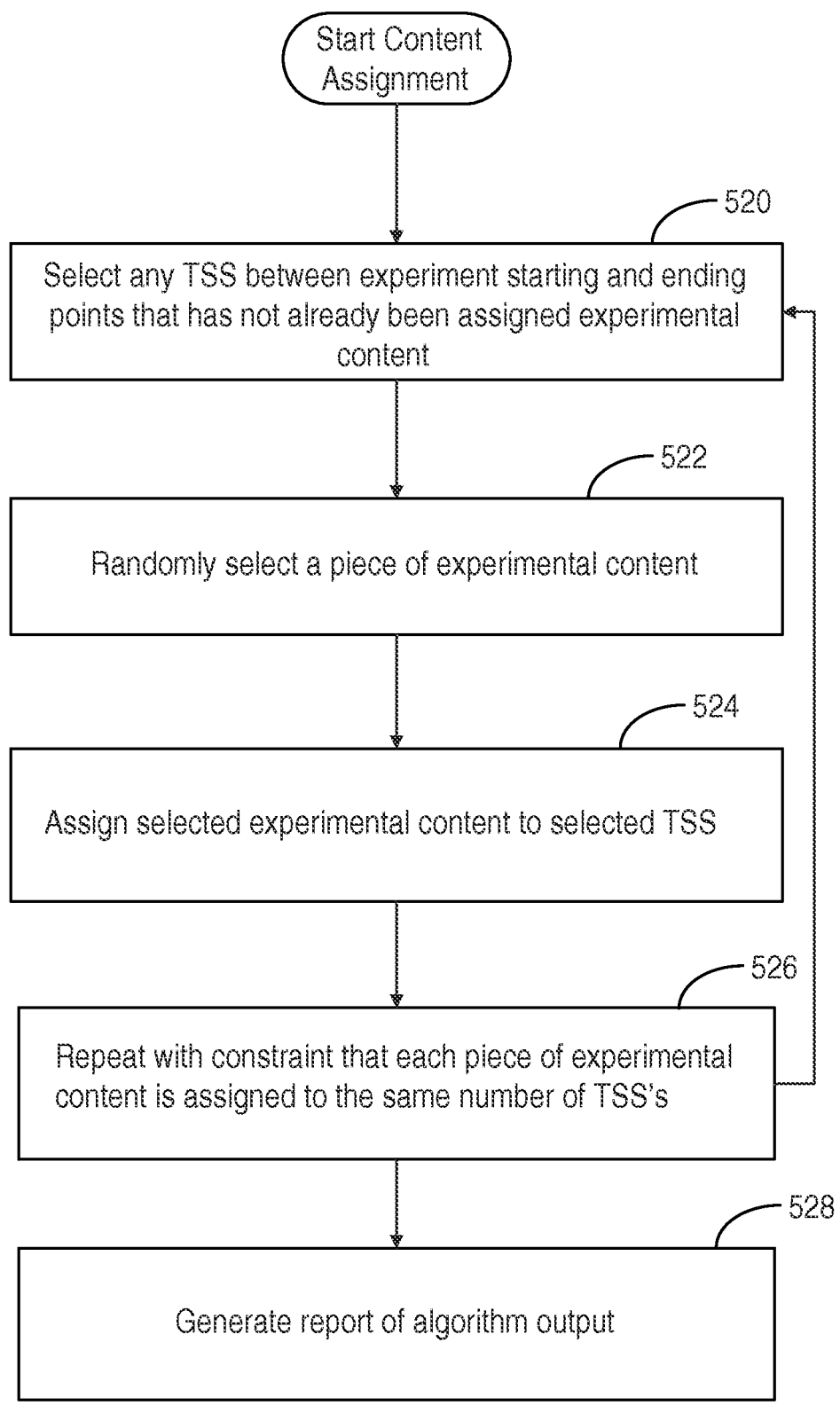
FIG. 38G illustrates processes of an algorithm that assigns content to time-slot samples using a constrained randomization process in accordance with embodiments of the present invention, such that each piece of experimental content is assigned to the same number of time-slot samples.

Under many experimental circumstances, it is desirable to have each level of the independent variable (or variables) assigned to the same number of samples. FIG. 38G illustrates processes of an algorithm that assigns content to time-slot samples using a constrained randomization process in accordance with embodiments of the present invention such that each piece of experimental content is assigned to the same number of time-slot samples. The algorithm shown in FIG. 38G involves selecting 520 any time-slot sample between the experiment's staring and ending points that has not already been assigned experimental content. The algorithm further involves randomly selecting 522 any piece of experimental content and assigning 524 the selected experimental content to the selected TSS.

The processes shown in blocks 520, 522, and 524 are repeated 526 with the constraint that each piece of experimental content is assigned 526 to the same number of time-share samples. A report of the algorithm's output may be generated 528, as discussed previously.

Figure 38H:
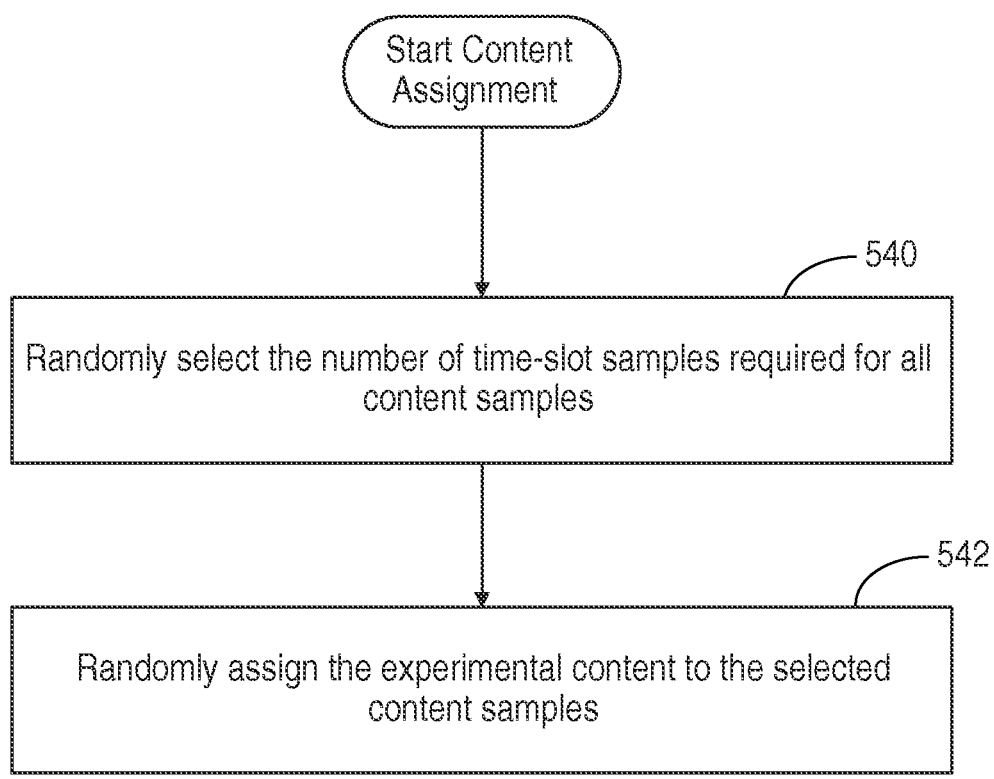
FIG. 38H illustrates processes of an algorithm that takes as input sample size requirements and assigns content to time-slot samples using a constrained randomization process in accordance with embodiments of the present invention to ensure sample size requirements are met.

Under some experimental circumstances, the experiment might have been designed manually or using off-the-shelf statistical software, or using, for example, an expert system as described hereinbelow, in which case the sample size requirements for various experimental and control content would have been specified. FIG. 38H illustrates processes of an algorithm that takes as input such sample size requirements and assigns content to time-slot samples using a constrained randomization process in accordance with embodiments of the present invention to ensure sample size requirements are met. The algorithm shown in FIG. 38H involves randomly selecting 540 the number of time-slot samples required for all content samples. The algorithm further involves randomly assigning 542 experimental content to the selected content samples. It is noted that the remaining time-slot samples that were not required because sample size requirements have been met may be filled with content that is optimized for business results, rather than for testing any hypothesis.

Figure 38I:
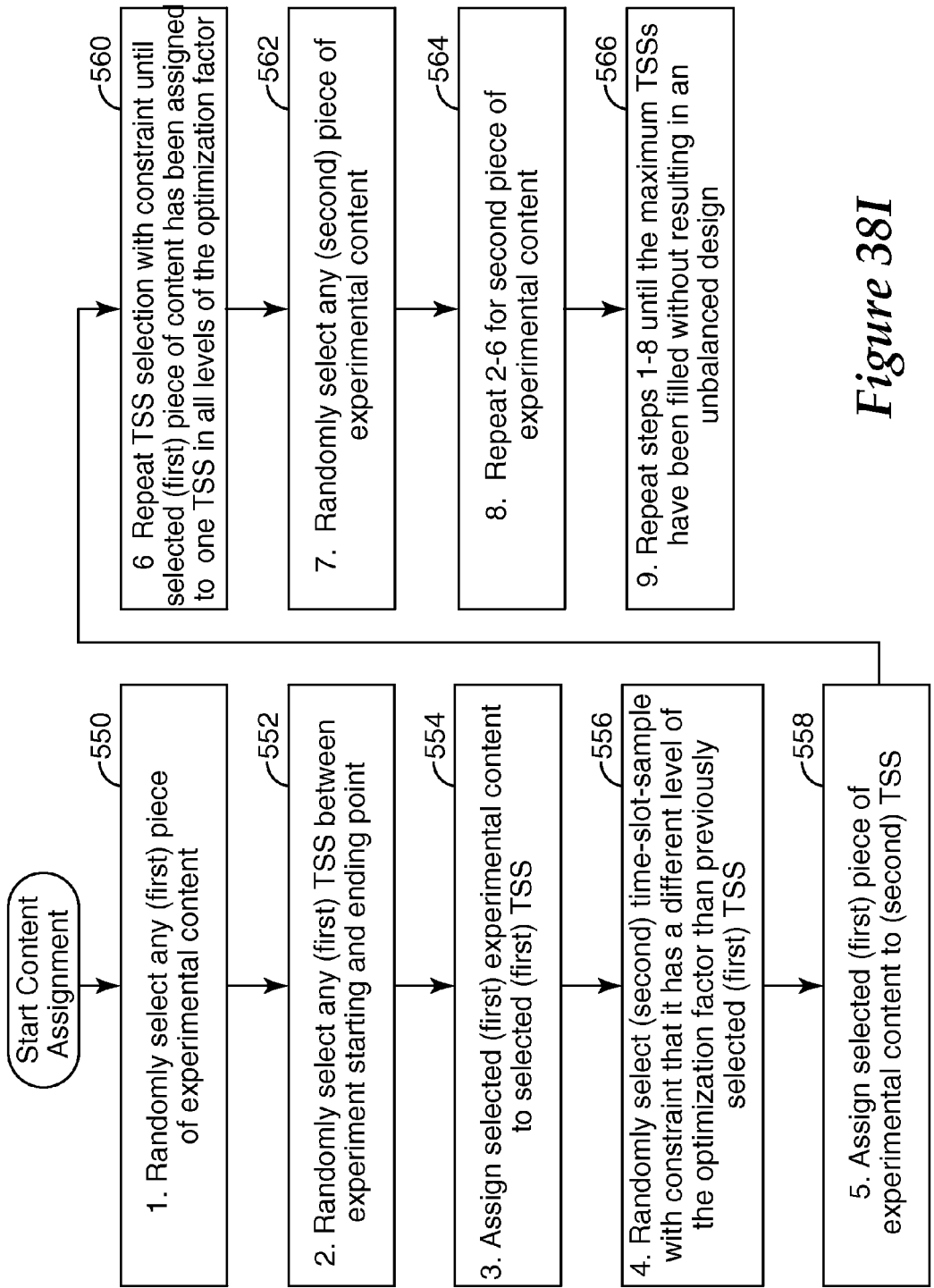
FIG. 38I illustrates processes of an algorithm that assigns content to time-slot samples using a complete randomization process but with the addition of optimization factor constraints in accordance with embodiments of the present invention.

FIG. 38I illustrates processes of an algorithm that assigns content to time-slot samples using a complete randomization process but with the addition of optimization factor constraints in accordance with embodiments of the present invention. The optimization factor constraint can be added to the equal sample size or to the predetermined sample-size processes in an analogous fashion. It is noted that each content sample would preferably have metadata identifying the optimization factors with which it is associated, and the time-slot samples would also have metadata identifying which optimization factors are associated with the time-slot sample.

The algorithm shown in FIG. 38I involves randomly selecting 550 any (first) piece of experimental content, and randomly selecting 552 any (first) time-slot sample between experiment starting and ending points. The randomly selected (first) piece of experimental content is assigned 554 to the selected (first) time-slot sample.

The algorithm of FIG. 38I involves randomly selecting 556 another (second) time-slot sample with the constraint that it has a different level of optimization factor than a previously selected (first) time-slot sample. The selected (first) piece of experimental content is assigned 558 to this (second) selected time-slot sample. The above-described TSS selection processes are repeated 560 until the selected (first) piece of content has been assigned to one TSS in all levels of the optimization factor.

The algorithm of FIG. 38I further involves randomly selecting 562 any (second) piece of experimental content, and repeating 564 processes 552-560 for this next (second) piece of experimental content. The processes of blocks 550-564 are repeated 566 until the maximum number of time-slot samples have been filled without resulting in an unbalanced design (i.e., until there are fewer time-slot samples than the number of optimization factors multiplied by the number of pieces of experimental content.

Figure 38J:
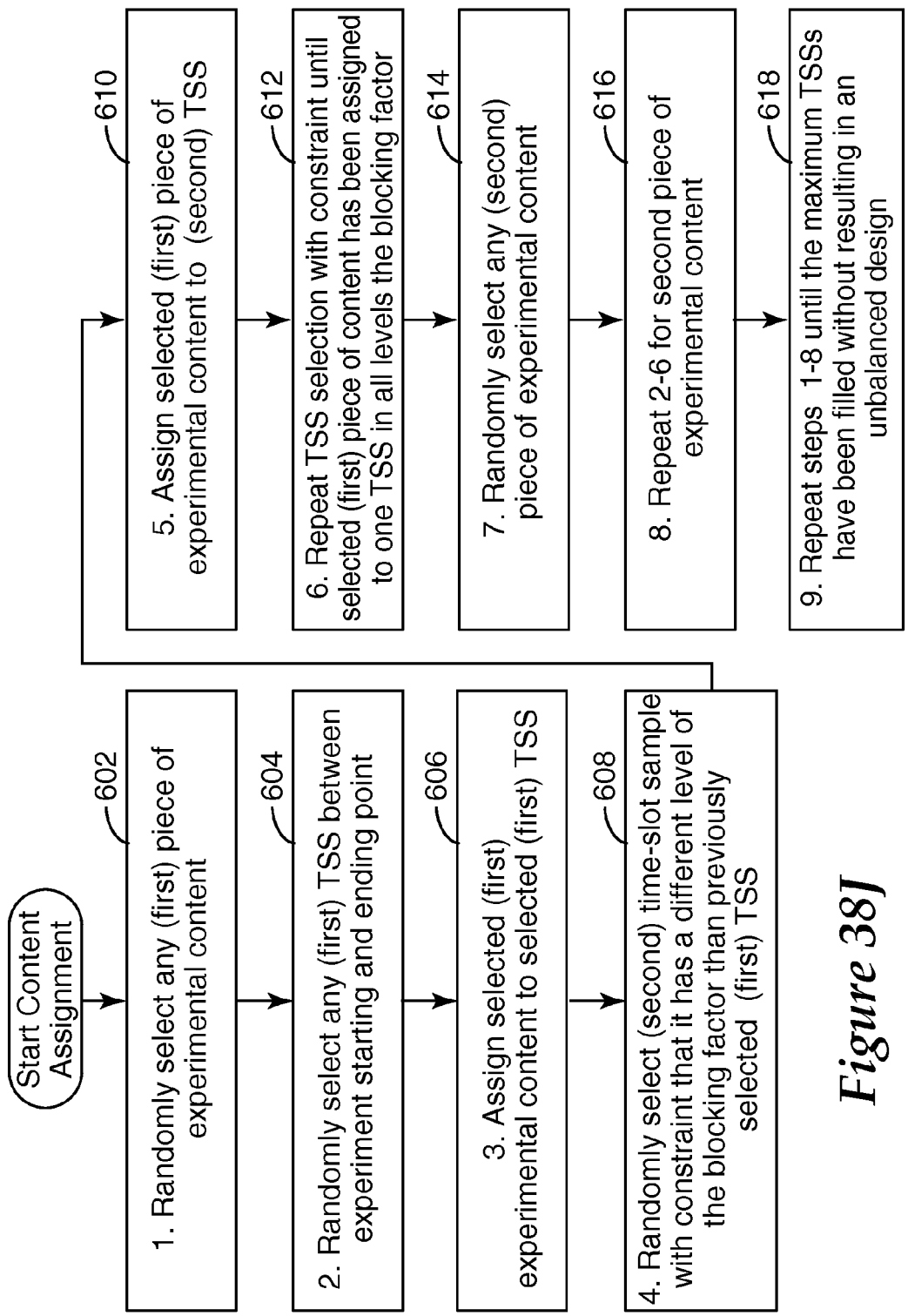
FIG. 38J illustrates processes of an algorithm that assigns content to time-slot samples using a complete randomization process but with the addition of blocking factor constraints in accordance with embodiments of the present invention.

FIG. 38J illustrates processes of an algorithm that assigns content to time-slot samples using a complete randomization process but with the addition of blocking factor constraints in accordance with embodiments of the present invention. The blocking factor constraint can be added to the equal sample size or to the predetermined sample-size processes in an analogous fashion. It is noted that each content sample would preferably have metadata identifying the blocking factors with which it is associated, and the time-slot samples would also have metadata identifying which blocking factors are associated with the time-slot sample.

The algorithm shown in FIG. 38J involves randomly selecting 602 any (first) piece of experimental content, and randomly selecting 604 any (first) time-slot sample between experiment starting and ending points. The randomly selected (first) piece of experimental content is assigned 606 to the selected (first) time-slot sample.

The algorithm of FIG. 38J involves randomly selecting 608 another (second) time-slot sample with the constraint that it has a different level of blocking factor than a previously selected (first) time-slot sample. The selected (first) piece of experimental content is assigned 610 to this (second) selected time-slot sample. The above-described TSS selection processes are repeated 612 until the selected (first) piece of content has been assigned to one TSS in all levels of the blocking factor.

The algorithm of FIG. 38J further involves randomly selecting 614 any (second) piece of experimental content, and repeating 616 processes 604-612 for this next (second) piece of experimental content. The processes of blocks 602-616 are repeated 618 until the maximum number of time-slot samples have been filled without resulting in an unbalanced design (i.e., until there are fewer time-slot samples than the number of blocking factors multiplied by the number of pieces of experimental content).

Figure 39A:
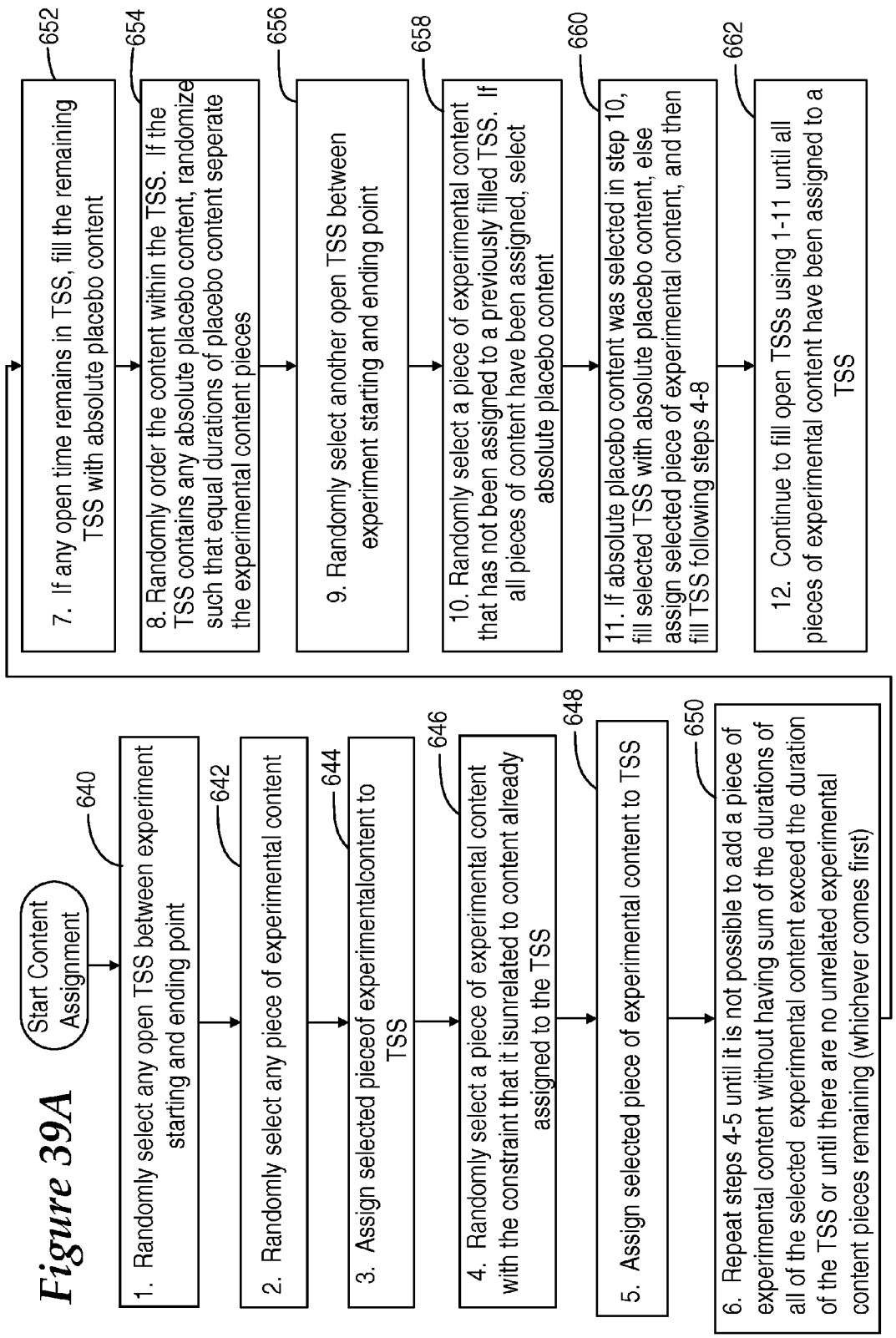
FIG. 39A illustrates processes of an algorithm that assigns content to time-slot samples in accordance with embodiments of the present invention, where the individual pieces of content are shorter than the time-slot samples.

FIG. 39A illustrates processes of an algorithm that assigns content to time-slot samples in accordance with embodiments of the present invention. The embodiment shown in FIG. 39A is directed to algorithm that assigns content to time-slot samples where the individual pieces of content are shorter than the time-slot samples. The algorithm of FIG. 39A ensures that there are no content confounds and allows the same time-slot samples to be used to test multiple hypotheses (i.e., allows unrelated independent variables to be tested within the same time-slot samples). This is analogous to being able to test multiple drugs on the same patients, which saves time and money. For example, in a drug testing scenario, one can test a topical analgesic cream on the same patient who is being used to test a halitosis cure. That is, the topical analgesic cream should not impact halitosis and the halitosis cure should not impact a skin condition. However, one would not want to test a treatment for halitosis on the same patients who are being used for testing a new toothpaste, for example.

The algorithm shown in FIG. 39A involves randomly selecting 640 any open time-slot sample between experiment starting and ending points. A piece of experimental content is randomly selected 642, and the selected piece of experimental content is assigned 644 to the selected TSS. The algorithm of FIG. 39 further involves randomly selecting 646 a piece of experimental content with the constrain that it is unrelated to content already assigned to the TSS. The selected piece of experimental content is assigned 648 to the selected TSS. The processes of blocks 646 and 648 are repeated until it is not possible to add a piece of experimental content without having the sum of the durations of all of the selected experimental content exceed the duration of the TSS or until there are no unrelated experimental content pieces remaining, whichever comes first.

If any open time remains in the selected TSS, the remaining open time of the TSS is filled 652 with absolute placebo content. The algorithm of FIG. 39A also involves randomly ordering 654 the content within the TSS. If the TSS contains any absolute placebo content, randomization ensues such that equal durations of the placebo content separate the experimental content pieces.

Another open TSS is randomly selected 656 between the experiment starting and ending points. A piece of experimental content that has not been assigned to a previously filled TSS is randomly selected 658. If all pieces of content have been assigned, absolute placebo content is selected. If absolute placebo content was selected in block 658, the selected TSS is filled 660 with absolute placebo content, otherwise the selected piece of experimental content is assigned to the selected TSS, and this TSS is filled in accordance with the processes of blocks 646-654. Open TSSs continue to be filled according to the processes of blocks 640-660 until all pieces of experimental content have been assigned to a TSS.

Figure 39B:
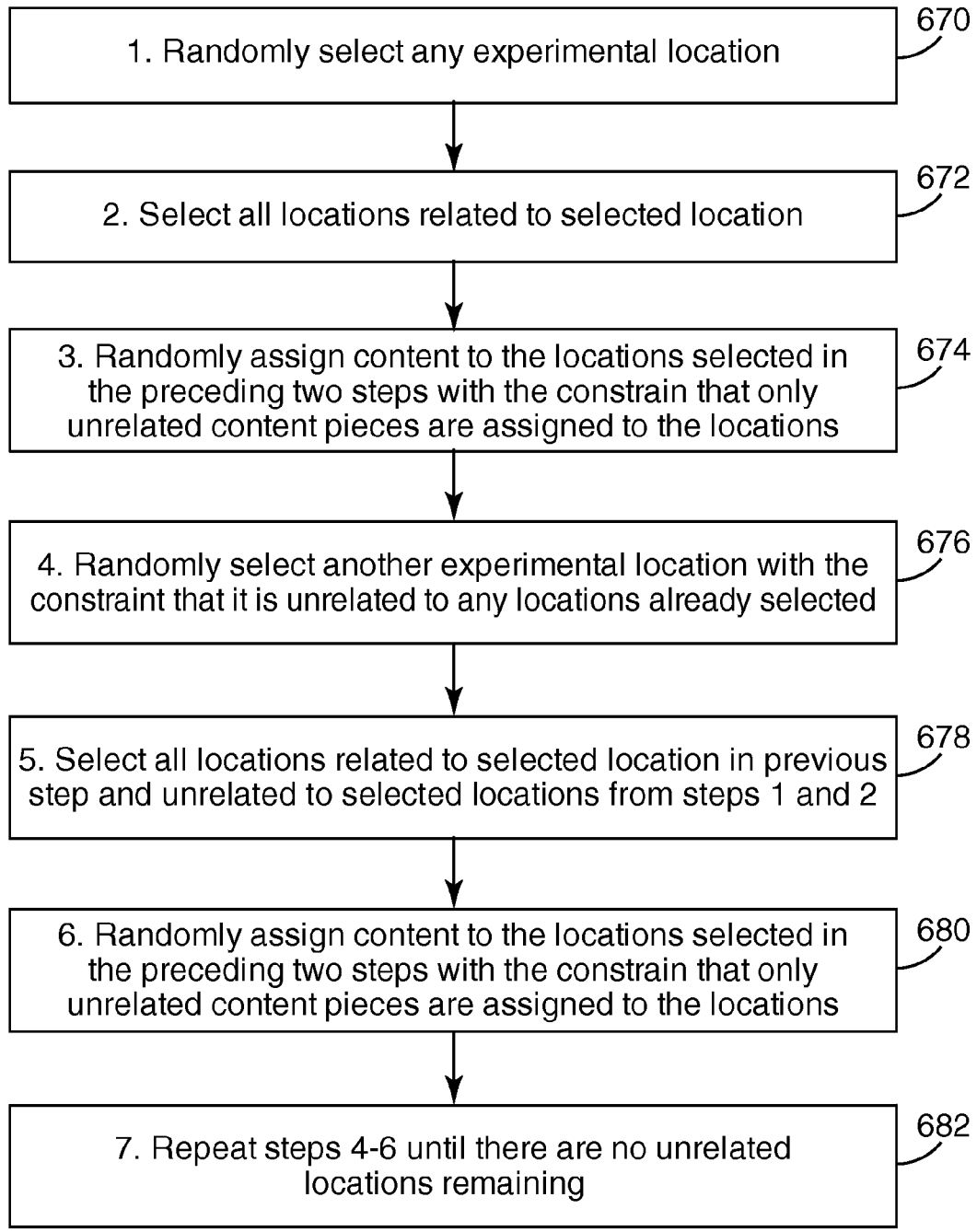
FIG. 39B illustrates processes of an algorithm that assigns content to time-slot samples in accordance with embodiments of the present invention, the algorithm ensuring that there are no location confounds during a duration of interest.

FIG. 39B illustrates processes of an algorithm that assigns content to time-slot samples in accordance with embodiments of the present invention. The embodiment shown in FIG. 39B is directed to algorithm that ensures that there are no location confounds during the duration of interest, after which the content is viewed not to be of interest if the content caused a change in the behavioral or transactional data being measured. That is, the algorithm of FIG. 39B ensures that a viewer could not be exposed to one level of an independent variable and act on it at a different location that is testing a different level of the independent variable during the duration of interest.

A potential drawback of using all experimental locations in such a way as to eliminate all location confounds is that any location that is used in this fashion is not able to be exposed to multiple levels of the same independent variable. As such, it would be difficult to measure how combinations of different levels of an independent variable would interact with one another within the same location. It may be desirable, under some circumstances, to first select a pre-determined number of locations to be assigned experimental content for complete within-location testing effects and then run this algorithm to use the remaining locations for testing without between-location confounds. That is, for example, one could use FIG. 38H to meet a pre-determined sample size for within-location factors, and then use FIG. 39B to measure the effects of content across locations.

The algorithm shown in FIG. 39B involves randomly selecting 670 any experimental location, and selecting 672 all locations related to the selected location. Content is randomly assigned 674 to the locations selected in the preceding two blocks 670, 672 with the constraint that only unrelated content pieces are assigned to the locations. Another experimental location is randomly selected 676 with the constraint that it is unrelated to any locations already selected. All locations related to the location selected in the previous block, 676, and unrelated to selected locations for blocks 670 and 672 are selected 678. Content is randomly assigned 680 to the locations selected in the preceding two blocks 676, 678 with the constraint that only unrelated content pieces are assigned to these locations. The processes of blocks 676-680 are repeated until there are no unrelated locations remaining.

System according to embodiments of the present invention may include one or more of the features, structures, methods, or combinations thereof described herein. For example, systems may be implemented to include one or more of the advantageous features and/or processes illustrated in FIGS. 40A-40C. It is intended that such systems need not include all of the features described herein, but may be implemented to include selected features that provide for useful structures and/or functionality.

Figure 40A:
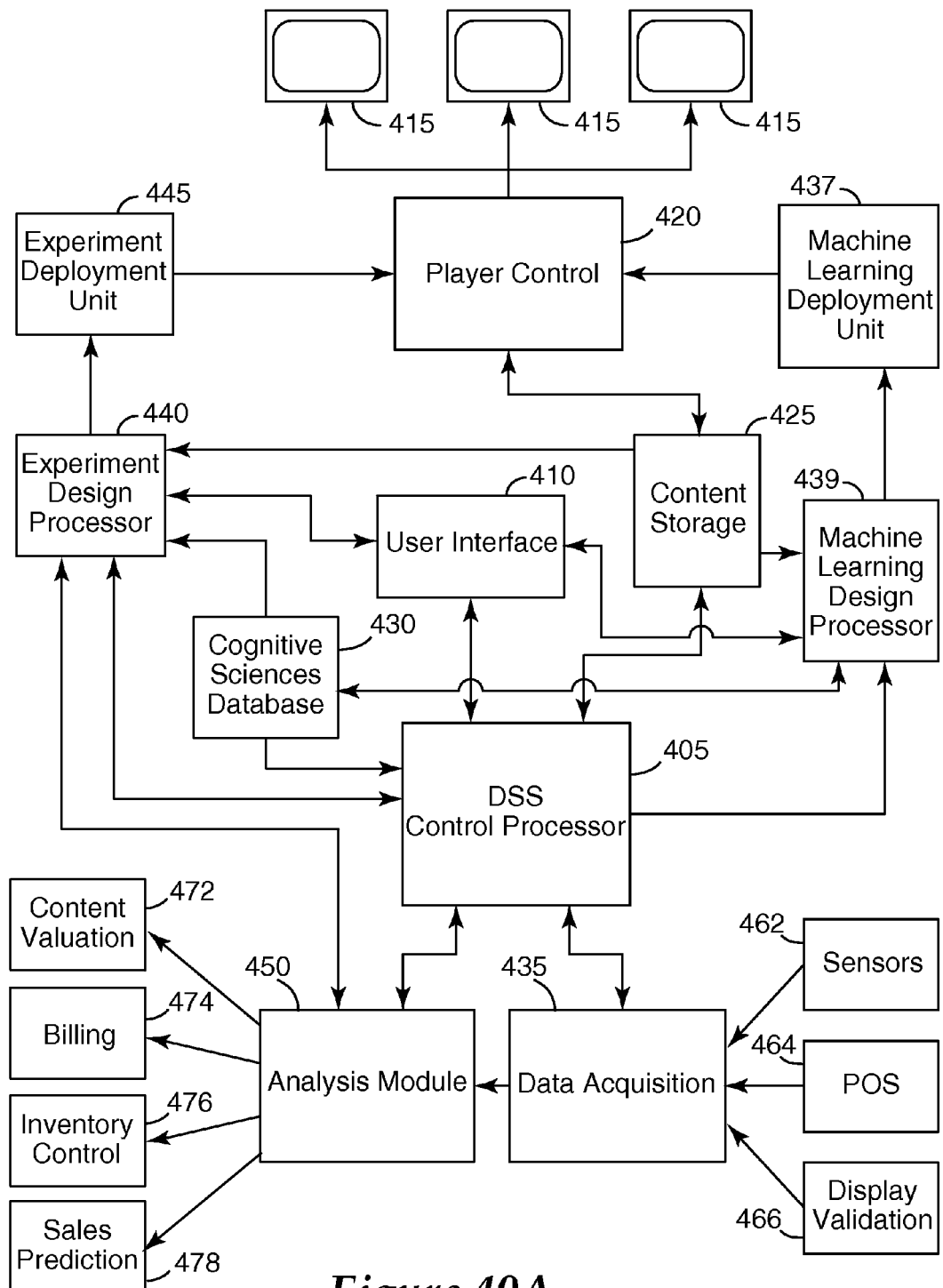
FIG. 40A is a block diagram of a digital signage system that incorporates the capability for designing and deploying cause-and-effect experiments and machine learning routines in accordance with embodiments of the invention.

A digital signage system (DSS) according to embodiments of the present invention is shown in FIG. 40A. The DSS illustrated in FIG. 40A is a computerized system configured to present informational content via audio, visual, and/or other media formats. The DSS may include functionality to automatically or semi-automatically generate playlists, which provide a list of the information content to be presented, and schedules, which define an order for the presentation of the content. In a semi-automatic mode, a user may access a DSS control processor 405 via an interactive user interface 410. Assisted by the DSS control processor 405, the user may identify content to be presented and generate playlists and schedules that control the timing and order of presentations on one or more DSS players 415. Each player 415 presents content to recipients according to a playlist and schedule developed for the player. The informational content may comprise graphics, text, video clips, still images, audio clips, web pages, and/or any combination of video and/or audio content, for example.

In some implementations, after a playlist and schedule are developed, the DSS control processor 405 determines the content required for the playlist, downloads the content from a content server, and transfers the content along with the playlist and schedule to a player controller 420 that distributes content to the players 415. Although FIG. 40A shows only one player controller 420, multiple player controllers may be coupled to a single DSS control processor 405. Each player controller 420 may control a single player or multiple players 415. The content and/or the playlists and schedules may be transferred from the DSS control processor 405 to the one or more player controllers 420 in a compressed format with appropriate addressing providing information identifying the player 415 for which the content/playlist/schedule is intended. In some applications, the players 415 may be distributed in stores or malls and the content presented on the players 415 may be advertisements.

In other implementations, the DSS control processor 405 may transfer only the playlists and schedules to the player controller 420. If the content is not resident on the player controller 420, the player controller 420 may access content storage 425 to acquire the content to be presented. In some scenarios, one or more of the various components of the DSS system, including the content storage 425, may be accessible via a network connection, such as an intranet or Internet connection (wired or wireless). The player controller 420 may assemble the desired content, or otherwise facilitate display of the desired content on the players according to the playlist and schedule. The playlists, schedules, and/or content presented on the players 415 can be modified periodically or as desired by the user or automatically (algorithmically) through the player controller 420, or through the DSS control processor 405, for example.

In some implementations, the DSS control processor 405 facilitates the development and/or formatting of a program of content to be played on a player. For example, the DSS control processor 405 may facilitate formatting of an audiovisual program through the use of a template. The template includes formatting constraints and/or rules that are applied in the development of an audiovisual program to be presented. For example, the template may include rules associated with the portions of the screen used for certain types of content, what type of content can be played in each segment, and in what sequence, font size, and/or other constraints or rules applicable to the display of the program. A separate set of rules and/or constraints may be desirable for each display configuration. In some embodiments, formatting a program for different displays may be performed automatically by the DSS control processor 405.

In some embodiments, the DSS may create templates, generate content, select content, assemble programs, and/or format programs to be displayed based on information acquired through research and experimentation in the area of cognitive sciences. Cognitive science seeks to understand the mechanisms of human perception. The disciplines of cognitive and vision sciences have generated a vast knowledge base regarding how human perceptual systems process information, the mechanisms that underlie attention, how the human brain stores and represents information in memory, and the cognitive basis of language and problem solving.

Application of the cognitive sciences to content design, layout, formatting, and/or content presentation yields information that is easily processed by human perceptual systems, is easy to understand, and is easily stored in human memory. Knowledge acquired from the cognitive sciences and stored in a cognitive sciences database 430 may be used automatically or semi-automatically to inform one or more processes of the DSS including creation of templates, content design, selection of content, distribution of content, assembly of programs, and/or formatting of programs for display. The cognitive sciences database 430 used in conjunction with the programming of the DSS yields advertisements or other digital signage programs that are enhanced by the teachings of cognitive science, while relieving the system user from needing specific training in the field.

For example, cognitive sciences database 430 may store cognitive and vision science information that is utilized during the content design, distribution, and/or adjustment processes in order to provide content that is easily processed by human perceptual systems, easily comprehended, and easily stored in memory. Cognitive sciences database 430 may include design rules and templates that may be implemented by a computer to develop and modify content in conformance with principles of cognitive and vision sciences. Cognitive sciences database 430 may also include computer implementable models of principles of cognitive and vision sciences, such as models of visual attention, text readability, and memory principles.

In development of a digital signage program, e.g., ad campaign or the like, the DSS control processor 405 may guide a user through various processes that are enhanced using knowledge acquired through the cognitive sciences. For example, information stored in the cognitive sciences database 430 may be applied to the choice of templates to produce an optimal program layout and/or to the selection of content, such as whether content elements should be graphical, text, involve movement, color, size, and/or to the implementation of other aspects of program development Computer assisted methods and systems of the present invention may be implemented to allow content designers, who typically do not have the training required to apply principles from cognitive science and vision science, to increase the effectiveness of content design and distribution. Systems and methods of the present invention may incorporate features and functionality involving cognitive sciences database 430 in manners more fully described in co-pending U.S. patent application Ser. No. 12/159,106, filed on Dec. 29, 2006 as International Application US2006/049662 designating the United States and entitled "Content Development and Distribution Using Cognitive Sciences Database," which is incorporated herein by reference.

The DSS may include the capability for designing alternative versions of a digital signage program to accommodate diverse display types and viewing conditions. Display technology is diverse and there are large differences in the types of displays used to present content on a digital signage network. For example, the size, shape, brightness, and viewing conditions will vary greatly across a digital signage network (e.g., some displays may be small, flexible and non-rectilinear, whereas others may be standard large format Liquid Crystal Display (LCD) and plasma displays). The variation in display types and viewing conditions means that any single version of a piece of content may not be optimal for all the displays across a network.

In order to overcome this problem, it may be necessary to generate versions of each piece of content for each display type and viewing environment, and to selectively distribute these versions of content to their corresponding screens in the network. However, it is not realistic to expect content designers to have such detailed knowledge of the display types and viewing conditions across a large DSS network. Furthermore, even if such content designers had such detailed knowledge, it would be time-consuming to manually create versions of content for each display and to manually schedule the content to play on each corresponding display at the appropriate time.

The DSS may include a data acquisition unit 435 for collecting data used to improve the effectiveness of deployed content. The data acquisition unit 435 allows distribution factors that underlie the effectiveness of digital signage networks to be continuously gathered in real-time during deployment of content. The information acquired can facilitate continuous improvement in content effectiveness of the DSS as well as improvement of individual versions of content pieces. Previously acquired data may be used to learn what sensor or sales events should trigger the display of specific types of content, for example.

Individual pieces of content in any content program each have a specific goal (e.g., to sell a specific product). It is usually the case that there is variability in the value of each goal to the user of the digital signage network. For example, there may be variability in the profit margin and inventory level for each product which factor into the value of the goal for the product. The value of achieving each goal continuously changes during the time a digital signage program is deployed. For example, the inventory level of a product may change, thus affecting the goal for sales of the product.

Enhancing the effectiveness of a DSS as a whole, involves 1) accurate prediction of the impact of deploying a digital signage program on the goal associated with the digital signage program, and 2) continuously changing the distribution patterns (timing, frequency, and location) of individual pieces of content as the value of each individual goal corresponding to the pieces of content change. In many cases, it is unfeasible for users of the DSS to predict the impact of deploying content and to manually change content distribution patterns based on continuously changing values of goals associated with each piece of content. The DSS provides the functionality to predict the impact of digital signage programs and to alter the distribution of content based on the predictions.

As previously stated, content is displayed on the players 415 with the goal of affecting human behavior (e.g., to impact purchasing behavior). However, prior digital signage systems are unable to demonstrate a cause-and-effect relationship between signage content and human behavior or to measure the strength of the cause and effect relationship. This difficulty arises because the methods by which content is delivered across current digital signage networks does not support the determination of whether any measured change in human behavior was caused by signage content or the result of some confounding factors (e.g., change in weather, change in general demand for the product, change in price of the product).

The only way to decisively determine cause-and-effect relationships between signage content and human behavior is to conduct a true experiment during which signage content is systematically manipulated using complex experimental designs, and the effects of those manipulations on human behavior are carefully measured. Manually conducting such experiments is time consuming and requires significant knowledge and training in the scientific method of how to design true experiments. The users of digital signage systems may not have sufficient training to understand how to design a true experiment to acquire confound-free results.

The DSS illustrated in FIG. 40A includes a experiment design processor 440 and user interface 410 that provide the capability to design true experiments, and also includes a machine learning design processor 439 and the user interface 410 that provides the capability to design machine learning routines. Also included in the DSS shown in FIG. 40A is an experiment deployment unit 445 configured to control execution of cause-and-effect experiments and a machine learning deployment unit 437 configured to control execution of machine learning routines.

Figure 40B:
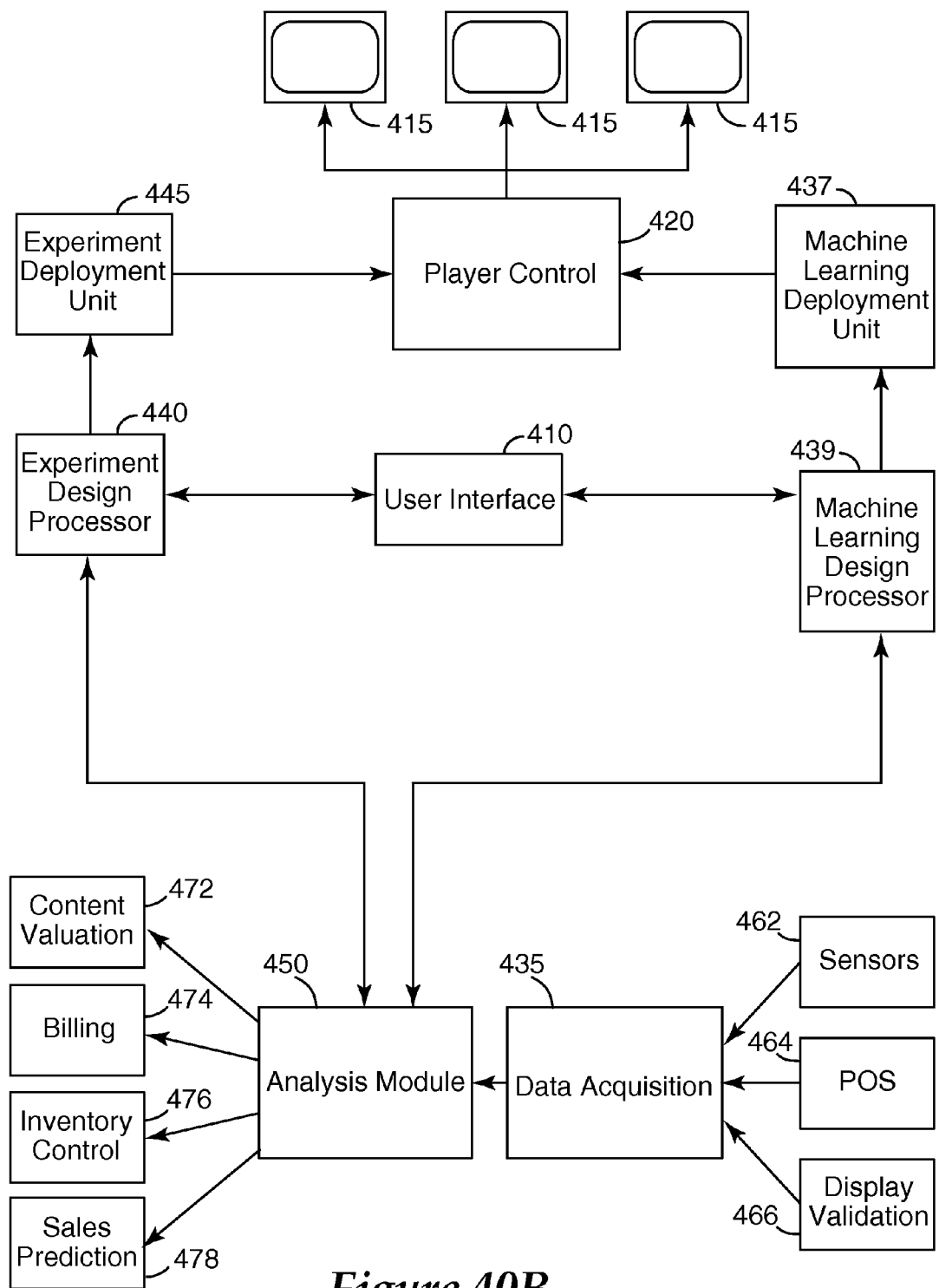
FIG. 40B illustrates a system that is configured to design, conduct, and analyze data for cause-and-effect experiments and machine learning routines in accordance with embodiments of the invention.

FIG. 40B illustrates a system that is configured to design, conduct, and analyze data for cause-and-effect experiments and machine learning routines in accordance with embodiments of the invention. The system illustrated in FIG. 40B includes an experiment design processor 440 that is configured to design a true experiment or sub-processes that have constraints of a true experiment (e.g., such as those depicted in FIGS. 37-39). As previously discussed, the experiment design processor 440 may be configured to operate fully automatically or semi-automatically with user interaction. In semi-automatic mode, the experiment design processor 440 may lead a user through various interactive sessions conducted via the user interface 410 to design a true experiment. In such a process, the experiment design processor 440 ensures the design of a true experiment that produces confound-free data. Thus, a user is able to rely on the programming of the experiment design processor 440 and is not required to have knowledge or experience in designing true experiments. The DSS may comprise only an experiment design processor 440, or may include additional elements such as an experiment deployment unit 445, a data acquisition unit 435, and data analysis unit 450. The system shown in FIG. 40B also includes a machine learning design processor 439 that is configured to facilitate the design of one or more machine learning routines.

The system may further include an experiment deployment unit 445. The experiment deployment unit 445 is configured to facilitate deployment of the experiment. In the context of a representative DSS system, the experiment deployment unit 445 formats the experimental content and the control group content for various player configurations and facilitates the transfer of the experimental content and the control content to the player controller 420 for presentation on players 415 as specified by the playlists and schedules. A machine learning deployment unit 437 of the DSS system coordinates execution of one or more machine learning routines, such as those discussed above, and formats content to be used by the MLRs. The machine learning deployment unit 437 facilitates the transfer of MLR content to the player controller 420 for presentation on players 415 as specified by MLR playlists and schedules.

The data acquisition unit 435 may be configured to collect experimental data from the control and treatment groups and optimization data for the machine learning routine. The data acquisition unit 435 may perform or facilitate acquisition of data associated with the experiment and the machine learning routine via any means. For example, in the context of the exemplary DSS, the data acquisition unit 435 may be coupled to various sensor or data acquisition devices 462, 464, 466 that gather information including product movement, product sales, customer actions or reactions, and/or other information. Sensors 462 may be used to detect, for example, if a customer picks up the product, or if a customer is in the vicinity of the display when the content is displayed. Sales may be determined based on information acquired by a point of sales (POS) system 464. One or more devices 466 that validate the display of content may also be used. Changes in inventory levels of a product may be available via an inventory control system. Customer reactions may be acquired via questionnaires. If the conducted experiment is a true experiment, the data acquired by the data acquisition unit 435 is substantially confound-free.

The data acquisition unit 435 may be coupled to a data analysis unit 450 that is configured to analyze the experimental data collected by the data acquisition unit 435. The data analysis unit 450 may determine and/or quantify cause and effect relationships between the independent and dependent variables of the experiment. For the illustrated DSS, the results of the analysis may be used to determine if the content is effective at influencing product sales. The data analysis unit 450 may analyze acquired data for purposes of optimizing content distribution patterns that maximize one or more effectiveness metrics, such as point-of-purchase sales, upgrades, and customer loyalty, and the like.

Because the analysis unit 450 will have received information regarding the independent and independent variables (e.g., whether the IVs and DVs are continuous or discrete), the analysis unit 450 would have much of the necessary information to choose the appropriate statistical test to apply to the data from the experiment. For example, if there is one IV with two discrete levels and one continuous DV, then a T-Test would be used for the inferential statistical test whereas if there is one IV with two discrete levels and one DV with two discrete levels, then a Chi-Squared test would be used for the inferential statistical test. Likewise, because analysis unit will access to information from the design processor 440 regarding which experimental conditions are diagnostic of particular hypotheses, the analysis unit 450 would have most or all of the information needed to determine which experimental and control conditions should be statistically compared.

The results of these analyses may be additionally or alternatively used to implement or modify various processes. For example, if the content was effective at influencing product sales, an advertisement campaign may be developed incorporating the content. A value may be assigned to the content by a content valuation process 472 based on the effectiveness of increasing sales. An advertiser using the content may be invoiced by a billing unit 474 according the value of the content. The data analysis unit 450 may also provide information to inventory control 476. Additionally, the data analysis unit 450 may provide information to a sales prediction unit 478 that generates a prediction of sales when the advertising campaign is deployed. The sales prediction unit 478 may additionally or alternatively predict the product inventory needed to support the sales generated by the advertisement campaign.

Implementation of a digital signage system, including capabilities for generating digital signage content, deploying experiments designed by the expert system, and collecting experimental data are further described in co-pending U.S. patent application Ser. No. 11/321,340 filed Dec. 29, 2005 and in U.S. patent application Ser. No. 12/159,107 filed on Dec. 29, 2006 as International Application US2006/049657, and entitled "Expert System for Designing Experiments," which are incorporated herein by reference.

The systems and methods described herein may form the basis of a consulting business according to embodiments of the present invention. Services offered could include, but not be limited to, working with customers to characterize their time-slot samples as appropriate for certain communication objective and certain consumer audiences, determining which variables a study would address, determining levels of independent variables for testing, determining factors that could be used for blocking and randomizing, and conducting a power analysis, among others. A measurement algorithm as previously described may be used to specify time-slot allocation requirements for cross-optimization and blocking factors.

Another application in accordance with the present invention is directed to systems and method for maximizing overall profitability. A system of the present invention may be used to optimize allocation of all available time-slot samples for two objectives: (1) content effectiveness testing as described in detail hereinabove, and (2) content that is not being tested but meant to address any number of business goals, such as increasing sales, promoting consumer satisfaction, informing employees, etc.

A system implemented according to the present invention as described herein may provide the data to "balance" the total inventory of time-slot samples, allowing the user to determine optimal levels of testing versus non-testing time-slot samples, and allocations within those groups to more efficiently test content using the minimal number of time-slot samples, freeing more time-slot samples for non-testing content. Results data could inform users as they seek to continuously monitor and adjust content distribution to maximize profitability, satisfaction, etc. and could aid users in determining when content is "worn-out," defined as the point in time when previously effective content ceases to be sufficiently effective due to over-exposure to the consumer or employee audience.

Figure 40C:
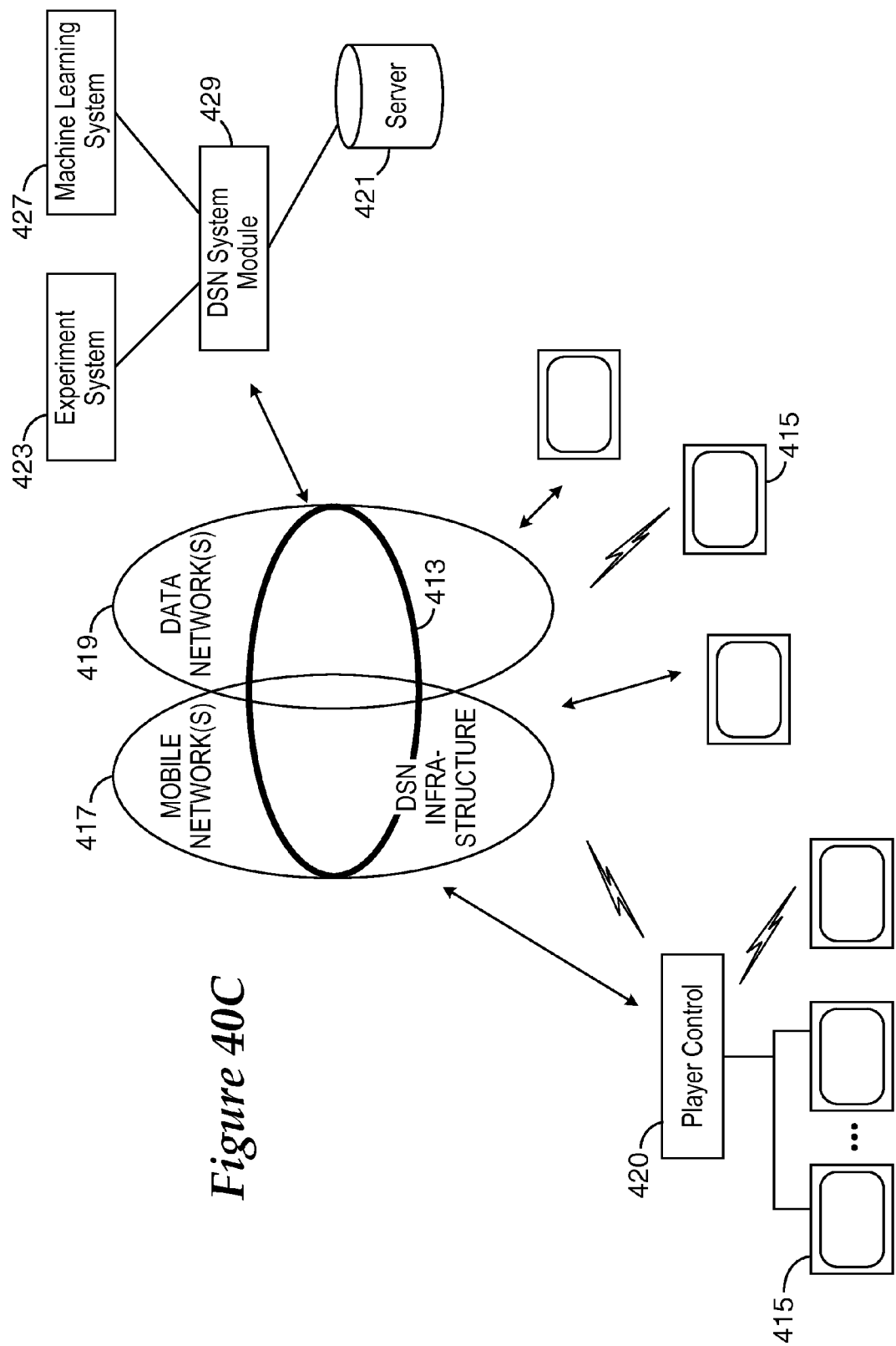
FIG. 40C is a diagram of a digital signage network that includes various components of a DSS in accordance with embodiments of the present invention, including a DSN system module communicatively coupled to an experiment system and a machine learning system; these embodiments encompass embodiments comprising the decision tool shown in FIG. 30.

FIG. 40C is a diagram of a digital signage network that includes various components of a DSS in accordance with embodiments of the present invention. According to FIG. 40C, the DSN includes a DSN system module 429 communicatively coupled to an experiment system 423 and a machine learning system 427. Also communicatively coupled to the DSN system module 429 is a server 421, which cooperate to control content distribution across the DSN.

The DSN system module 429 is configured to distribute content across the network, depicted as DSN infrastructure in FIG. 40C, and collect and process various data. The DSN system module 429 cooperates with the experiment system 423 to conduct cause-and-effect experiments, and with the machine learning system 427 to execute machine learning routines. The DSN system shown in FIG. 40C may exclude the experiment system 423 for those embodiments that execute machine learning routines exclusive of running experiments.

The DSN system module 429 may comprise a top-level decision tool, such as that described hereinabove in the context of various embodiments (e.g., see FIG. 30). For example, the DSN system module 429 may be configured to implement algorithms that continuously monitor the network and decide how to allocate control of each time period (e.g., TSS) for each display to the subcomponent systems (a) the experiment system 423 and (b) the MLR system 427. As previously discussed, the decision tool uses inputs from: the user regarding the value of experimental insights, the experiment system regarding the required sample size/duration to meet the desired statistical power, the incoming dependent variable data as the experiment progresses, and the estimated or known value of allowing the MLR to control the TSSs in order to maximize current business goals. It is understood that the decision tool may be implemented in components of the DSN system other than the DSN system module 429 (e.g., the experiment system 423, MLR system 427), and may be distributed among various components.

The DSN system module 429 communicates with a multiplicity of displays 415 via the DSN infrastructure 413, which may include one or both of wired and wireless networks. The DSN infrastructure 413 shown in FIG. 40C incorporates one or more mobile networks 417 and one or more data networks 419. The mobile network(s) 417 may represent any one or more known or future wireless networking technologies, such as the Global System for Mobile Communications (GSM), Universal Mobile Telecommunications System (UMTS), Personal Communications Service (PCS), Time Division Multiple Access (TDMA), Code Division Multiple Access (CDMA), Wideband CDMA (WCDMA), or other mobile network transmission technologies. One or more data networks 419 may cooperatively operate with the mobile network(s) 417 (or operate exclusive of mobile network(s) 417) to facilitate data transfers to and from the DSN system module 429. For example, the illustrated data network 419 may represent the Internet, which interfaces to the illustrated mobile network 417 to provide landline connectivity with the DSN system module 429.

In some embodiments, sets of displays 415 are coupled to one or more player controls 420 which communicate with the DSN system module 429 via the DSN infrastructure 413. The connections between a player control 420 and the displays 415 and DSN infrastructure 413, respectively, may be wired, wireless or a combination of wired and wireless connections. In other embodiments, a player control 420 need not be used to serve as an interface between the displays 415 and the DSN infrastructure 413. Content distribution and data acquisition may be managed using a streaming technology that allows the DSN system module 429 to coordinate and execute playlist schedules for a multiplicity of displays 415 without the player control 420. Suitable transport approaches include automatic retry query (ARQ), TCP, and UDP streaming, among others.

Using the description provided herein, embodiments of the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards, DVDs, CD, or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

The foregoing description of the various embodiments of the invention has been presented for the purposes of illustration and description. It is not intended to be exhaustive or to limit the invention to the precise form disclosed. Many modifications and variations are possible in light of the above teaching. For example, embodiments of the present invention may be implemented in a wide variety of applications. It is intended that the scope of the invention be limited not by this detailed description, but rather by the claims appended hereto.

What is claimed is:

1. A computer-implemented method, comprising:
   conducting an experiment using experimental content to determine effectiveness of communication content; and
   executing, while conducting the experiment, a machine learning routine (MLR) using MLR content to enhance an effectiveness metric, wherein:
   the machine learning routine comprises a reinforcement learning routine, the reinforcement learning routine comprising one or both of an explore routine associated with explore content and an exploit routine associated with exploit content;
   the experiment is conducted in accordance with a schedule comprising a plurality of time-slot samples;
   for experimental content that are related to either of explore or exploit content, using a first plurality of the time-slot samples unused for conducting the experiment for the explore or exploit routine; and
   for experimental content that are unrelated to either of explore or exploit content, using at least some of the experimental content and either of explore or exploit content in the same time-slot sample of the plurality of time-slot samples.

2. The method of claim 1 wherein the experiment is a cause and effect experiment.

3. The method of claim 1 wherein the experiment is a quasi-experiment.

4. The method of claim 1 wherein the experiment is a correlational design.

5. The method of claim 1 wherein the experiment ensures that the experimental content of the communication content are not confounded.

6. The method of claim 1, wherein the experiment is conducted in accordance with a schedule, and the machine learning routine executes in coordination with the schedule.

7. The method of claim 1, wherein the experiment is conducted in accordance with a schedule comprising a plurality of time periods, and at least some of the time periods are unused for conducting the experiment and are used for the machine learning routine.

8. The method of claim 1, wherein the experiment and the machine learning routine are implemented in accordance with a schedule comprising a plurality of time periods, the experiment implemented using a first plurality of the time periods and the machine learning routine implemented using a second plurality of the time periods that are interspersed with the first plurality of time periods.

9. The method of claim 1, wherein the experiment and the machine learning routine are implemented in accordance with a schedule comprising a plurality of time periods, at least a portion of each of the experiment and the machine learning routine implemented using the same time period of the plurality of portions, and experimental content and MLR content are unrelated.

10. The method of claim 1, comprising displaying experimental content and MLR content concurrently on a display, wherein the experimental content and MLR content are unrelated.

11. The method of claim 1, wherein the experiment is conducted in accordance with a schedule, and conducting the experiment comprises assigning communication content to time-slot samples of the schedule in a manner that ensures experimental content of the communication content are not confounded.

12. The method of claim 1, wherein the machine learning routine comprises a reinforcement learning routine, a logistic regression routine, an unsupervised learning routine, a semi-supervised learning routine, or use of one or more neural networks.

13. The method of claim 1, wherein:
   the experiment is conducted in accordance with a schedule comprising a plurality of time periods, a first plurality of the time periods unused for conducting the experiment are used for the explore routine and a second plurality of the time periods unused for conducting the experiment are used for the exploit routine.

14. The method of claim 13, comprising identifying a frequency rate for presenting the explore content and the exploit content that results in enhancement of the predetermined effectiveness metric.

15. The method of claim 1, comprising performing an experiment to differentiate whether a correlation discovered using the MLR is a spurious correlation or a causal-effect relationship.

16. The method of claim 1, comprising generating the time-slot samples comprising:
   defining a viewer visit duration (VVD) that target viewers spend at a location where content is to be presented;
   defining time intervals (TI) for data collection for data streams of interest that target viewers can affect during their visit to the location;
   determining a time-slot sample duration (TSSD) using VVD and TI; and
   generating the time-slot samples each having a duration defined by the TSSD and a data collection period defined for at least a portion of the TSSD.

17. The method of claim 16, wherein a first plurality of the time-slot samples are generated using a first VVD of a first duration and a second plurality of the time-slot samples are generated using a second VVD of a second duration differing from the first duration, and TI, TSSD, and data collection periods are determined based on each of the first and second VVDs.

18. The method of claim 1, comprising performing an evaluation to determine, for any given time period, if using experimental content has more value than using MLR content for the time period.

19. The method of claim 1, comprising: receiving one or more of (a) a value of the experimental hypothesis or hypotheses, (b) a value of each category of effectiveness metric, (c)

viewer visit duration (VVD) for each business objective, (d) content restrictions, and (e) urgency information; and generating a schedule for implementing the experiment and machine learning routine in accordance with one or more of (a) through (e).

20. The method of claim 19, comprising continuously adjusting the schedule in terms of times and display locations to maximize at least one effectiveness metric.

21. The method of claim 1, comprising analyzing measurement data indicative of MLR content effectiveness for the machine learning routine, and storing the measurement data in a historical database.

22. The method of claim 1, comprising producing output data indicative of return on investment for each piece of MLR content based on one or both of daypart and display location.

23. A computer-implemented method, comprising:
   generating a plurality of schedules and each comprising a plurality of time periods for presenting content and collecting data indicative of content effectiveness; and
   using a digital signage network comprising a plurality of geographically disparate displays and the plurality of schedules for:
   conducting an experiment while executing a machine learning routine using one of the plurality of schedules, wherein:
   the machine learning routine comprises a reinforcement learning routine, the reinforcement learning routine comprising one or both of an explore routine associated with explore content and an exploit routine associated with exploit content;
   for experimental content that are related to either of explore or exploit content, using a first plurality of the time-periods unused for conducting the experiment for the explore or exploit routine; and
   for experimental content that are unrelated to either of explore or exploit content, using at least some of the experimental content and either of explore or exploit content in the same time-periods of the plurality of time-periods.

24. The method of claim 23, wherein each of the plurality of schedules is defined by at least:
   a viewer visit duration (VVD) that target viewers spend at a location where content is to be presented;
   time intervals (TI) for data collection for data streams of interest that target viewers can affect during their visit to the location;
   a time-slot sample duration (TSSD) using VVD and TI; and
   a data collection period defined for at least a portion of the TSSD.

25. The method of claim 24, wherein at least one of VVD, TI, TSSD, and data collection period differs as among the plurality of scheduled.

26. The method of claim 24, wherein each of VVD, TI, TSSD, and data collection period differs as among the plurality of scheduled.

27. A computer-implemented method, comprising:
   receiving a viewer visit duration (VVD) for viewers at a location where content is to be presented;
   generating a schedule comprising a plurality of time periods for implementing a machine learning routine (MLR) based, in part on the VVD and an effectiveness metric;
   executing, using a digital signage network comprising a plurality of geographically disparate displays, the machine learning routine associated with MLR content in accordance with the schedule to determine effectiveness of the MLR content; and
   conducting, while executing the machine learning routine, an experiment using experimental content in accordance with the schedule to determine effectiveness of communication content, wherein:
   the machine learning routine comprises a reinforcement learning routine, the reinforcement learning routine comprising one or both of an explore routine associated with explore content and an exploit routine associated with exploit content;
   for experimental content that are related to either of explore or exploit content, using a first plurality of the time periods unused for conducting the experiment for the explore or exploit routine; and
   for experimental content that are unrelated to either of explore or exploit content, using at least some of the experimental content and either of explore and exploit content in the same time periods of the plurality of time periods.

28. The method of claim 27, comprising continuously adjusting the schedule in terms of times and display locations at which each piece of MLR content is shown for each display to maximize at least one effectiveness metric.

29. The method of claim 27, comprising randomly selecting between execution of the explore routine and the exploit routine with a constraint that the total time allocated for running each of the explore and exploit routines is governed in a predetermined manner.

30. The method of claim 27, comprising collecting data about MLR content effectiveness, and storing the collected data in a historical database.

31. The method of claim 30, comprising:
   assigning MLR content to time periods of the schedule to generate an adjusted schedule based, in part on the collected data stored in the historical database; and
   distributing the assigned MLR content to the displays in accordance with the adjusted schedule.

* * * * *

UNITED STATES PATENT AND TRADEMARK OFFICE
CERTIFICATE OF CORRECTION

PATENT NO. : 8,458,103 B2
APPLICATION NO. : 12/651650
DATED : June 4, 2013
INVENTOR(S) : Brian E Brooks et al.

It is certified that error appears in the above-identified patent and that said Letters Patent is hereby corrected as shown below:

Title Page:
Column 2 (Other Publications); Line 2, Delete "Rettrieved" and insert -- Retrieved --, therefor.

In the Drawings:

Sheet 4 of 49 (Ref. Numeral 55) (FIG. 5)
Line 2; Delete "Metricsfor" and insert -- Metrics for --, therefor.

Sheet 6 of 49 (Ref. Numeral 75) (FIG. 7)
Line 1; Delete "(WD)" and insert -- (VVD) --, therefor.

Sheet 19 of 49 (Ref. Numeral 102) (FIG. 21)
Line 1; After "of the" delete "of the".

Sheet 45 of 49 (Ref. Numeral 644) (FIG. 39A)
Line 1; Delete "pieceof experimentalcontent" and insert -- piece of experimental content --, therefor.

Sheet 45 of 49 (Ref. Numeral 646) (FIG. 39A)
Line 2; Delete "isunrelated" and insert -- is unrelated --, therefor.

In the Specification:

Column 2
Line 30; Delete "(WD)" and insert -- (VVD) --, therefor.

Column 16
Line 41; Delete "a" and insert -- as --, therefor.

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,458,103 B2

<u>Column 18</u>
Line 4; Delete "see" and insert -- seen --, therefor.

<u>Column 47</u>
Line 21; Delete "staring" and insert -- starting --, therefor.